(12) United States Patent
Liu et al.

(10) Patent No.: US 12,514,500 B2
(45) Date of Patent: Jan. 6, 2026

(54) ADJUSTING AN OPERATIONAL CHARACTERISTIC OF ONE OR MORE NEUROMUSCULAR-SIGNAL SENSORS TO MAINTAIN DESIRED IMPEDANCES, AND SYSTEMS, WEARABLE DEVICES, AND METHODS OF USE THEREOF

(71) Applicant: META PLATFORMS TECHNOLOGIES, LLC, Menlo Park, CA (US)

(72) Inventors: Tianshu Liu, Redmond, WA (US); Li Yao, Bothell, WA (US); Daniele Piazza, Redmond, WA (US); Wenyang Pan, Redmond, WA (US); Pinghung Wei, Kirkland, WA (US); Priyanshu Agarwal, Kirkland, WA (US); Theodore Orth, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 387 days.

(21) Appl. No.: 18/145,693

(22) Filed: Dec. 22, 2022

(65) Prior Publication Data
US 2023/0277133 A1 Sep. 7, 2023

Related U.S. Application Data

(60) Provisional application No. 63/317,495, filed on Mar. 7, 2022, provisional application No. 63/296,441, filed on Jan. 4, 2022.

(51) Int. Cl.
*A61B 5/00* (2006.01)
*A61B 5/0531* (2021.01)
*A61B 5/25* (2021.01)

(52) U.S. Cl.
CPC ............ *A61B 5/681* (2013.01); *A61B 5/0531* (2013.01); *A61B 5/25* (2021.01)

(58) Field of Classification Search
CPC .......................... A61B 5/681; A61B 5/0531
(Continued)

(56) References Cited

U.S. PATENT DOCUMENTS

2018/0153430 A1* 6/2018 Ang ........................ G06F 1/163

FOREIGN PATENT DOCUMENTS

| CN | 110900638 A | 3/2020 |
|---|---|---|
| WO | 03090366 A2 | 10/2003 |

OTHER PUBLICATIONS

International Preliminary Report on Patentability for International Application No. PCT/US2023/010112, mailed Jul. 18, 2024, 8 pages.

(Continued)

*Primary Examiner* — Nadia A Mahmood
(74) *Attorney, Agent, or Firm* — Morgan, Lewis & Bockius LLP

(57) ABSTRACT

A method of adjusting a neuromuscular-signal sensor is provided. The method includes monitoring, based on data from a wearable device that includes a neuromuscular-signal sensor, an impedance at the sensor that impacts the neuromuscular-signal sensor's ability to sense neuromuscular signals. The neuromuscular-signal sensor is coupled to the wearable device such that it contacts a portion of a user's skin. In response to detecting a change in the impedance at the neuromuscular-signal sensor that causes the impedance to be outside of a predefined range of impedance values, the method includes causing an adjustment to an operational characteristic (e.g., causing the neuromuscular-signal sensor to move or adjusting an electrical characteristic) associated with the neuromuscular-signal sensor such that the imped- (Continued)

ance at the neuromuscular-signal sensor is within the predefined range of impedance values after the adjustment to the operational characteristic.

20 Claims, 23 Drawing Sheets

(58) Field of Classification Search
USPC .......................................................... 600/301
See application file for complete search history.

(56) References Cited

OTHER PUBLICATIONS

International Search Report and Written Opinion for International Application No. PCT/US2023/014422, mailed May 4, 2023, 9 pages.

\* cited by examiner

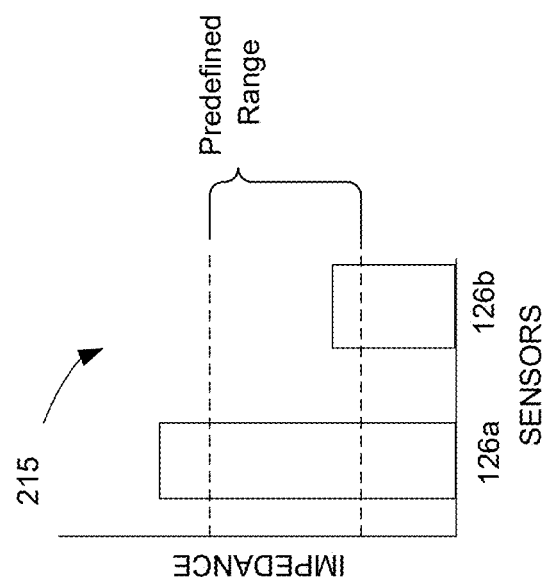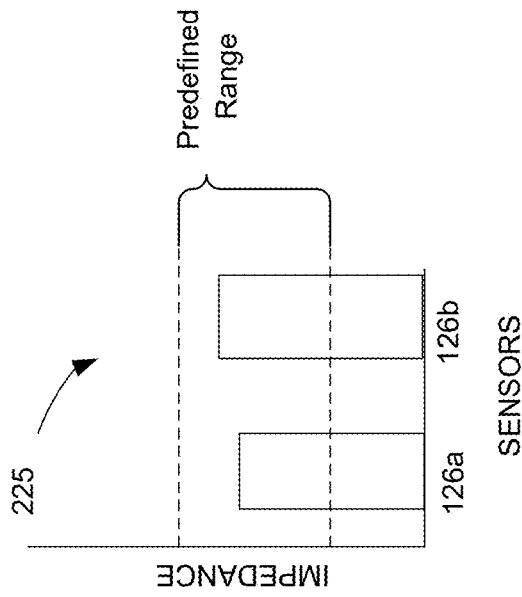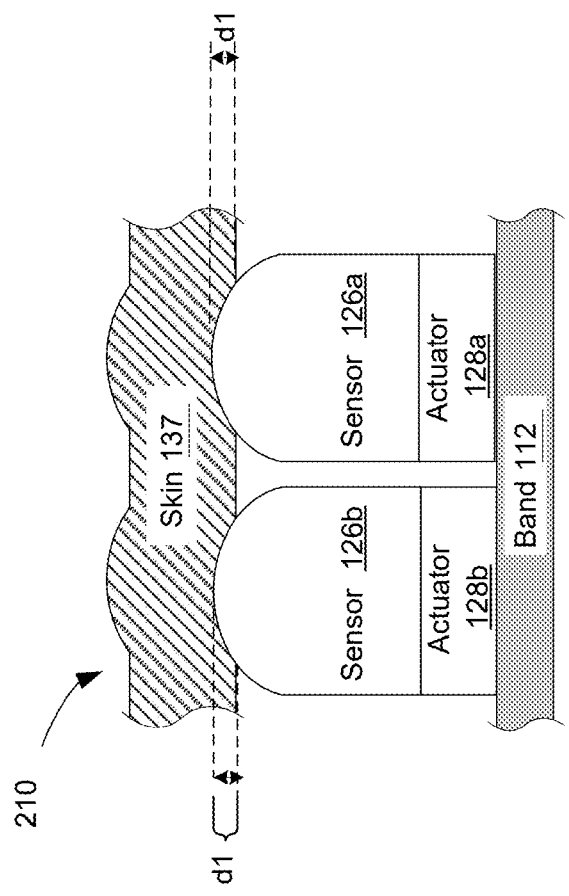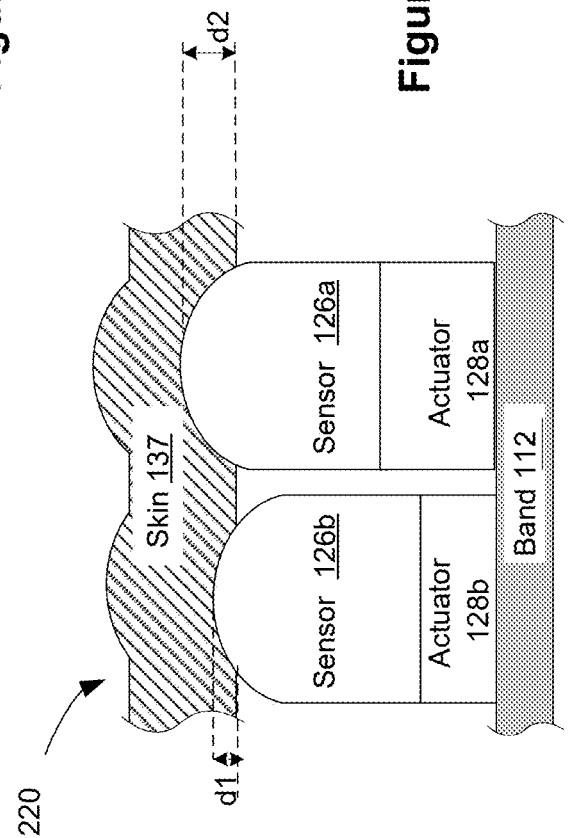
Figure 2A
Figure 2B

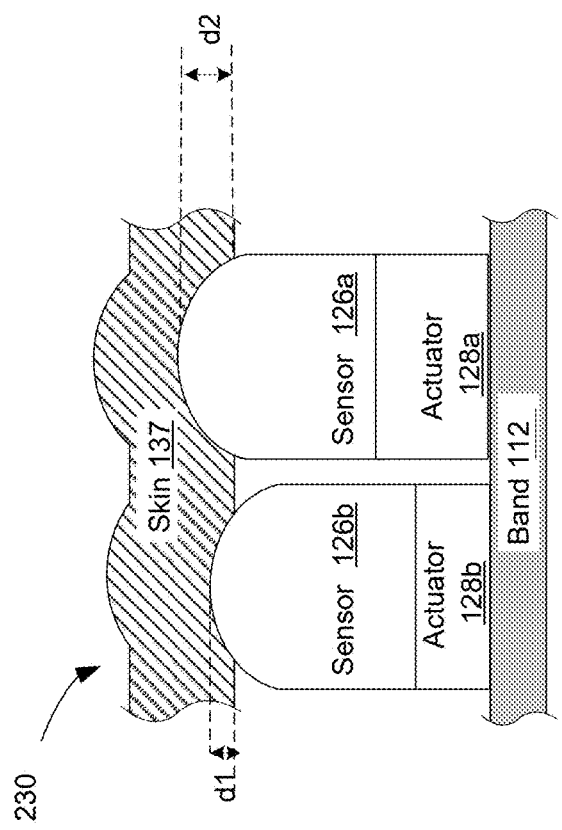
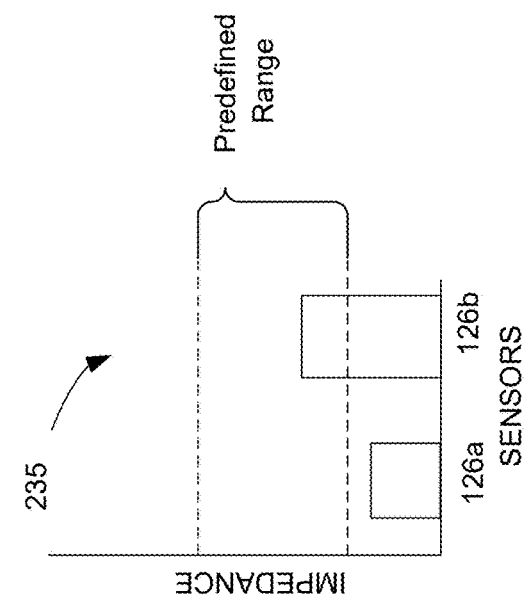
Figure 2C
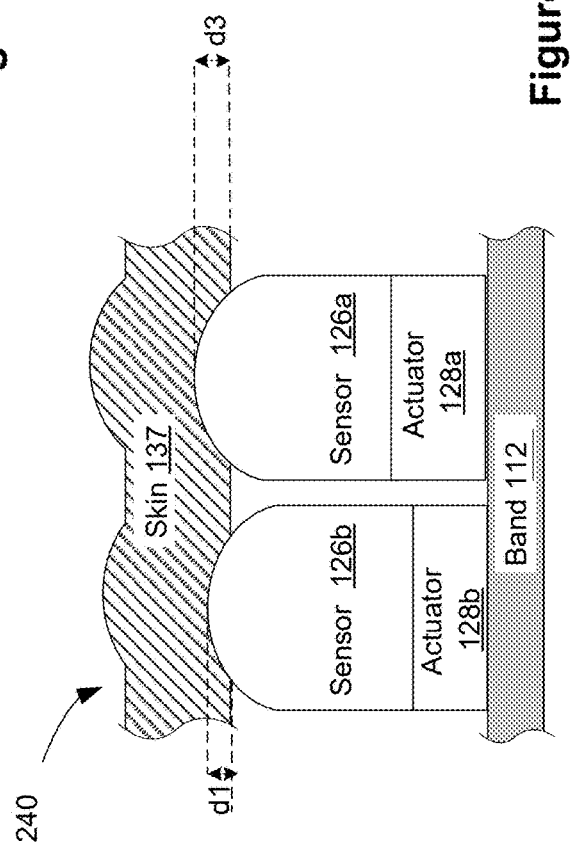
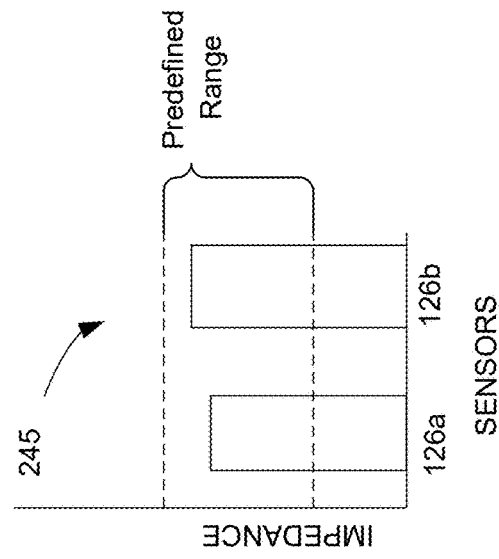
Figure 2D

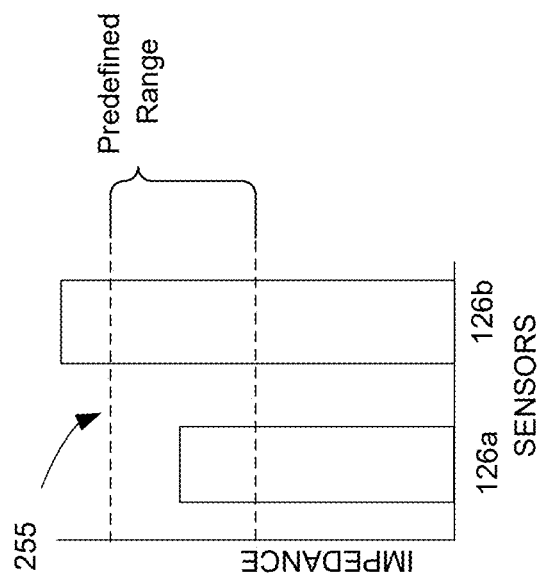
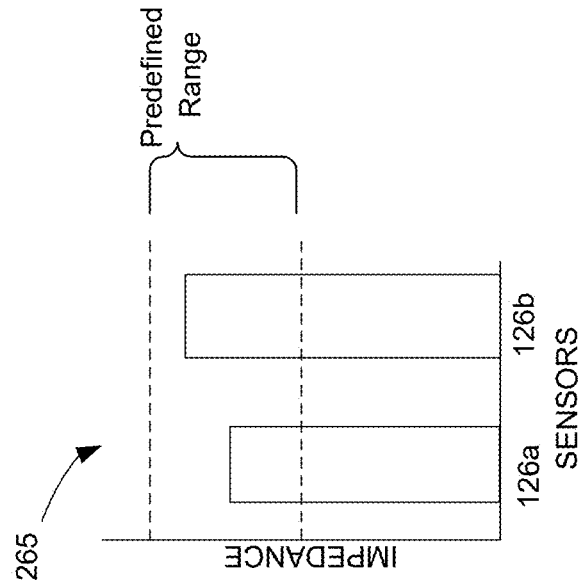
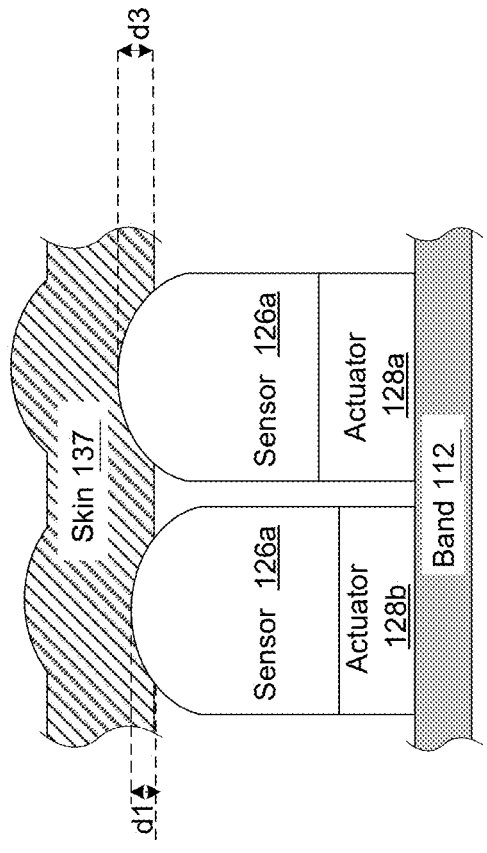
Figure 2E
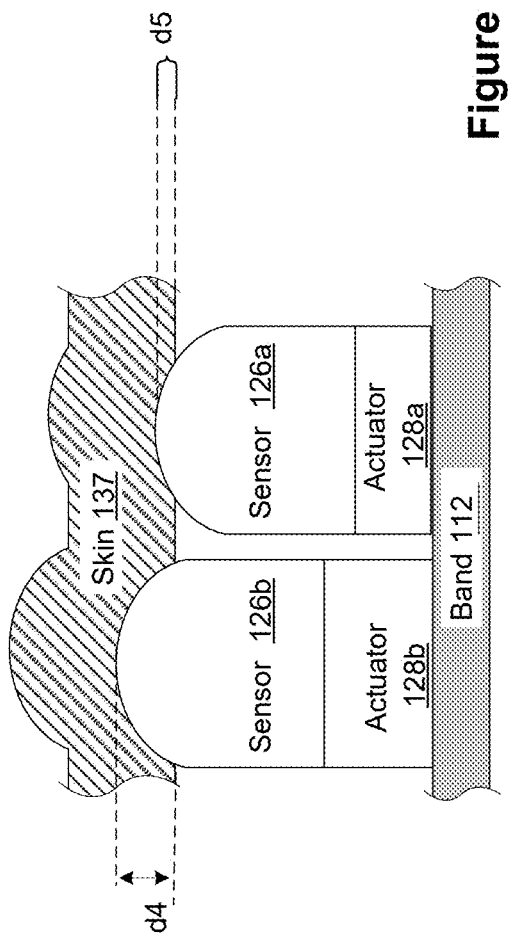
Figure 2F

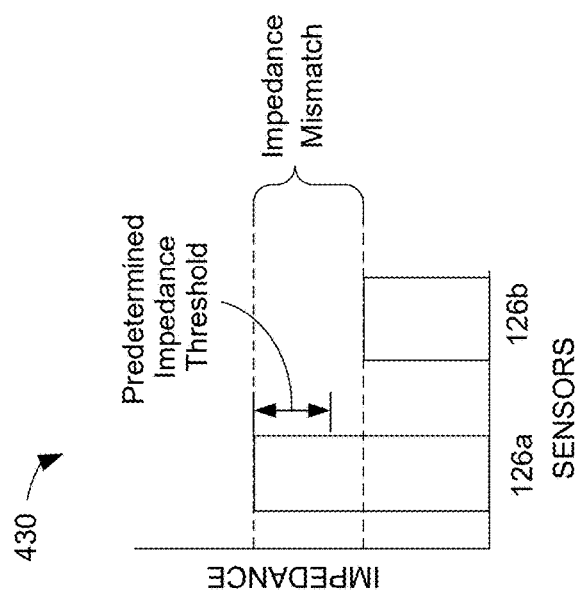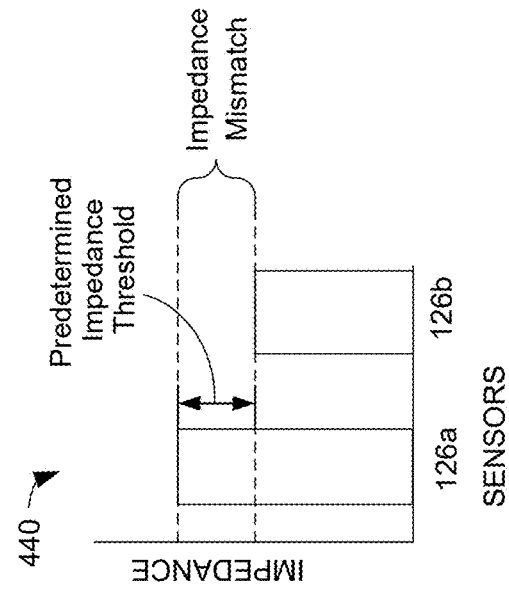
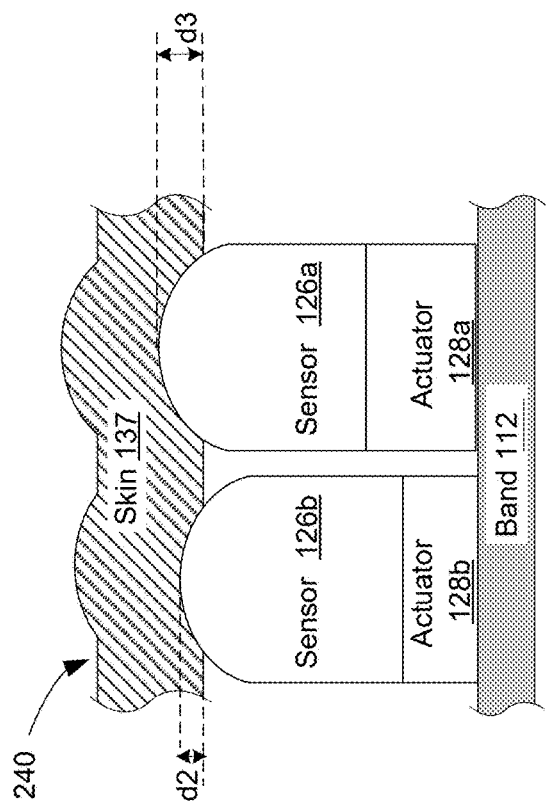
Figure 4C
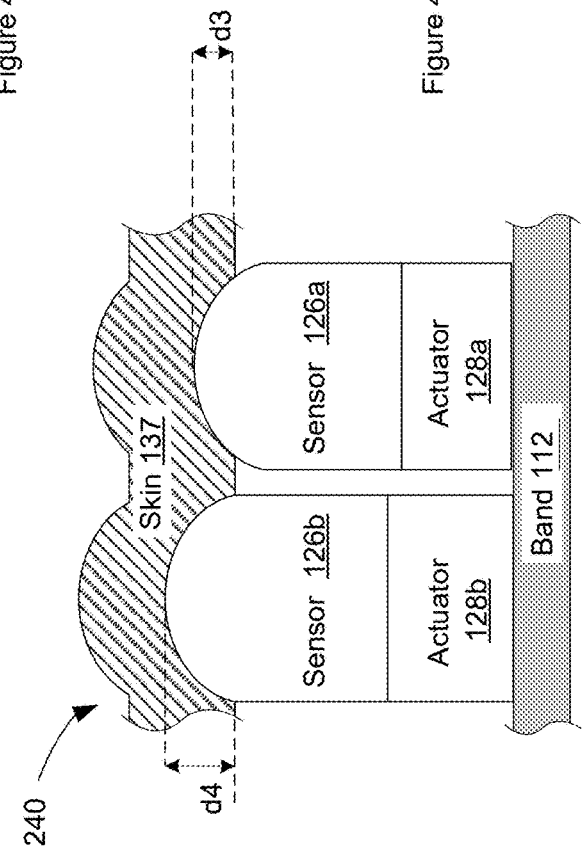
Figure 4D

Single channel

Double channel
impedance matching

1100

Monitor (1102), based on data from a wearable device that includes a neuromuscular-signal sensor, an impedance at the sensor that impacts the neuromuscular-signal sensor's ability to sense neuromuscular signals, the neuromuscular-signal sensor coupled to the wearable device such that it contacts a portion of a user's skin when the wearable device is donned by the user.

In response to detecting (1104) a change in the impedance at the neuromuscular-signal sensor that causes the impedance to be outside of a predefined range of impedance values:

Cause (1106) an adjustment to an operational characteristic associated with the neuromuscular-signal sensor such that the impedance at the neuromuscular-signal sensor is within the predefined range of impedance values after the adjustment to the operational characteristic of the neuromuscular-signal sensor.

Detect (1202), based on data from a wearable device that includes a first neuromuscular-signal sensor and a second neuromuscular-signal sensor, an impedance mismatch between respective impedances at the first and second neuromuscular-signal sensors while the first and second neuromuscular-signal sensors are in contact with respective portions of a user's skin when the wearable device is donned by the user;

In response to detecting the impedance mismatch, cause (1204) an adjustment to an operational characteristic associated with the first neuromuscular-signal sensor such that the respective impedances for the first and second neuromuscular-signal sensors are determined to be matching after the adjustment to the operational characteristic of the first neuromuscular-signal sensor.

Figure 12

ADJUSTING AN OPERATIONAL CHARACTERISTIC OF ONE OR MORE NEUROMUSCULAR-SIGNAL SENSORS TO MAINTAIN DESIRED IMPEDANCES, AND SYSTEMS, WEARABLE DEVICES, AND METHODS OF USE THEREOF

CROSS-REFERENCE TO RELATED APPLICATIONS

This application claims priority to U.S. Prov. App. No. 63/296,441, filed on Jan. 4, 2022, and entitled "Adjusting An Operational Characteristic Of One Or More Neuromuscular-Signal Sensors To Maintain Desired Impedances, And Systems, Wearable Devices, And Methods Of Use Thereof," and U.S. Prov. App. No. 63/317,495, filed on Mar. 7, 2022, and entitled "Adjusting An Operational Characteristic Of One Or More Neuromuscular-Signal Sensors To Maintain Desired Impedances, And Systems, Wearable Devices, And Methods Of Use Thereof," each of which is incorporated herein by reference.

TECHNICAL FIELD

The present disclosure relates generally to systems including wearable devices for sensing neuromuscular signals (e.g., used to determine motor actions that the user intends to perform with their hand), and more particularly, adjusting an operational characteristic associated with a neuromuscular-signal sensor (e.g., a skin-depression depth of the sensor or an electrical characteristic associated with the sensor) to maintain desired impedances (e.g., to keep the sensor's electrode-skin impedance with a desired range and/or to match the sensor's impedance with impedances at one or more other neuromuscular-signal sensors).

BACKGROUND

Some wearable devices (including wrist-wearable devices) include sensors for sensing neuromuscular signals (e.g., surface electromyography signals) to allow the devices to predict motor actions a user intends to perform. These sensors can have different performance variances based on a variety of factors, including, e.g., changing impedances at an interface between an electrode and a user's skin due to skin moisture, wrist or arm movement, anthropometric wrist variation during gesture (e.g., dynamic), etc., and also general demographic factors, such as age, body fat, hair density, tissue composition, anthropometric wrist variation (static). These performance variances can create a number of challenges in designing wearable devices that can accurately sense neuromuscular signals. Changing impedances, in particular for dry sensors (e.g., electrodes that do not require an electrode gel for sensing purposes), can result in significant noise in detected neuromuscular signals, which can degrade a system's ability to accurately predict intended, or detect ongoing, motor actions from a user.

These challenges are compounded by the need to ensure that the wearable device that can sense neuromuscular signals has a socially-acceptable form factor. Current designs of wearable devices for sensing neuromuscular signals can be large and bulky, often including a large number of sensors to detect neuromuscular signals. The large and bulky wearable devices can be uncomfortable to a user and can also make the devices less practical and socially acceptable for day-to-day use.

As such, there is a need to address one or more of the above-identified challenges.

SUMMARY

To address one or more of the challenges discussed above, an impedance (e.g., an impedance at the interface between a neuromuscular-signal sensor and a portion of a user's skin that is in contact with the neuromuscular-signal sensor) can be monitored to detect when the impedance changes to be outside of a predefined range of impedance values and/or when the impedance changes such that it is no longer matched with impedances at one or more other neuromuscular-signal sensors. In response to such impedance changes, systems (which can include a smartphone that is controlling certain operations at a wearable device, such as a wrist-wearable device, or can include just the wrist-wearable device performing the operations on its own, as well as combinations thereof) can cause an adjustment to an operational characteristic of the neuromuscular-signal sensor, such that after the adjustment, the impedance at the neuromuscular-signal sensor is back within the predefined range of impedance values and/or is again matched with respective impedances at the one or more other neuromuscular-signal sensors.

One illustrative example described herein is that the operational characteristic can be a depth at which the neuromuscular-signal sensor is depressed into a portion of the user's skin. In this illustrative example, adjusting a skin-depression depth for a neuromuscular-signal sensor as described herein uses measured impedance values and/or other sensed data to determine adjustments to a skin-depression depth of the neuromuscular-signal sensor to improve the accuracy of sensed neuromuscular signals (e.g., such that there is a 90% or higher true positive rate). Adjustments to the skin-depression depth for a neuromuscular-signal sensor also improves user comfort by reducing the overall depression required by a neuromuscular-signal sensor to sense neuromuscular signals. In particular, the wearable device can adjust the skin-depression depth across individual neuromuscular-signal sensors, groups of neuromuscular-signal sensors, and/or all neuromuscular-signal sensors such that each sensor can accurately detect neuromuscular signals by ensuring that the respective electrode-skin impedances are at their desired values for individual and/or groups of neuromuscular-signal sensors.

As another illustrative example, the wearable device described herein can detect changes in the measured impedance and adjust skin-depression depth for the neuromuscular-signal sensor such that the neuromuscular-signal sensor remains in an optimal position. For example, the wearable device can detect moisture, sweat, and/or interference with the neuromuscular-signal sensor that impedes the neuromuscular-signal sensor's ability to detect neuromuscular signals and adjust the skin-depression depth of the neuromuscular-signal sensor to improve its performance. These improvements allow for the wearable device to be designed such that it is comfortable, functional, practical, and socially acceptable for day-to-day use.

While the operational characteristic being a skin-depression depth associated with a neuromuscular-signal sensor is one illustrative example, other operational characteristics can also be adjusted to create changes in the respective impedance at a respective neuromuscular-signal sensor. These other operational characteristics can include electrical characteristics associated with an analog front-end of the respective neuromuscular-signal sensor, such as an impedance-matching network. In some embodiments, the operational characteristic can be an electrical characteristic of the neuromuscular-signal sensor or an element or characteristic associated with the neuromuscular-signal sensor. Electrical characteristics can include one or more of a phase, a gain, a frequency, a voltage, a current, and resistance. The operational characteristics can also be adjusted to create changes in the respective impedance to account for power line interference noise, baseline noise (e.g., other types of electrical-signal noise, other than that created by neuromuscular signals, that can be detected (picked up or sensed) by the respective neuromuscular signal sensors), and motion artifacts (changes in the sensed neuromuscular-signal caused by voluntary or involuntary user movement during neuromuscular-signal acquisition), as well as electrodes lift-off events (e.g., time intervals in which a neuromuscular-signal sensor does not contact the user's skin), temperature changes (e.g., an internal or external temperature at a respective sensor), and DC offset level. In some embodiments, the operational characteristics can be adjusted to account for changes over time (e.g., changes to a neuromuscular-signal sensor that occur over time, such as wear and tear, deformation, etc.). The method described herein can be performed by the wearable device or by a controlling device that is communicatively coupled to the wearable device.

Further, the wearable devices described herein can also improve users' interactions with artificial-reality environments and also improve user adoption of artificial-reality environments more generally by providing a form factor that is socially acceptable and compact, thereby allowing the user to wear the device throughout their day (and thus making it easier to interact with such environments in tandem with (as a complement to) everyday life). In the descriptions that follow, references are made to artificial-reality environments, which include, but are not limited to, virtual-reality (VR) environments (including non-immersive, semi-immersive, and fully-immersive VR environments), augmented-reality environments (including marker-based augmented-reality environments, marker-less augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments (e.g., for more accurately controlling operations in an artificial-reality environment based on detecting neuromuscular signals that are sensed more reliably due to the impedance-control techniques described herein to adjust operational characteristics of neuromuscular-signal sensors).

(A0) In accordance with some embodiments, a method of adjusting an operational characteristic of a neuromuscular-signal sensor is provided. The method includes monitoring, based on data from a wearable device that includes a neuromuscular-signal sensor, an impedance at the sensor that impacts the neuromuscular-signal sensor's ability to sense neuromuscular signals (e.g., the impedance can be an impedance present at an interface between the sensor and a portion of the user's skin that the sensor is in contact with). The neuromuscular-signal sensor is coupled to the wearable device such that it contacts a portion of a user's skin when the wearable device is donned by the user. The method includes, in response to detecting a change in the impedance at the neuromuscular-signal sensor that causes the impedance to be outside of a predefined range of impedance values, causing an adjustment to an operational characteristic associated with the neuromuscular-signal sensor so that the impedance at the neuromuscular-signal sensor is within the predefined range of impedance values after the adjustment to the operational characteristic of the neuromuscular-signal sensor.

(A1) In some embodiments of A1, the operational characteristic is a depth at which the neuromuscular-signal sensor is depressed into the user's skin when the wearable device is donned by the user. Before the change in the impedance is detected, the neuromuscular-signal sensor is depressed into the user's skin at a first skin-depression depth. Causing the adjustment to the operational characteristic of the neuromuscular-signal sensor includes causing the neuromuscular-signal sensor to move until the neuromuscular-signal sensor depresses the portion of the user's skin to a second skin-depression depth that is distinct from the first skin-depression depth.

(A2) In some embodiments of A1, the change in the impedance at the neuromuscular-signal sensor is a first change in the impedance at the neuromuscular-signal sensor, and the method further includes, while the neuromuscular-signal sensor is at the second skin-depression depth and in response to detecting a second change in the impedance at the neuromuscular-signal sensor that causes the impedance to again be outside of the predefined range of impedance values, causing the neuromuscular-signal sensor to move until the neuromuscular-signal sensor depresses the portion of the user's skin to a third skin-depression depth that is distinct from the second skin-depression depth, such that the impedance for the neuromuscular-signal sensor is within the predefined range of impedance values while the neuromuscular-signal sensor is at the third skin-depression depth.

(A3) In some embodiments of A2, the first skin-depression depth is less than the second skin-depression depth, and the third skin-depression depth is greater than the second skin-depression depth, such that the neuromuscular-signal sensor can be caused to be pushed into the portion of the user's skin or caused to be pulled away from the user's skin to allow for maintaining the impedance at the neuromuscular-signal sensor within the predefined range of impedance values.

(A4) In some embodiments of any of A2-A3, the first, second, and third changes in the impedance are caused by one or more of moisture at the portion of the user's skin, hair follicles at the portion of the user's skin, and motion of the user that causes the neuromuscular-signal sensor to move within the portion of the user's skin.

(A5) In some embodiments of any of A1-A4, the neuromuscular-signal sensor is part of a group of two or more neuromuscular-signal sensors that is configured to operate as a sensing channel for sensing neuromuscular signals, and movement of the neuromuscular-signal sensor to the second skin-depression depth is caused to occur while other neuromuscular-signal sensors in the group of two or more sensors remain in place.

(A6) In some embodiments of any of A1-A5, causing the neuromuscular-signal sensor to move includes causing the neuromuscular-signal sensor to move such that it depresses the user's skin to a number of different skin-depression depths, including the second skin-depression depth, until a determination is made by the wearable device that the impedance for the sensor is within the predefined range of impedance values while the neuromuscular-signal sensor depresses the portion of the user's skin to the second skin-depression depth.

(A7) In some embodiments of any of A1-A6, the neuromuscular-signal sensor is a first neuromuscular-signal sensor, the predefined range of impedance values is a first predefined range of impedance values, the wearable device includes a second neuromuscular-signal sensor, and the method further comprises: monitoring a second impedance at the second neuromuscular-signal sensor that impacts the second neuromuscular-signal sensor's ability to sense neuromuscular signals, the second neuromuscular-signal sensor coupled to the wearable device such that it depresses a portion of the user's skin to a particular skin-depression depth. In response to detecting a change in the second impedance at the second neuromuscular-signal sensor that causes the second impedance to be outside of a second predefined range of impedance values, causing the second neuromuscular-signal sensor to move until the second neuromuscular-signal sensor depresses a second portion of the user's skin to another particular skin-depression depth that is distinct from the particular skin-depression depth. The second impedance at the second neuromuscular-signal sensor is within the second predefined range of impedance values while the second neuromuscular-signal sensor is at the other particular skin-depression depth.

(A8) In some embodiments of A7, the first predefined range of impedance values is distinct from the second predefined range of impedance values, the first predefined range of impedance values is specific to the first neuromuscular-signal sensor, and the second predefined range of impedance values is specific to the second neuromuscular-signal sensor.

(A9) In some embodiments of A7-A8, causing the second neuromuscular-signal sensor to move is performed independently of causing the first sensor to move.

(A10) In some embodiments of A7-A9, the first and second neuromuscular-signal sensors are part of a first group of neuromuscular-signal sensors configured as a first channel for sensing neuromuscular signals, and the wearable device further includes a second group of at least two neuromuscular-signal sensors configured as a second channel for sensing neuromuscular signals, and the method further comprises, for each respective neuromuscular-signal sensor of the second group of neuromuscular-signal sensors: monitoring a respective impedance at the respective neuromuscular-signal sensor that impacts the respective neuromuscular-signal sensor's ability to sense neuromuscular signals. The respective neuromuscular-signal sensor is coupled to the wearable device such that it depresses a respective portion of the user's skin to a first respective skin-depression depth. The method further includes, in response to detecting a change in the respective impedance at the respective sensor that causes the respective impedance to be outside of a respective predefined range of impedance values, causing the respective neuromuscular-signal sensor to move until it depresses the respective portion of the user's skin to a second respective skin-depression depth that is distinct from the first respective skin-depression depth. The respective impedance at the respective neuromuscular-signal sensor is within the respective predefined range of impedance values while the respective neuromuscular-signal sensor is at the second respective skin-depression depth.

(A11) In some embodiments of A10, each respective predefined range of impedance values is a distinct predefined range of impedance values.

(A12) In some embodiments of A1-A11, causing the neuromuscular-signal sensor to move includes causing an actuator coupled to the neuromuscular-signal sensor to move.

(A13) In some embodiments of A12, the actuator is an electrostatic zipping actuator in which electric voltage changes are used for actuating the electrostatic zipping actuator.

(A14) In some embodiments of A13, the neuromuscular-signal sensor is a gold-plated electrode or an electrode made of a diamond-like coating, the electrode being coupled (e.g., in a sealed fashion, so that it is a sealed coupling) with the electrostatic zipping actuator.

(A15) In some embodiments of A13, the actuator is a pneumatically-controlled actuator.

(A16) In some embodiments of A15, the neuromuscular-signal sensor is coupled to a bladder that is fluidically coupled to the pneumatic actuator.

(A17) In some embodiments of A13, the actuator controls a fluidically-controlled actuator that is (e.g., liquid or air) within a wearable structure of the wearable device.

(A18) In some embodiments of A17, the fluid is introduced into the actuator via a mechanical input on the wearable device.

(A19) In some embodiments of any of A1-A18, the change in the impedance is detected automatically without any user input and the neuromuscular-signal sensor is caused to be moved automatically without any user input.

(A20) In some embodiments of any of A0-A19, the change in the impedance at the neuromuscular-signal sensor is a change that increases an amount of power line interference present in neuromuscular signals detected via the neuromuscular-signal sensor.

(B1) Another aspect example described herein is a system comprising a wearable device, the wearable device configured to perform the method of any of A0-A20.

(C1) One more aspect described herein is a non-transitory, computer-readable storage medium including instructions that, when executed by a wearable device, cause the wearable device to perform or cause performance of the method of any of A0-A20.

(D1) One additional aspect described herein is a wearable device used in conjunction with performance of the method of any of A0-A20. Means for performing the method of any of A0-A20 can also be provided.

(D2) In some examples, a wearable device (e.g., a wrist-wearable device) performs or causes performance of any of A0-A20; in other examples, an electronic device that is communicatively coupled with the wearable device can perform or cause performance of the method of any of A0-A20. Similarly, a non-transitory computer-readable storage medium can include instructions for execution at the electronic device, such that when those instructions are executed by the electronic device that is communicatively coupled with a wrist-wearable device that includes one or more neuromuscular-signal sensors, the electronic device is caused to perform the method of any of A0-A20.

(E0) Another embodiment is a method that looks to maintain impedance matches for neuromuscular-signal sensors (either as an alternative to, or in addition to, keeping impedances within a predefined range of impedance values as was discussed above). Thus, a method of matching impedances for neuromuscular-signal sensors of a wearable device can also be provided. The method includes detecting, at a wearable device that includes a first neuromuscular-signal sensor and a second neuromuscular-signal sensor, an impedance mismatch between respective impedances at the first and second neuromuscular-signal sensors while the first and second neuromuscular-signal sensors are in contact with a user's skin while the wearable device is donned by a user. The method further includes, in response to detecting the impedance mismatch, causing an adjustment to an operational characteristic of the first neuromuscular-signal sensor so that the respective impedances for the first and second neuromuscular-signal sensors are determined to be matching after the adjustment to the operational characteristic of the first neuromuscular-signal sensor.

(E2) In some embodiments of E1, the impedance mismatch is a first impedance mismatch, and the method further includes, in response to detecting a second impedance mismatch between the respective impedances at the first and second neuromuscular-signal sensors, causing the second neuromuscular-signal sensor to move until the second neuromuscular-signal sensor is depressed into the user's skin at a fourth skin-depression depth that is distinct from the second skin-depression depth, and the respective impedances for the first and second neuromuscular-signal sensors are determined to be matching while the first and second neuromuscular-signal sensors are depressed into the user's skin at the third and fourth skin-depression depths, respectively.

(E3) In some embodiments of E2, further including: in response to detecting a third impedance mismatch between the respective impedances at the first and second neuromuscular-signal sensors, causing both of the first and second neuromuscular-signal sensors to move until: the respective impedances for the first and second neuromuscular-signal sensors are determined to be matching while the first and second neuromuscular-signal sensors are depressed into the user's skin at respective skin-depression depths distinct from the first and second skin-depression depths.

(E4) In some embodiments of E3, causing both of the first and second neuromuscular-signal sensors to move includes causing the first and second neuromuscular-signal sensors to move independently or together to different skin-depression depths until a determination is made that the respective impedances for the first and second neuromuscular-signal sensors match.

(E5) In some embodiments of E0-E4, the first and second neuromuscular-signal sensors form part of a group of two or more neuromuscular-signal sensors configured to operate as a sensor channel for sensing neuromuscular signals.

(E6) In some embodiments of E0-E4, the first neuromuscular-signal sensor is part of a first group of two or more neuromuscular-signal sensors configured to operate as a first sensor channel for sensing neuromuscular signals, and the second neuromuscular-signal sensor is part of a second group of two or more neuromuscular-signal sensors configured to operate as a second sensor channel for sensing neuromuscular signals.

(E7) In some embodiments of E6, respective groups of neuromuscular-signal sensors are positioned along respective distinct widthwise segments of the wearable device, and at least one group of neuromuscular-signal sensors is positioned along a respective widthwise segment of the wearable device that separates the first and second groups of two or more neuromuscular-signal sensors.

(E8) In some embodiments of E6, respective groups of neuromuscular-signal sensors are positioned along respective distinct widthwise segments of the wearable device, and the first and second groups of two or more neuromuscular-signal sensors are positioned along adjacent widthwise segments of the wearable device.

(E9) In some embodiments of E6, respective groups of neuromuscular-signal sensors are positioned along respective distinct widthwise segments of the wearable device. The second group of two or more neuromuscular-signal sensors is a reference group of neuromuscular-signal sensors, and respective impedances for each of the other respective groups of two or more neuromuscular-signal sensors are matched with a respective impedance at the second group of two or more neuromuscular-signal sensors by causing one or more of the neuromuscular-signal sensors in each of the respective groups to move so that they are at a skin-depression depth at which impedances at each group are matching with a respective impedance at the second group.

(E10) In some embodiments of E1-E8, causing a respective neuromuscular-signal sensor to move includes causing an actuator coupled to the respective neuromuscular-signal sensor to move.

(E11) In some embodiments of E9, the actuator is an electrostatic zipping actuator in which electric voltage changes are used for actuating the electrostatic zipping actuator with different levels of force output.

(E12) In some embodiments of E10, each of the first and second neuromuscular-signal sensors is a gold-plated electrode or an electrode made of a diamond-like coating, the electrode being sealingly coupled with the electrostatic zipping actuator.

(E13) In some embodiments of E10, the actuator is a pneumatically-controlled actuator.

(E14) In some embodiments of E13, each of the first and second neuromuscular-signal sensors is coupled to a bladder that is fluidically coupled to the pneumatic actuator.

(E15) In some embodiments of E10, the actuator controls a fluidically-controlled actuator that is within a wearable structure of the wearable device.

(E16) In some embodiments of E15, fluid is introduced into the actuator via a mechanical input on the wearable device.

(E17) In some embodiments of E1, the change in the impedance is detected automatically without any user input and the first neuromuscular-signal sensor is caused to be moved automatically without any user input.

(F1) An example described herein is a system comprising a wearable device, the wearable device configured to perform the method of any of E0-E17 using the wearable device.

(G1) An example described herein is a non-transitory, computer-readable storage medium including instructions that, when executed by a wearable device, cause the wearable device to perform or cause performance of the method of any of E0-E17.

(H1) An example described herein is a wearable device used in conjunction with performance of the method of any of E0-E17. Means for performing the method of any of E0-E17 can also be provided.

(H2) In some examples, a wearable device (e.g., a wrist-wearable device) performs or causes performance of any of E0-E17; in other examples, an electronic device that is communicatively coupled with the wearable device can perform or cause performance of the method of any of E0-E17. Similarly, a non-transitory computer-readable storage medium can include instructions for execution at the electronic device, such that when those instructions are executed by the electronic device that is communicatively coupled with a wrist-wearable device that includes one or more neuromuscular-signal sensors, the electronic device is caused to perform the method of any of E0-E17.

Note that the various embodiments described above can be combined with other embodiments described herein (e.g., keeping an impedance for a single or group of neuromuscular-signal sensors can be combined with matching of impedances, such that impedances can be both matched and be kept within particular ranges of impedance values). The features and advantages described in the specification are not all inclusive and, in particular, additional features and advantages will be apparent to one of ordinary skill in the art in view of the drawings, specification, and claims. Moreover, it should be noted that the language used in the specification has been principally selected for readability and instructional purposes.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. The description may admit to other effective features as the person of skill in this art will appreciate upon reading this disclosure.

FIGS. 2A-2F illustrate a cross-sectional view of a first widthwise segment of the interior surface of the wearable device and adjustment of skin-depression depths of one or more neuromuscular-signal sensors of a pair of neuromuscular-signal sensors, in accordance with some embodiments.

FIGS. 4A-4D illustrate a cross-sectional view of a first widthwise segment of the interior surface of the wearable device and adjustment of skin-depression depths of one or more neuromuscular-signal sensors of a pair of neuromuscular-signal sensors, in accordance with some embodiments.

FIG. 11 is a flow chart for a method of adjusting an operational characteristic associated with a neuromuscular-signal sensor to maintain or achieve a desired impedance value, in accordance with some embodiments.

FIG. 12 is a flow chart for a method of matching impedances for neuromuscular-signal sensors of a wearable device, in accordance with some embodiments.

Figure 1:
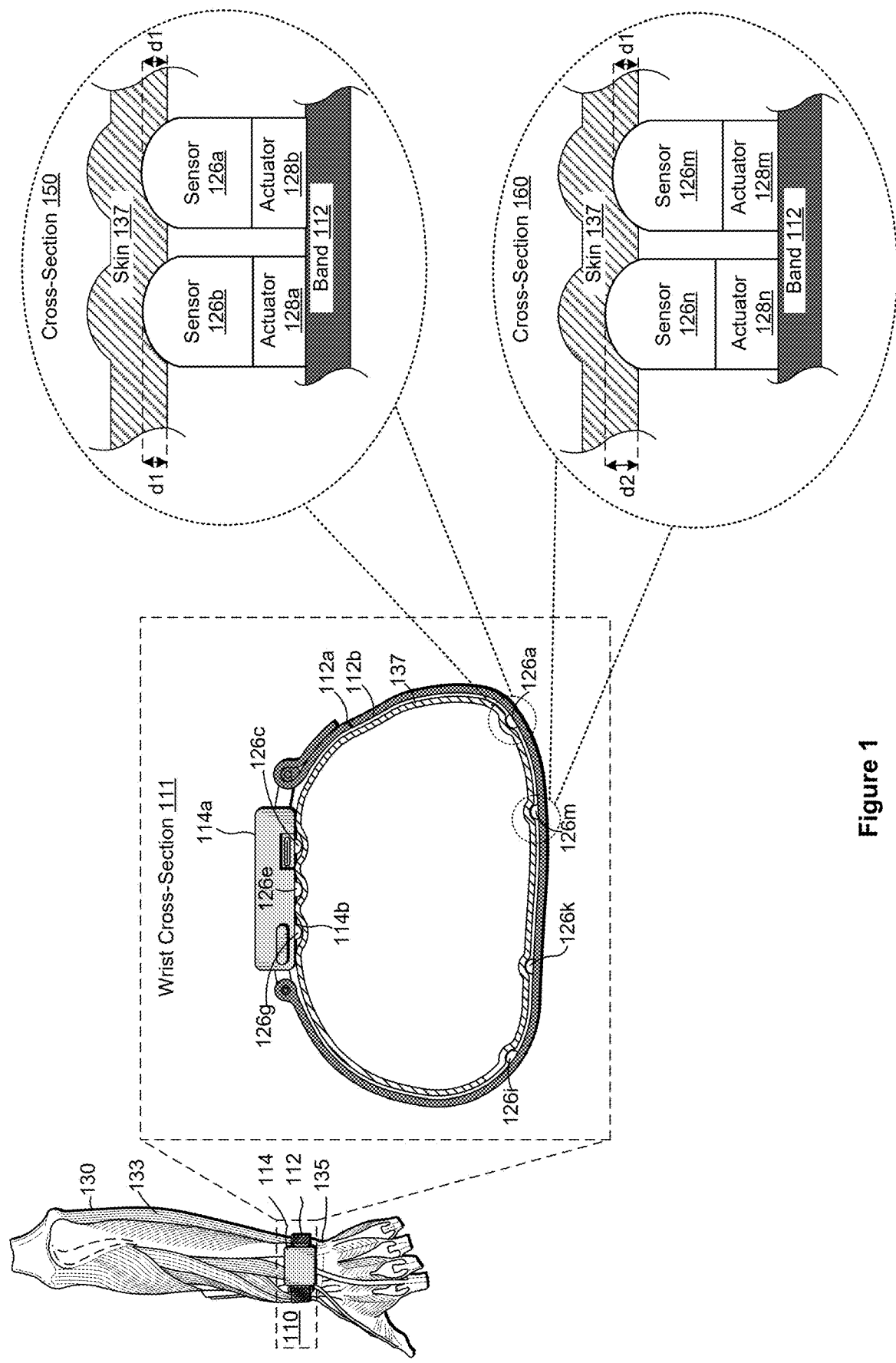
FIG. 1 illustrates a wearable device configured to adjust respective operational characteristics (e.g., skin-depression depths are used herein as an illustrative example of an operational characteristic that can be adjusted to cause impedance changes, but other example operational characteristics are also contemplated, including electrical changes at the sensor itself or at one or more components associated with the sensor's analog front end) of one or more neuromuscular-signal sensors, in accordance with some embodiments.

In accordance with common practice, the various features illustrated in the drawings are not drawn to scale. Accordingly, the dimensions of the various features may be arbitrarily expanded or reduced for clarity. In addition, some of the drawings may not depict all of the components of a given system, method or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

FIG. 1 illustrates a wearable device 110 (e.g., an arm-wearable device, which in one example is worn on the wrist 135 portion of the arm so is a wrist-wearable device) configured to adjust one or more operational characteristics (e.g., skin-depression depths) associated with one or more neuromuscular-signal sensors, in accordance with some embodiments. In the left-hand side of FIG. 1, the example wrist-wearable device 110 is shown as being donned/worn on a wrist 135 of a user such that neuromuscular-signal sensors 126 are in contact with respective portions of the user's skin above certain muscle groups that control hand positions and finger movements. In the middle of FIG. 1, is a close-up cross-section 111 showing the band portion 112 worn around the user's wrist 135, and the right-hand side of FIG. 1 shows that in this example at least some of the neuromuscular-signal sensors 126 can be coupled with respective actuators 128 that can cause movement of respective neuromuscular-signal sensors 126. A capsule portion 114 is configured to be positioned on top of the user's wrist 135 or forearm 133 when the user is donning/wearing the wearable structure (with the band portion 112 surrounding a remainder of the user's wrist 135). In some embodiments, capsule portion 114 includes one or more neuromuscular-signal sensors 126 and one or more respective actuators 128 that can cause movement of respective neuromuscular-signal sensors 126. The interior band 112b is configured to contact a user's skin 137 when the wearable device 110 is donned by the user (e.g., on user's arm as shown in dorsal arm view 130 of FIG. 1).

Figure 14:
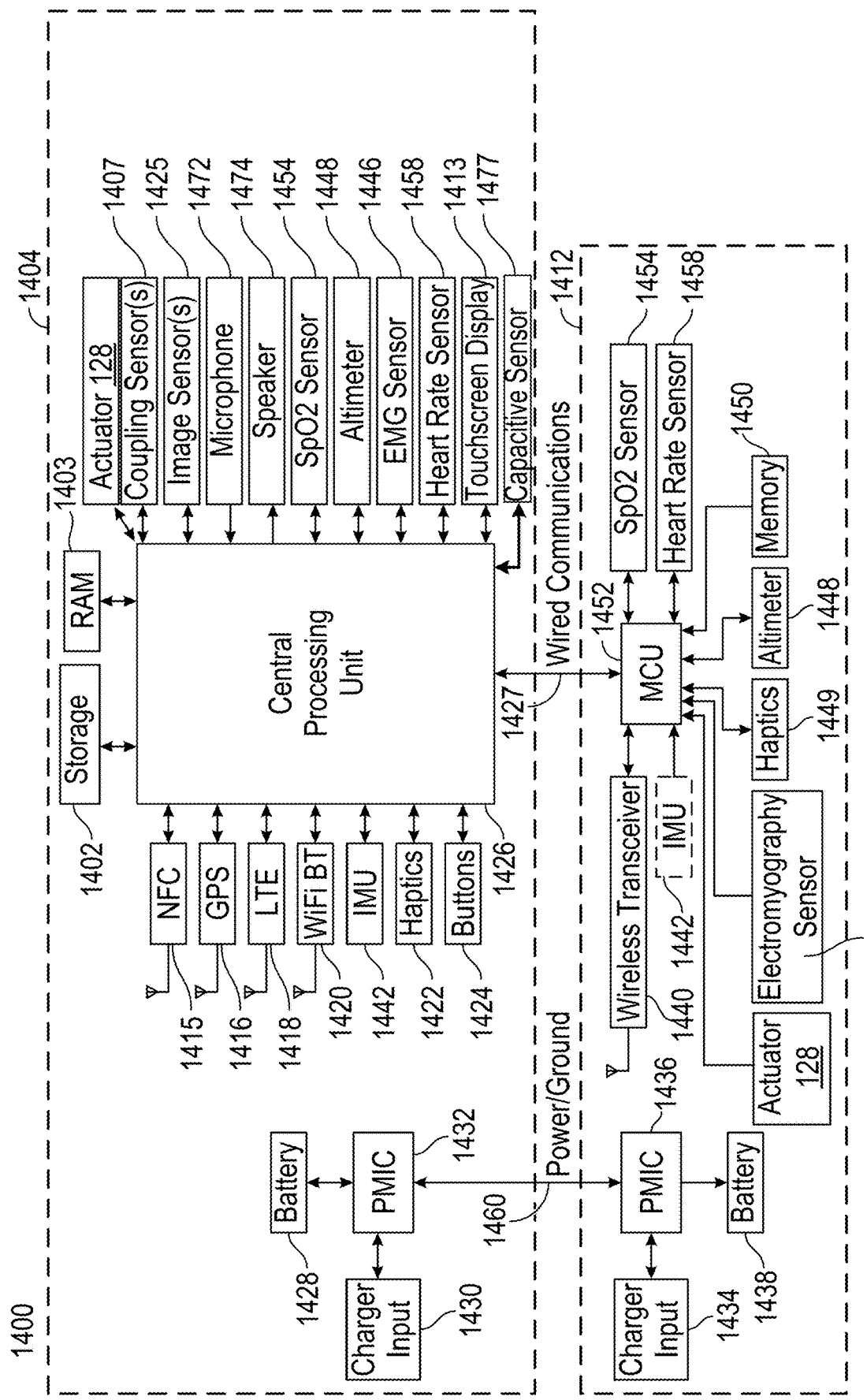
FIG. 14 is one non-limiting block diagram of a wearable device that can be used in conjunction with the methods of adjusting operational characteristics associated with neuromuscular-signal sensors (e.g., by ensuring that an impedance is within a predefined range of impedance values and/or that the impedance is matched with impedances for one or more other neuromuscular-signal sensors), in accordance with some embodiments.

In one illustrative example, the wearable device 110 adjusts the skin-depression depths of the one or more neuromuscular-signal sensors 126 to control a respective impedance at each neuromuscular-signal sensor. In addition to, or as an alternative to adjusting skin-depression depths, other operational characteristics can also be adjusted to cause impedance changes (including electrical changes to one or more components or an analog front-end of a neuromuscular signal sensor). Respective impedance changes can also be achieved, in some embodiments, by adjusting one or more other operational characteristics, such as a contact area change (e.g., adjusting how much of a surface area on a respective sensor that is in contact with the user's skin), band-fit change or band-tightness change (e.g., by squeezing onto a user's skin, loosening from the user's skin, etc.), or pressure or rigidity of the neuromuscular-signal sensors 126 based on actuation of a coupled actuator 128. The operational characteristics can also be adjusted to account for a surface structure change (e.g., changes to neuromuscular-signal sensors 126 over time such as changes caused by wear and tear, deformation, etc.), temperature changes (e.g., an internal or external temperature at a respective sensor), movement artifacts, electrode lift-off events, etc. Different operational characteristics can also be adjusted for different neuromuscular-signal sensors (e.g., a skin-depression depth can be adjusted for a first neuromuscular-signal sensor, a first type of electrical operational characteristic can be adjusted for a second neuromuscular-signal sensor, and a second type of electrical operational characteristic can be adjusted for a third neuromuscular-signal sensor). The same is true for groups of neuromuscular-signal sensors (different operational characteristics can also be adjusted for different groups of neuromuscular-signal sensors). Continuing the illustrative example of adjusting skin-depression depths, the wearable device 110 includes a wearable structure (which can include a band portion 112 and the capsule portion 114; in certain embodiments, the wearable structure is only the band portion 112 and a cradle that receives the capsule portion 114, but the capsule portion itself is not necessarily part of the wearable structure) configured to be worn by a user around the user's skin 137, the one or more neuromuscular-signal sensors 126 (e.g., neuromuscular-signal sensors 126a-126n) coupled to the wearable structure, one or more actuators 128 (e.g., actuators 128a-128n) coupled to the one or more neuromuscular-signal sensors 126, and one or more processors (e.g., central processing unit 1426 and MCU 1452; FIG. 14).

The wearable structure has an interior surface (which can include an interior band surface 112b, as well as an interior capsule surface 114b of the capsule portion) and an exterior surface (which can include an exterior band surface 112a, as well as an exterior capsule surface 114a of the capsule portion). The interior surface is configured to contact the user's skin 137 when the wearable device 110 is donned by the user. In some embodiments, the wearable structure has adjustable length and is configured to wrap around a user's wrist (e.g., dorsal wrist portion and ventral wrist portion). In some embodiments, the wearable structure has a fixed size (e.g., fixed circumferential size when the wearable structure surrounds a user's wrist when worn) so that the location of the one or more neuromuscular-signal sensors 126 over the user's skin 137 is same for different users each having substantially the same wrist circumference size. The wearable structure can be manufactured to have fixed sizes, each associated with a different wrist circumference size.

In some embodiments, each neuromuscular-signal sensor 126 of the one or more neuromuscular-signal sensors 126a-126n aligns along a distinct widthwise segment of the interior band surface 112b. In some embodiments, at least two sensors are aligned along the widthwise segment of the interior surface 112b to form a respective pair of neuromuscular-signal sensors (e.g., a first pair of neuromuscular-signal sensors 126a and 126b and a second pair of neuromuscular-signal sensors 126m and 126n shown in FIG. 1C). In some embodiments, each neuromuscular-signal sensor 126 of the one or more neuromuscular-signal sensors 126a-126n contacts the user's skin 137 when the wearable device 110 is donned by the user. Contact of the neuromuscular-signal sensors with the user's skin can mean that each respective sensor depresses into the user's skin 137 to a certain skin-depression depth or can mean that each respective sensor contacts but does not depress into the user's skin 137 (e.g., the sensors can be flat sensors), or combinations thereof (e.g., some sensors depress into the user's skin and some do not). Each neuromuscular-signal sensor 126, when contacting the user's skin 137, is configured to detect neuromuscular signals.

In some embodiments, to accurately sense neuromuscular signals (e.g., 90% or higher true positive rate and/or 5% or lower false positive rate), one or more operational characteristics of respective neuromuscular-signal sensors (or groups of sensors) is (are) adjusted to ensure that impedance at each respective sensor (or group of sensors) is (are) within a predefined range of impedance values. In some embodiments, the predefined range of impedance values is between 2-10 MΩ for a short period of time when hand gestures or hand poses are being detected (e.g., during a short period of time while the gestures are being detected, such as less than a second, less than 30 ms, less than 15 ms, etc.). In some embodiments, the predefined range of impedance values can be 2-15 MΩ. A broader range can be useful when detecting certain types of hand gestures (e.g., a thumb-to-index-finger gesture) that are easier to detect, so additional noise due to a more varying impedance can be tolerated. A broader range can also be utilized to maintain a desired broader impedance range during an extended period of time (e.g., during normal use of the wearable device) so that once gestures are being detected, slighter adjustments can be made to the narrower ranges of impedance values necessary for accurate detection of hand gestures or hand poses based on neuromuscular signals. In some embodiments, the predefined range of impedance values can be 500 kΩ-5 MΩ. In some embodiments, the predefined range of impedance values is narrower, such as 2-5 MΩ. In some embodiments, the predefined range of impedance values is further narrower, such as 2-3 MΩ. The above examples are non-limiting; different predefined ranges of impedance values can also be used to achieve the advantages identified herein. In some embodiments, different ranges of predefined impedance values are utilized at different points in time (e.g., broader range is utilized during normal use and when hand gestures and hand poses are not being actively detected to control operations and a narrower range can be utilized once hand gestures or hand poses are being actively detected).

In addition to, or as an alternative to, maintaining an impedance within a predefined range of impedance values, in some embodiments, to accurately sense neuromuscular signals, an impedance match between at least two neuromuscular-signal sensors can also be maintained, taking into account a predetermined impedance-mismatch tolerance. In some embodiments, the predetermined impedance-mismatch tolerance is less than 200 kΩ. In other words, an impedance mismatch between at least two neuromuscular-signal sensors is only recognized once respective impedances between two neuromuscular-signal sensors (or between groups of sensors) are determined to differ by a value that is greater than or equal to 200 kΩ. Additionally, or alternatively, to the use of a predetermined impedance-mismatch tolerance, in some embodiments, a predetermined neuromuscular-signal noise threshold can be utilized, which takes into account that neuromuscular signals can be accurately sensed when less than the predetermined neuromuscular-signal noise threshold is present in sensed/detected neuromuscular signals, which can be determined by looking at whether a detected neuromuscular signal includes a signal-noise value that is less than or equal to a neuromuscular-signal noise threshold (e.g., the predetermined neuromuscular-signal noise threshold or tolerance can be in a range between 15 μVrms to 30 μVrms, such as 15 μVrms-20 μVrms, about 15 μVrms (+/−1 μVrms), or about 20 μVrms (+/−1 μVrms)). In one example, if a neuromuscular-signal is expected to be sensed at around 100 μVrms, but a detected neuromuscular signal is actually detected at 140 μVrms, then it can be determined that a signal noise level is too high because it is greater than the predetermined neuromuscular-signal noise threshold (in this example the signal noise is about 40 μVrms, which is outside of the range of values for the predetermined neuromuscular-signal noise threshold). In some embodiments, the neuromuscular-signal noise threshold is selected such that it includes a baseline or average magnitude of neuromuscular signals that allow for accurate detection of hand gestures and hand poses (which threshold can be defined during manufacture, or a particular user's use of the wearable device over time). In some embodiments, the predefined range of impedance values and/or the predetermined impedance-mismatch tolerance is defined such that the neuromuscular-signal noise threshold would be between 15 μVrms to 30 μVrms.

In some embodiments, a skin-sensor interface impedance value (impedance measured near a point on the sensor where it contacts a user's skin, which can be referred to as impedance for simplicity) of a neuromuscular-signal sensor 126 is based on a skin-depression depth of the neuromuscular-signal sensor. For example, an impedance value at a neuromuscular-signal sensor 126 can change when the user's skin 137 experiences moisture (e.g., water from rain, swimming, washing hands, etc.), when the user's skin 137 sweats (e.g., sweat from a strenuous workout or heat), when a hair follicle interacts with a neuromuscular-signal sensor 126 (e.g., due to movement of hair), or when the user's actions cause the neuromuscular-signal sensor 126 to move. If the impedance value at the neuromuscular-signal sensor 126 falls outside the predefined range of impedance values and/or if an impedance mismatch between neuromuscular-signal sensor 126 and at least one other neuromuscular-signal sensor 126 falls outside of the predetermined impedance-mismatch tolerance, a skin-depression depth of the neuromuscular-signal sensor 126 can be adjusted using the one or more actuators 128 such that the neuromuscular-signal sensor 126 accurately detects neuromuscular signals, as shown and described below in reference to FIGS. 2A-6B. Changes in impedance values can also be caused by changes in a contact area between the user's skin 137 and a neuromuscular-signal sensor 126, compression of the a neuromuscular-signal sensor 126, pressure or rigidity of the neuromuscular-signal sensors 126 based on actuation of a coupled actuator (e.g., a non-rigid neuromuscular-signal sensor or flat electrode as shown in reference to FIG. 8A), a surface structure change at a neuromuscular-signal sensor 126 (e.g., changes that occur to the neuromuscular-signal sensor 126 over time, such as wear and tear), a band-fit change or band-tightness change of a wearable device (e.g., bending and flexing), temperature changes, and/or other physical or environmental changes. In some embodiments, a change in the impedance values at a neuromuscular-signal sensor 126 is detected automatically, without any user input. While skin-depression depth is one illustrative example, as noted previously, skin-depression depth is one example of operational characteristics that can be adjusted to cause impedance changes, but other examples of operational characteristics that can be adjusted to cause impedance changes are also contemplated (some of these examples related to electrical characteristic changes and were mentioned previously, so, for brevity's sake, will not be repeated here).

Figure 15A:
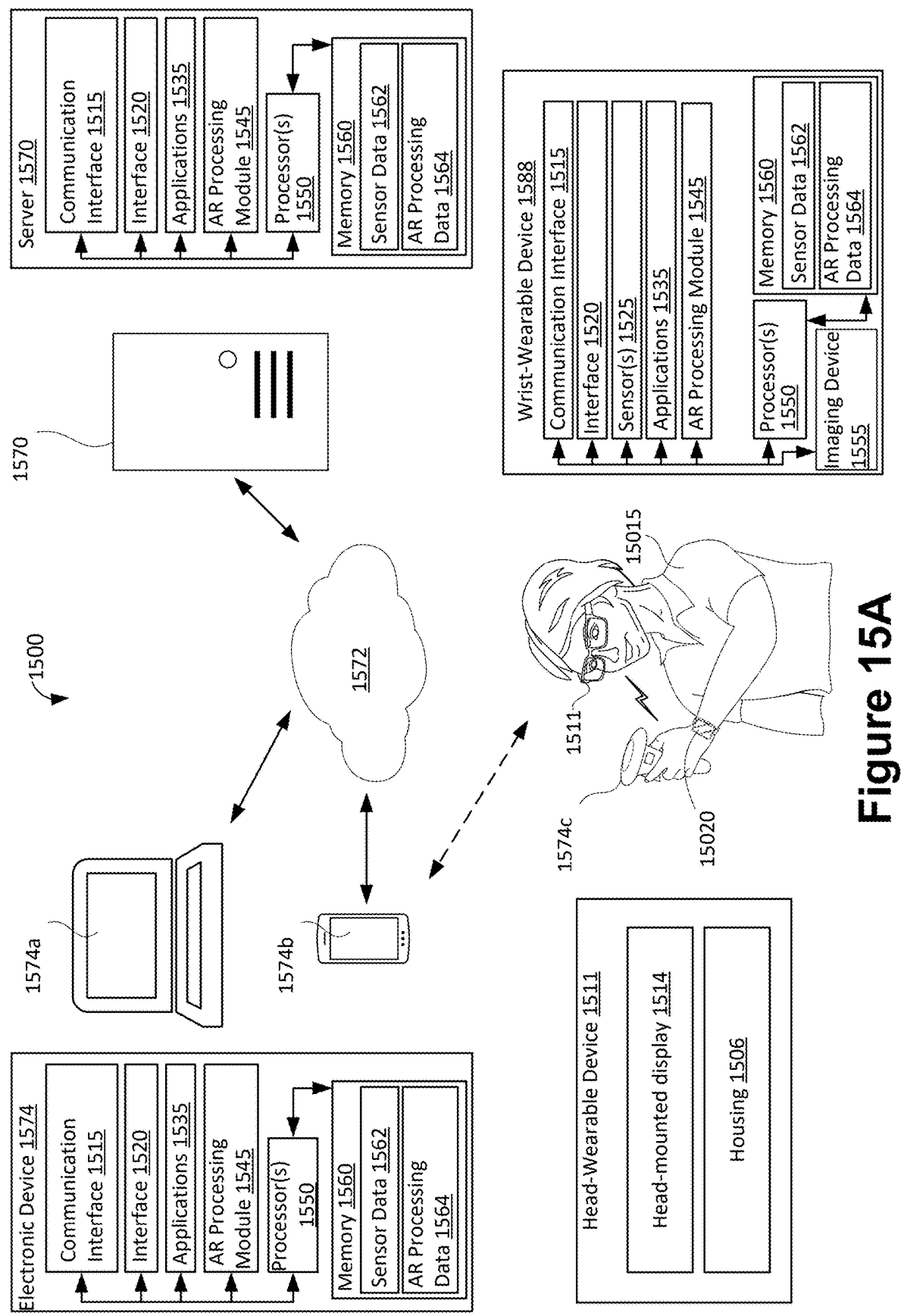
FIGS. 15A and 15B are block diagrams illustrating an example artificial-reality system in accordance with some embodiments.
Figure 15B:
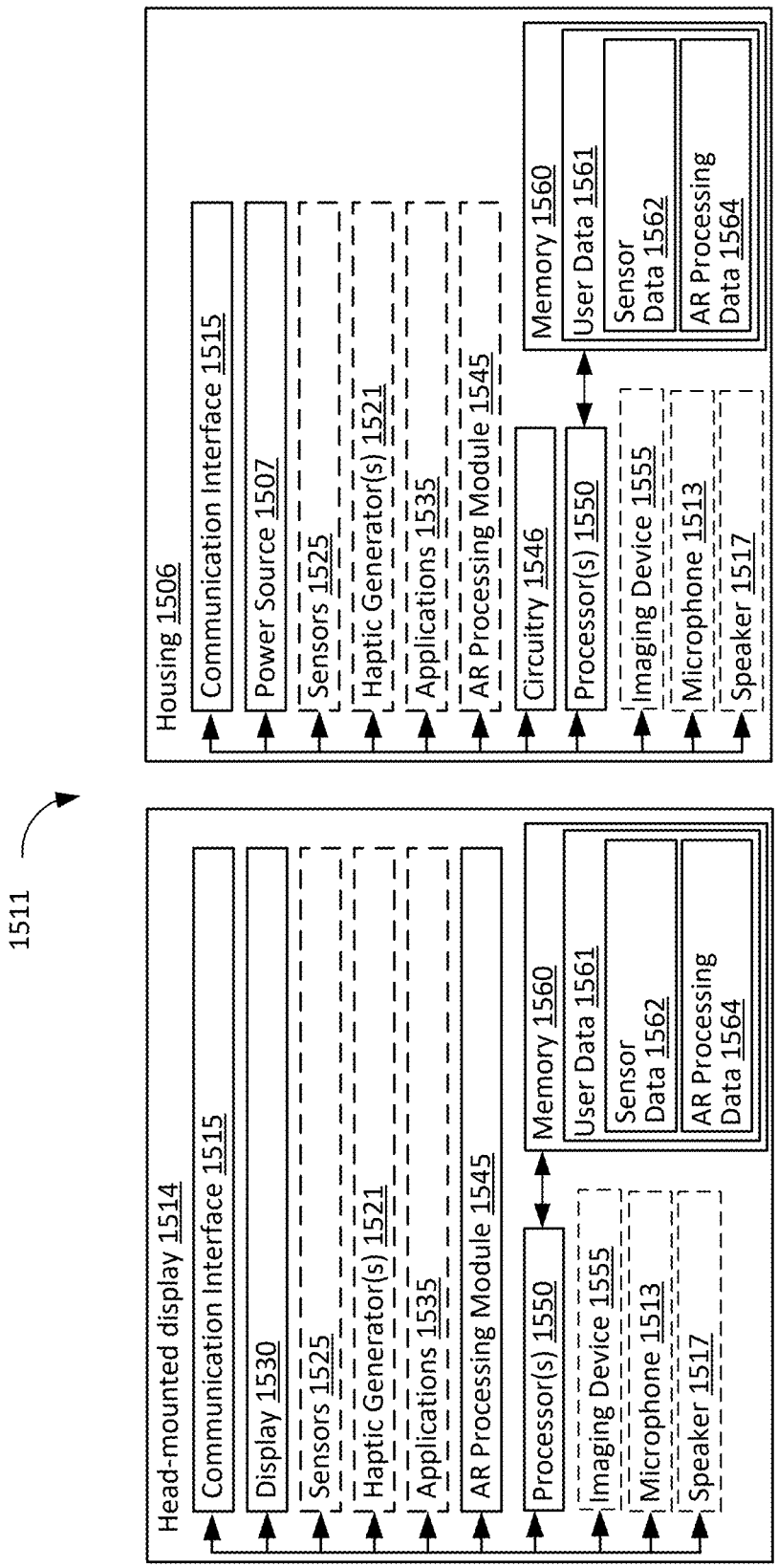

The impedance-adjustment techniques for the wrist-wearable devices 110 can be used to ensure that in-air hand gestures to control a head-wearable device (e.g., head-wearable device 1511; FIGS. 15A and 15B) will be detected with a sufficiently high level of accuracy (e.g., 90% or higher true positive rate, 5% or lower false positive rate). A change in the accuracy percentage can be a trigger condition that causes the impedance-adjustment techniques to be employed at the wrist-wearable device 110 to ensure that the in-air hand gestures are detected with the sufficiently high level of accuracy In some embodiments, the one or more neuromuscular-signal sensors 126 have a spherical cap shape formed or coated using a conductive material. In some embodiments, a neuromuscular-signal sensor 126 is a gold-plated electrode, a soft electrode (e.g., soft gold electrode), a silver-plated electrode, or a diamond coated electrode. In some embodiments, the one or more neuromuscular-signal sensors 126 are formed using the same material or a combination of different materials. For example, a first set of the one or more neuromuscular-signal sensors 126 can be gold plated electrodes, a second set of the one or more neuromuscular-signal sensors 126 can be soft electrodes, and a third set of the one or more neuromuscular-signal sensors 126 can be silver plated electrodes. In some embodiments, one or more of the neuromuscular-signal sensors 126 can be flat electrodes that do not extend beyond an interior surface of the band portion of the wearable device (in such embodiments, rather than using a skin-depression depth, the band can be tightened to bring the flat sensors into closer contact with the user's skin and/or electrical adjustments can be made to operational parameters for achieving the various impedance adjustments described herein).

The one or more processors (e.g., central processing unit 1426 and MCU 1452; FIG. 14) monitor a skin-sensor interface impedance value at the one or more neuromuscular-signal sensors 126. As mentioned above, an impedance value at a neuromuscular-signal sensor 126 impacts the neuromuscular-signal sensor's ability to sense neuromuscular signals. In some embodiments, in response to the one or more processors detecting a change in an impedance value at a neuromuscular-signal sensor 126 that causes the impedance value of the neuromuscular-signal sensor 126 to be outside of a predefined range of impedance values (and/or an impedance mismatch between the neuromuscular-signal sensor 126 and at least one other neuromuscular-signal sensor 126 that is greater than or equal to a predetermined impedance-mismatch tolerance (e.g., 200 kΩ)), the one or more processors can cause the neuromuscular-signal sensor 126 (and/or another neuromuscular-signal sensor) to move, adjusting the skin-depression depth of the neuromuscular-signal sensor 126 (and/or another neuromuscular-signal sensor). In some embodiments, causing the neuromuscular-signal sensor 126 to move can include moving the neuromuscular-signal sensor 126 itself manually or moving other components that then cause the sensor to move positionally. For example, using actuators 128 (e.g., actuator 128*a* coupled to neuromuscular-signal sensor 126*a*, described in more detail below) to adjust positions for individual neuromuscular-signal sensors 126 or groups of neuromuscular-signal sensors 126, adjusting a tightness (by either loosening or tightening) of at least a portion of the wearable structure to cause the neuromuscular-signal sensors 126 at that portion of the band to adjust their respective skin-depression depths. Moving can also mean adjusting a neuromuscular-signal sensor 126 to one or a number of different skin-depression depths to allow the wearable device 110 to find a new skin-depression depth at which the neuromuscular-signal sensors 126 then have an impedance within the predefined range of impedance values (and/or an impedance match with another neuromuscular-signal sensor 126 that is less than a predetermined impedance-mismatch tolerance). By causing the neuromuscular-signal sensor 126 (and/or another neuromuscular-signal sensor) to move, the one or more processors adjust an impedance value at the neuromuscular-signal sensor 126 such that the neuromuscular-signal sensor 126 can accurately sense neuromuscular signals. In some embodiments, the neuromuscular-signal sensor 126 can be adjusted to a skin-depression depth between 0.01 mm to 1.2 mm. In some embodiments, the neuromuscular-signal sensor 126 can be adjusted to a skin-depression depth of at least 5 mm. Additional examples of different skin-depression depths of a neuromuscular-signal sensor 126 are provided below in reference to FIG. 1. For embodiments utilizing flat electrodes, other operational characteristics (besides skin-depression depth) can be adjusted to achieve impedance adjustments (e.g., including adjustments to electrical characteristics and/or adjusting the percentage of a surface area of the flat electrode that is in contact with the user's skin to increase or decrease that percentage as appropriate to cause a desired impedance change).

Moving the one or more neuromuscular-signal sensors 126 can include causing an actuator 128 (e.g., actuators 128*a*-128*n*) coupled to the respective neuromuscular-signal sensor to move. In some embodiments, the one or more actuators 128 (e.g., actuators 128*a*-128*n*) are electrostatic zipping actuators that are actuated via an applied electrical voltage. For example, a first electrical voltage applied to an electrostatic zipping actuator can cause the electrostatic zipping actuator to acuate to a first position, and a second electrical voltage, distinct from the first electrical voltage, applied to the electrostatic zipping actuator can cause the electrostatic zipping actuator to acuate to a second position distinct from the first position. The second position can be an expanded position in which the actuator pushes the sensor closer to the user's skin such that the sensor has a higher percentage of its surface area in contact with a portion of the user's skin (e.g., for a flat electrode) or the sensor is caused to depress further into the portion of the user's skin (e.g., for an electrode that extends beyond an interior surface of the band of a wearable device).

In other embodiments, the one or more actuators 128 are pneumatically controlled actuators (e.g., actuators moved by gas or pressurized air). For example, in some embodiments, the neuromuscular-signal sensor 126 is coupled to a bladder that is fluidically coupled to the pneumatic actuator. Alternatively, or additionally, in some embodiments, the actuator 128 controls a fluidically-controlled actuator (e.g., an actuator that is operated via a fluid, such as any type of liquid or gaseous matter that is within the wearable structure of the wearable device 110). In some embodiments, a fluid of the fluidically-controlled actuator is introduced into the actuator via a mechanical input on the wearable device (e.g., pressing a button on wearable device to inflate the band).

Although the wrist cross-section 111 in FIG. 1 illustrates one example with six pairs of sensors along the interior surface 112*b* (e.g., neuromuscular-signal sensors 126*a*, 126*c*, 126*g*, 126*i*, 126*k*, and 126*m* and their respective neuromuscular-signal sensor pair (not shown)), there can be various configurations for pairs of sensors along the interior surface 112*b*. For example, more than four pairs of sensors can be along the interior surface 112*b* (e.g., the wearable device 110 with at least six pairs of sensors, eight pairs, ten pairs, twelve pairs, fourteen pairs, or sixteen pairs of sensors, etc.). In some embodiments, the capsule portion 114 and/or the band portion 112 house the one or more processors as described below in reference to FIGS. 12A-13. The capsule portion 114 can be a component part of the wearable structure (which can also include a band portion 112 and a cradle portion, as noted above). In particular, the capsule portion 114 is configured to be positioned on top of the user's wrist or forearm when the user is donning/wearing the wearable structure (with the band portion 112 surrounding a remainder of the user's wrist). In some embodiments, the capsule portion 114 includes one or more neuromuscular-signal sensors 126 such that when the capsule portion 114 is coupled to the wearable structure (either directly or by way of a removable connection to a cradle portion of the wearable structure), the one or more neuromuscular-signal sensors 126 of the capsule portion 114 (e.g., at least neuromuscular-signal sensors 126c and 126g) operate in conjunction with neuromuscular-signal sensors 126 of a band portion 112 of the wearable structure.

While some of the examples discussed herein refer to the capsule portion 114 including a certain number of pairs of neuromuscular-signal sensors 126 (e.g., two pairs of neuromuscular-signal sensors 126 and a pair of ground and shield sensors 126e and 126f (not shown)) and the band portion 114 also includes a certain number of pairs of neuromuscular-signal sensors 126 (e.g., four pairs of neuromuscular-signal sensors), one of skill in this art will appreciate that this example arrangement could be altered such that some of the pairs of neuromuscular-signal sensors on the capsule portion 114 are coupled with a cradle portion of the wearable structure instead (such that all or a portion of the pairs of electrodes are on the capsule and a remainder (or no) neuromuscular-signal sensors are coupled to the capsule).

FIG. 1 also depicts a first pair of neuromuscular signal sensors 150 (e.g., neuromuscular-signal sensors 126a and 126b of the wearable device 110), in accordance with some embodiments. As described above in reference to FIG. 1A, the first neuromuscular-signal sensor pair 150 is positioned along a first widthwise segment of the interior surface 112b of the wearable device. When the wearable device is donned by the user, the first neuromuscular-signal sensor pair 150 contacts the user's skin 137. In some embodiments, each neuromuscular-signal sensor 126a and 126b of the first neuromuscular-signal sensor pair 150 is configured to contact the user's skin by depressing a portion of a user's skin 137 to a respective skin-depression depth, when the wearable device 110 is worn by the user. For example, each neuromuscular-signal sensor 126a and 126b of the first neuromuscular-signal sensor pair 150 depresses a portion of a user's skin 137 to a first skin-depression depth, d1.

FIG. 1, on the right-hand side, depicts a second pair of neuromuscular-signal sensors 160 (e.g., neuromuscular-signal sensors 126m and 126n of the wearable device 110), in accordance with some embodiments. As described above in in reference to FIGS. 1A-1B, the second neuromuscular-signal sensor pair 160 is positioned along a distinct widthwise segment of the interior band surface 112b of the wearable device 110 (e.g., a second widthwise segment of the interior surface 112b distinct from the first widthwise segment of the interior surface 112b). In some embodiments, each neuromuscular-signal sensor 126m and 126n of the second neuromuscular-signal sensor pair 160 is configured to depress a portion of a user's skin 137 to a respective skin-depression depth, when the wearable device 110 is worn by the user. In some embodiments, the respective skin-depression depth of each neuromuscular-signal sensor 126m and 126n of the second neuromuscular-signal sensor pair 160 is adjustable via one or more actuators (e.g., actuators 128, and 128n) coupled to the second neuromuscular-signal sensor pair 160. In some embodiments, each neuromuscular-signal sensor 126 is individually adjustable. For example, a first neuromuscular-signal sensor 126m of the second neuromuscular-signal sensor pair 160 depresses a portion of a user's skin 137 to a first depression depth (d1) and a second neuromuscular-signal sensor 126n of the second neuromuscular-signal sensor pair 160 is moved, via a respective actuator 128n, such that it depresses a portion of a user's skin 137 to a second depression depth (d2) distinct from the first depression depth (d1). In some embodiments, a skin-depression depth of neuromuscular-signal sensor 126 can be the same or distinct within a respective pair of neuromuscular-signal sensors (in one example, pairs of the sensors can be moved together to different skin-depression depths, such as by having one actuator coupled to each of the two sensors). In some embodiments, skin-depression depths of neuromuscular-signal sensor 126 between different pairs of neuromuscular-signal sensors can be the same or distinct. As described in detail below in reference to FIGS. 2A-6B, the different skin-depression depths of the neuromuscular-signal sensors 126 are adjusted such that impedance values of the one or more neuromuscular-signal sensors 126 can be adjusted to be within the predefined range such that neuromuscular signals can be accurately sensed.

As described below in reference to FIGS. 2A-2E, based on a determination (e.g., by one or more processors) that a first change in an impedance value at a neuromuscular-signal sensor of a pair of neuromuscular-signal sensors is outside of a predefined range of impedance values, a skin-depression depth of one or more neuromuscular-signal sensors of the pair of neuromuscular-signal sensors is adjusted such that the impedance value at the neuromuscular-signal sensor of the pair of neuromuscular-signal sensors is within the predefined range of impedance values. In some embodiments, impedance values are determined based one or more electrical properties (e.g., voltage, current, frequency, etc.) of neuromuscular signals provided, via neuromuscular-signal sensors 126, to one or more processors (e.g., central processing unit 1426 and MCU 1452; FIG. 14). The one or more processors continuously receive neuromuscular signals from the neuromuscular-signal sensors 126 and monitor the impedance values based on the received neuromuscular signals. Alternatively, in some embodiments, the one or more processors periodically receive neuromuscular signals (e.g., every 1 ms, 10 ms, 100 ms, etc.) from the neuromuscular-signal sensors 126 and monitor the impedance values based on the received neuromuscular signals. In some embodiments, the impedance can be monitored indirectly by measuring baseline noise detected by respective neuromuscular-signal sensors (e.g., other types of electrical-signal noise, other than that created by neuromuscular signals, that can be detected (picked up or sensed) by the respective neuromuscular signal sensors).

Figure 3A:
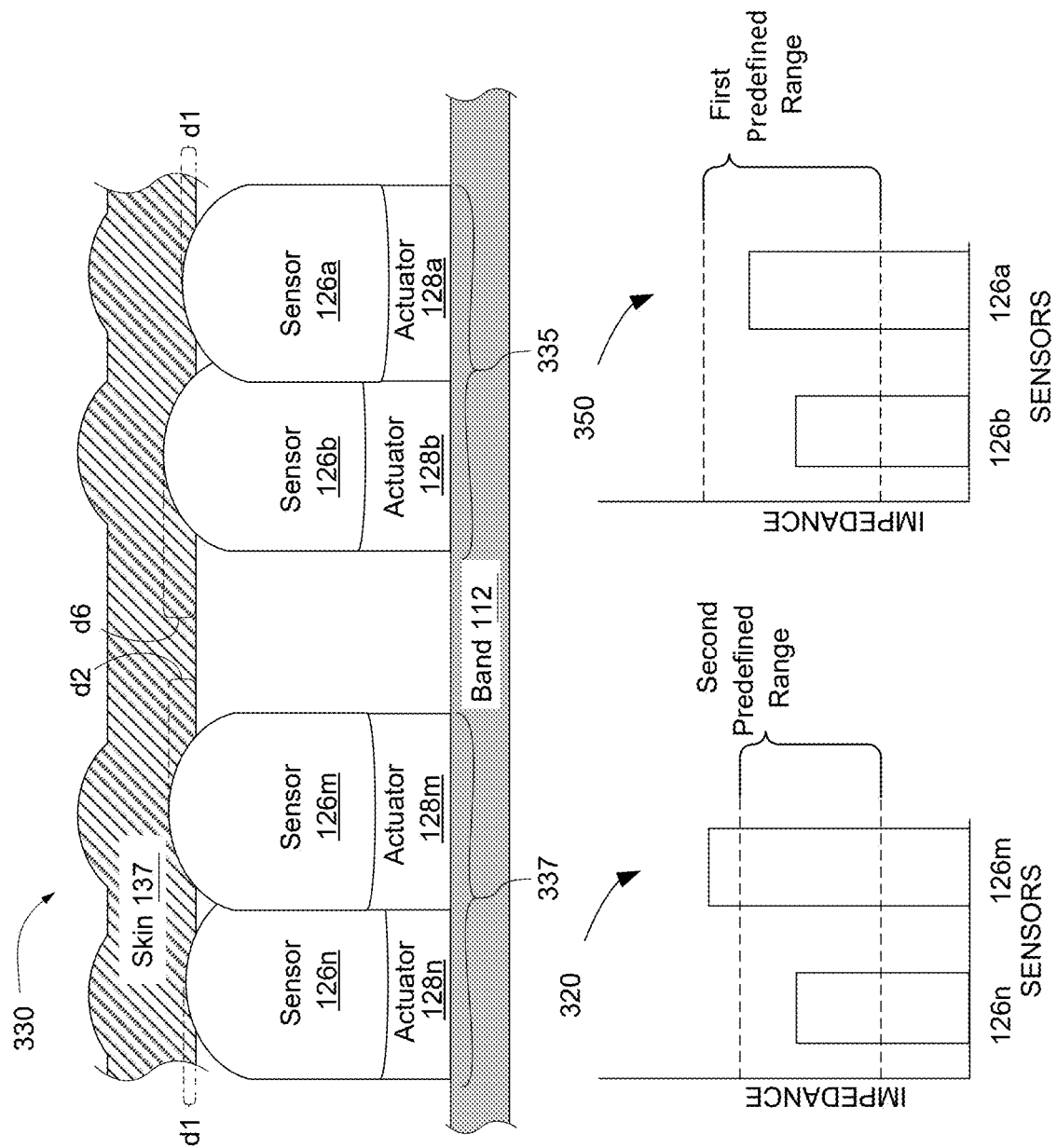
FIGS. 3A and 3B illustrate cross-sectional views of first and second widthwise segments of the interior surface of the wearable device and adjustments to skin-depression depths of individual neuromuscular-signal sensors and/or pairs of neuromuscular-signal sensors at the first and second widthwise segments of the interior surface of the wearable device, based on measured impedance values, in accordance with some embodiments.
Figure 3B:
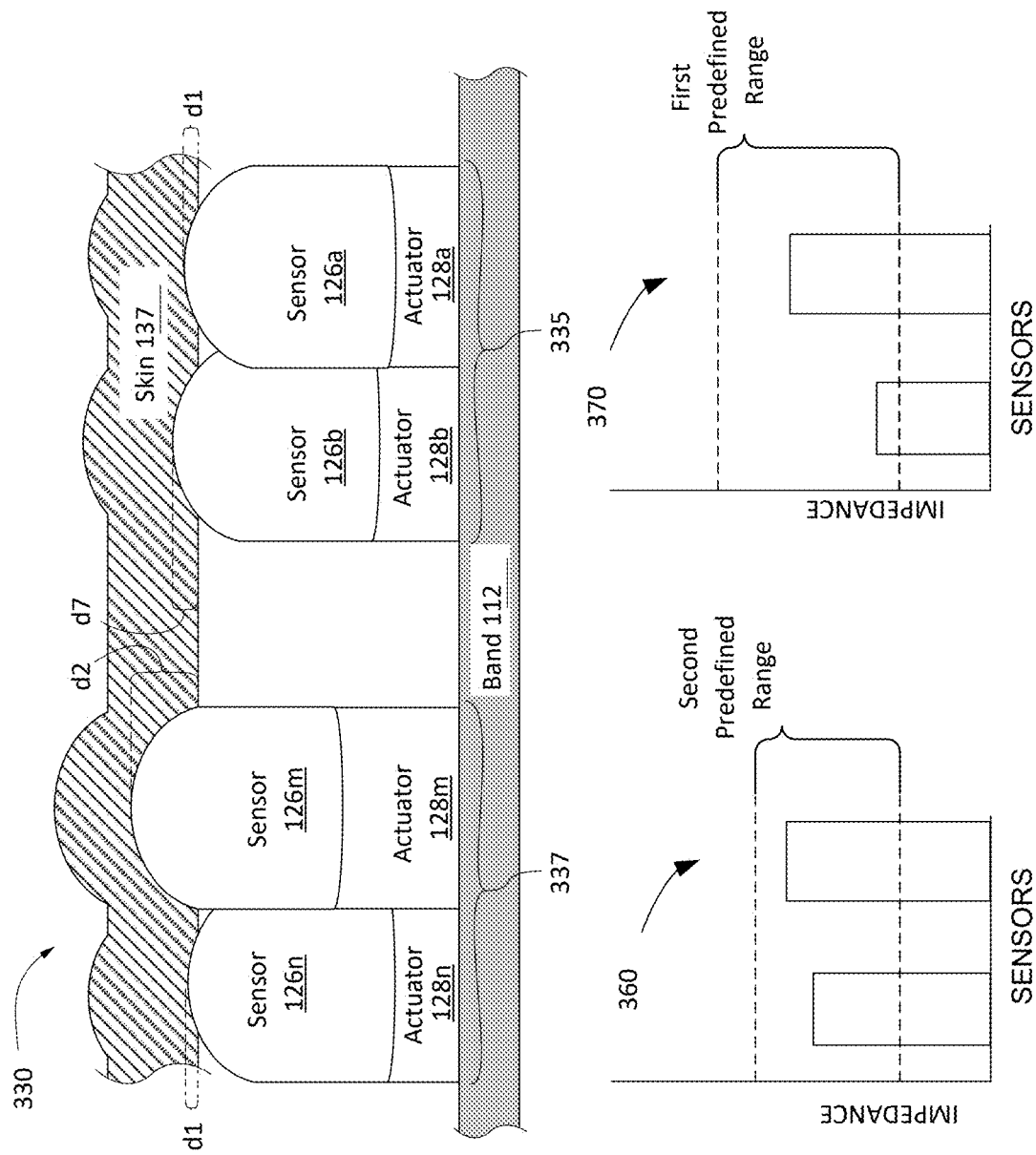

As described below in reference to FIGS. 4A-4D, based on a determination (e.g., by one or more processors) that an impedance mismatch between at least two neuromuscular-signal sensors of a pair of neuromuscular-signal sensors is greater than or equal to a predetermined impedance-mismatch tolerance, a skin-depression depth of one or more neuromuscular-signal sensors of the pair of neuromuscular-signal sensors is adjusted such that the impedance mismatch between at least two neuromuscular-signal sensors of the pair of neuromuscular-signal sensors is less than the predetermined impedance-mismatch tolerance (e.g., an impedance mismatch less than 200 kΩ). As shown between FIGS. 2A-2E, although the skin-depression depths of one or more neuromuscular-signal sensors 126 may not change in some scenarios, their respective impedance values can change due to the movement by a user, rebalancing of the positions and/or skin depression depths of the neuromuscular-signal sensors 126 on the user's skin, changes over time, and/or other factors. For example, in FIGS. 2A and 2B, although neuromuscular-signal sensor 126b does not move from a first skin-depression depth of d1, the impedance value associated with neuromuscular-signal sensor 126b does change (e.g., as reflected in second impedance graph 225) due to, at least, adjustments to a skin-depression depth of neuromuscular-signal sensor 126a from a first skin-depression depth d1 to a second skin-depression depth d2. In some scenarios, the impedance values at neuromuscular-signal sensors 126 that are not adjusted (e.g., skin-depression depths are not changed) remain unchanged. For example, as shown in FIGS. 3A and 3B, the impedance values of neuromuscular-signal sensor 126n remain unchanged when the skin-depression depth of neuromuscular-signal sensor 126m is adjusted.

FIGS. 2A-2E illustrate a cross-sectional view of a first widthwise segment of the interior surface 112b of the wearable device 110 and adjustment of skin-depression depths of one or more neuromuscular-signal sensors of a pair of neuromuscular-signal sensors, in accordance with some embodiments. Specifically, FIGS. 2A-2E depict different adjustments to skin-depression depths of one or more neuromuscular-signal sensors of the pair of neuromuscular-signal sensors based on a determination that at least one neuromuscular-signal sensor of the pair of neuromuscular-signal sensors has measured impedance values outside of a predefined range of impedance values.

In FIG. 2A, a first cross-sectional view 210 of a first widthwise segment of the interior surface 112b of the wearable device 110 illustrates a first neuromuscular-signal sensor 126a and a second neuromuscular-signal sensor 126b of the pair of neuromuscular-signal sensors. The first neuromuscular-signal sensor 126a and the second neuromuscular-signal sensor 126b depress respective portions of a user's skin to a first skin-depression depth (d1). At the first skin-depression depth, the first neuromuscular-signal sensor 126a has a first impedance value and the second neuromuscular-signal sensor 126b has a second impedance value.

As shown by first impedance graph 215, the first impedance value of the first neuromuscular-signal sensor 126a is outside of a predefined range of impedance values (described above in reference to FIG. 1) and the second impedance value of the second neuromuscular-signal sensor 126b is within the predefined range of impedance values. In some embodiments, an impedance value of a neuromuscular-signal sensor 126 can fall outside of the predefined range of impedance values due to a detected change in the impedance at respective neuromuscular-signal sensors 126 (e.g., a change caused by moisture at the user's skin 137, user movement, interference between the user's skin 137 and the neuromuscular-signal sensor 126 (e.g., hair, dirt, or any other foreign object contacting or positioned between the neuromuscular-signal sensor 126 and the user's skin 137; in some embodiments, a foreign object is any object other than the user's skin 137 and a neuromuscular-signal sensor 126), a user sweating, or other examples provided above in reference to FIG. 1). Additionally, or alternatively, in some embodiments, an impedance value of a neuromuscular-signal sensor 126 can fall outside of the predefined range of impedance values due to the neuromuscular-signal sensor 126's position or relative movement on the user's skin 137 (e.g., poor contact with the user's skin 137, position over a user's bone that provides poor signal readings, and/or improper placement of the neuromuscular-signal sensor 126 on the user's skin 137).

In some embodiments, in response to the wearable device 110 determining that an impedance value measured at an neuromuscular-signal sensor 126a is outside of the predefined range of impedance values (e.g., as shown by the first impedance value of the first neuromuscular-signal sensor 126a in the first impedance graph 215), the wearable device 110 causes the neuromuscular-signal sensor to move until the neuromuscular-signal sensor depresses the portion of the user's skin to a different skin-depression depth that is distinct from the initial skin-depression depth. For example, as shown and discussed in detail below in reference to FIG. 2B, the wearable device 110 can cause the first neuromuscular-signal sensor 126a to move until the first neuromuscular-signal sensor 126a depresses the portion of the user's skin 137 to a second skin-depression depth (d2) that is distinct from the first skin-depression depth (d1). As mentioned previously, skin-depression depths are one example of an operational characteristic associated with neuromuscular-signal sensors that can be adjusted to cause desired impedance changes, but other operational characteristics (e.g., electrical operational characteristics associated with an analog front-end of a neuromuscular-signal sensor) can also or alternatively be adjusted to cause the desired impedance changes. Causing the neuromuscular-signal sensor to move includes causing an actuator to move the neuromuscular-signal sensor into the user's skin 137 (for embodiments in which the sensors 126 are flat electrodes, the moving can cause a change in how much of a surface area of the flat electrode is in contact with the user's skin, rather than causing a change in a skin-depression depth). For example, the first neuromuscular-signal sensor 126a can be caused to move via a first actuator 128a. In some embodiments, the first neuromuscular-signal sensor 126a depresses the user's skin 137 to a number of different skin-depression depths, including the second skin-depression depth, d2, until a determination is made by the wearable device 110 that the impedance value for the first neuromuscular-signal sensor 126a is within the predefined range of impedance values while the first neuromuscular-signal sensor 126a depresses the portion of the user's skin to the different skin-depression depth (e.g., as shown in a second cross-sectional view 220 of the first widthwise segment of the interior surface 112b of the wearable device 110 and a second impedance graph 225 of FIG. 2B).

In some embodiments, moving a neuromuscular-signal sensor 126 to a different skin-depression depth includes moving the neuromuscular-signal sensor 126 itself or moving other components that then cause the neuromuscular-signal sensor 126 to move positionally (e.g., sliding the entire band portion 112 of wearable device 110) such that the skin-depression depth for the neuromuscular-signal sensor 126 is adjusted to the different skin-depression depth (e.g., the second skin-depression depth (d2)). In other embodiments, moving the neuromuscular-signal sensor 126 to a different skin-depression depth involves using an actuator 128 (e.g., the first actuator 128b). In some embodiments, moving the neuromuscular-signal sensor 126 includes adjusting positions for individual or groups of neuromuscular-signal sensors 126 (e.g., as described in reference to FIGS. 2A-3B), or adjusting a tightness (by either loosening or tightening) of at least or portion of the band portion 112 to cause the neuromuscular-signal sensors 126 at that portion of the band to adjust their respective skin-depression depths (e.g., using another implementation of the wearable device described below in reference to FIG. 8B) or to change a percentage of a surface area of an electrode that is in contact with a respective portion of the user's skin 137 (e.g., for flat electrodes). Moving neuromuscular-signal sensor 126 can also include adjusting the neuromuscular-signal sensor 126 to one or a number of different skin-depression depths to allow the wearable device 110 to find a new skin-depression depth at which the neuromuscular-signal sensor 126 then has an impedance within the predefined range of impedance values. An instruction to causing the moving (more generally, an adjustment to an operational characteristic to be adjusted to cause a desired impedance change) can be generated at the wearable device itself or can be received from another electronic device (e.g., a smartphone) that is in communication with the wearable device.

As shown in FIG. 2B, an impedance value measured at the second neuromuscular-signal sensor 126b of the pair of neuromuscular-signal sensors is within the predefined range of impedance values at the first skin-depression depth (d1) and an impedance value measured at the first neuromuscular-signal sensor 126a of the pair of neuromuscular-signal sensors is also within the predefined range of impedance values at the second skin-depression depth (d2). In the illustrated example of FIGS. 2A-2B, the first skin-depression depth is less than the second skin-depression depth, which means that the first neuromuscular-signal sensor 126a has been adjusted to have a greater skin-depression depth to put its impedance back within the predefined range of impedance values (shown in FIG. 2B). More generally, the neuromuscular-signal sensor 126 can be moved into the user's skin 137 or moved away from the user's skin 137 such that the measured impedance value at the neuromuscular-signal sensor 126 can be discretely adjusted to cause the impedance to be either higher or lower. The skin-depression depths of the neuromuscular-signal sensors are discretely controlled by the wearable device 110 (which can be caused to make adjustments to operational characteristics associated with various neuromuscular-signal sensors based on an instruction received from another electronic device) to allow for fine-grained control over the impedance values at a neuromuscular-signal sensor 126 by making fine-grained control of the neuromuscular-signal sensor 126's skin-depression depths. As described above, although the skin-depression depth of the second neuromuscular-signal sensor 126b is unchanged, in some scenarios, the impedance values of the second neuromuscular-signal sensor 126b can change due to the adjustments made to the first neuromuscular-signal sensor 126a.

Turning to FIG. 2C, a third cross-sectional view 230 of the first widthwise segment of the interior surface 112b of the wearable device 110 and a third impedance graph 235 are shown. In the third cross-sectional view 230, the wearable device 110 detects a second change in the impedance value at the first neuromuscular-signal sensor 126a and/or the second neuromuscular-signal sensor 126b of the pair of neuromuscular-signal sensors (e.g., a detected impedance value change due to moisture, user sweat, motion artifacts, interference between the user's skin 137 and the neuromuscular-signal sensor 126, and/or other examples provided above). The wearable device 110 (or an electronic device that is communicatively coupled therewith), based on the second detected change in the impedance values (which occurs at a time between when the cross-sections of FIGS. 2B and 2C are observed), determines that the first neuromuscular-signal sensor 126a of the pair of neuromuscular-signal sensors (which is, at the time shown in FIGS. 2B and 2C, depressing the portion of the user's skin 137 to the second skin-depression depth (d2)) has a measured impedance value that has again moved outside of the predefined range of impedance values and also determines that the second neuromuscular-signal sensor 126b of the pair of neuromuscular-signal sensors (which depresses the portion of the user's skin 137 to the first skin-depression depth (d1)) has a measured impedance value within the predefined range of impedance values, as shown in the third impedance graph 235. As described above, although the skin-depression depth of the second neuromuscular-signal sensors 126b does not change, the impedance value of the second neuromuscular-signal sensors 126b can change (e.g., due to movement of the user causing repositioning (or rebalancing) of each neuromuscular-signal sensor 126 of the user's skin 137, etc.). Stated simply, at some time between when the cross sections in FIGS. 2B and 2C are observed, impedance associated with the sensor 126a (which can be an electrode-skin impedance at the interface between a portion of the user's skin and the sensor 126a) has increased to an impedance value that is once again outside of the predefined range of impedance values.

In some embodiments, in response to the wearable device 110 determining that the first neuromuscular-signal sensor 126a of the pair of neuromuscular-signal sensors has a measured impedance value outside of the predefined range of impedance values (based on the detected second change in the impedance values at the first neuromuscular-signal sensor 126a and/or the second neuromuscular-signal sensor 126b of the pair of neuromuscular-signal sensors), the wearable device 110 causes the first neuromuscular-signal sensor 126a to move until the first neuromuscular-signal sensor 126a depresses the portion of the user's skin to a third skin-depression depth (d3) distinct from the second skin-depression depth (d2). While the first neuromuscular-signal sensor 126a depresses the portion of the user's skin to the third skin-depression depth (d3), the impedance value of the first neuromuscular-signal sensor 126a is within the predefined range of impedance values (e.g., as shown in a fourth impedance graph 245 of FIG. 2D). As was mentioned above, a process of moving the sensor 126a to various positions can be employed and the third skin-depression depth (d3) can be selected once a determination is made (either at the wearable device or at an electronic device that is communicatively coupled with the wearable device) that impedance at the sensor 126a is back within the predefined range of impedance values (at that point, the process of moving can be ceased). Additional information on the movement of a neuromuscular-signal sensor 126 is provided above in reference to FIGS. 2A-2B.

Referring to FIG. 2D, a fourth cross-sectional view 240 of the first widthwise segment of the interior surface 112b of the wearable device 110 and the fourth impedance graph 245 are shown. In particular, FIG. 2D shows the positions of the first neuromuscular-signal sensor 126a and the second neuromuscular-signal sensor 126b of the pair of neuromuscular-signal sensors after the adjustment to the operational characteristic associated with sensor 126a (in this example, the adjustment is the movement of the first neuromuscular-signal sensor 126a as described above in reference to FIG. 2C). For example, the fourth cross-sectional view 240 shows the first neuromuscular-signal sensor 126a moved away from the user's skin 137 so that its position adjusts from the second skin-depression depth (d2) to the third skin-depression depth (d3). In some embodiments, the third skin-depression depth is distinct from the first skin-depression depth (d1). Alternatively, in some embodiments, the third skin-depression depth (d3) is the same as the first skin-depression depth (d1). As described above in reference to FIGS. 2A-2B, in some embodiments, the impedance values at the neuromuscular-signal sensors 126 are controlled through a discrete control mechanism such that operational characteristics associated with the neuromuscular-signal sensors 126 can be adjusted (e.g., in one example, the adjustments include moving respective sensors to many other skin-depression depths (such as fourth, fifth, sixth, seventh, etc. skin-depression depths) as needed to ensure that the measured impedance values at the neuromuscular-signal sensors 126 are maintained within the predefined range of impedance values).

FIGS. 2E and 2F illustrate the simultaneous and individual control of the first neuromuscular-signal sensor 126a and the second neuromuscular-signal sensor 126b of the pair of neuromuscular-signal sensors. FIG. 2E shows a fifth cross-sectional view 250 of the first widthwise segment of the interior surface 112b of the wearable device 110 and a fifth impedance graph 255. In the fifth cross-sectional view 250, the wearable device 110 detects a third change in the impedance value at the first neuromuscular-signal sensor 126a and/or the second neuromuscular-signal sensor 126b of the pair of neuromuscular-signal sensors. The wearable device 110, based on the third detected change in the impedance value, determines that the first neuromuscular-signal sensor 126a of the pair of neuromuscular-signal sensors (which depresses the portion of the user's skin 137 to the third skin-depression depth (d3)) has a measured impedance value outside of the predefined range of impedance values and also determines that the second neuromuscular-signal sensor 126b of the pair of neuromuscular-signal sensors (which depresses the portion of the user's skin 137 to the first skin-depression depth (d1)) has a measured impedance value within the predefined range of impedance values, as shown in the fifth impedance graph 255.

In some embodiments, the wearable device 110 can move each neuromuscular-signal sensor of the pair of neuromuscular-signal sensors such that the neuromuscular-signal sensors of the pair of neuromuscular-signal sensors are within the predefined range of impedance values. In some embodiments, each neuromuscular-signal sensor is simultaneously moved (e.g., the neuromuscular-signal sensors are moved together). Alternatively, in some embodiments, neuromuscular-signal sensors are moved one at a time. In some embodiments, in response to the wearable device 110 determining that the first neuromuscular-signal sensor 126a of the pair of neuromuscular-signal sensors has a measured impedance value outside of the predefined range of impedance values (based on the detected third change in the impedance values at the first neuromuscular-signal sensor 126a and the second neuromuscular-signal sensor 126b of the pair of neuromuscular-signal sensors), the wearable device 110 causes the first neuromuscular-signal sensor 126a to move until the first neuromuscular-signal sensor 126a depresses the portion of the user's skin to a fifth skin-depression depth (d5) distinct from the third skin-depression depth (d3) and also causes the second neuromuscular-signal sensor 126b to move until the second neuromuscular-signal sensor 126b depresses the portion of the user's skin to a fourth skin-depression depth (d4) distinct from the first skin-depression depth (d1). While the first neuromuscular-signal sensor 126a depresses the portion of the user's skin to the fifth skin-depression depth (d5) and the second neuromuscular-signal sensor 126b depresses the portion of the user's skin to the fourth skin-depression depth (d4), the impedance values of the first neuromuscular-signal sensor 126a and the second neuromuscular-signal sensor 126b are within the predefined range of impedance values (e.g., as shown in a sixth impedance graph 265 of FIG. 2F).

Referring to FIG. 2F, a sixth cross-sectional view 260 of the first widthwise segment of the interior surface 112b of the wearable device 110 and the sixth impedance graph 265 are shown. In particular, FIG. 2F shows the positions of the first neuromuscular-signal sensor 126a and the second neuromuscular-signal sensor 126b of the pair of neuromuscular-signal sensors after the movement of the first neuromuscular-signal sensor 126a and the second neuromuscular-signal sensor 126b as described above in reference to FIG. 2E. For example, the sixth cross-sectional view 260 shows the first neuromuscular-signal sensor 126a moved away from the user's skin 137 from the third skin-depression depth (d3) to the fifth skin-depression depth (d5) and shows the second neuromuscular-signal sensor 126b moved into the user's skin 137 from the first skin-depression depth (d1) to the fourth skin-depression depth (d4). As described above, the skin-depression depth can be the same or distinct.

In some embodiments, the first neuromuscular-signal sensor 126a and the second neuromuscular-signal sensor 126b of the pair of neuromuscular-signal sensors have the same predefined range of impedance values. Alternatively, in some embodiments, the first neuromuscular-signal sensor 126a and the second neuromuscular-signal sensor 126b of the pair of neuromuscular-signal sensors have distinct predefined range of impedance values. As discussed in detail below in reference to FIGS. 3A-3B, in some embodiments, one or more pairs of neuromuscular-signal sensors have the same predefined range of impedance values and/or different predefined range of impedance values. In some embodiments, each neuromuscular-signal sensor 126 has a respective predefined range of impedance values. In some embodiments, the predefined range of impedance values of each neuromuscular-signal sensor 126 and/or pair of neuromuscular-signal sensors is based on a location of the user's body that a respective neuromuscular-signal sensor 126 and/or a respective pair of neuromuscular-signal sensors 126 is positioned.

In some embodiments, the wearable device 110 also detects when there is no change in the impedance values at the first neuromuscular-signal sensor 126a and/or the second neuromuscular-signal sensor 126b of the pair of neuromuscular-signal sensors. In some embodiments, in response to detecting that there is no change in the impedance values at the first neuromuscular-signal sensor 126a and/or the second neuromuscular-signal sensor 126b of the pair of neuromuscular-signal sensors, the wearable device 110 does not cause the first neuromuscular-signal sensor 126a and/or the second neuromuscular-signal sensor 126b to move. Additionally, if there is a change in the impedance values at the first neuromuscular-signal sensor 126a and/or the second neuromuscular-signal sensor 126b but each sensor is within respective predefined range of impedance values, the wearable device 110 does not cause the first neuromuscular-signal sensor 126a and/or the second neuromuscular-signal sensor 126b to move.

As shown in FIGS. 2E and 2F, movement of the first neuromuscular-signal sensor 126a and/or the second neuromuscular-signal sensor 126b can be controlled using separate components (e.g., respective actuators such as a first and second actuator 128a and 128b), since the respective skin-depression depths (even for neuromuscular-signal sensors in a same group (or pair) of neuromuscular-signal sensors) can be controlled independently. In alternative embodiments, neuromuscular-signal sensors in a same group of neuromuscular-signal sensors (e.g., pair of neuromuscular-signal sensors including first and second neuromuscular-signal sensors 126a and 126b) can be caused to be moved together using a single component (e.g., an actuator 128 coupled to both the first and second neuromuscular-signal sensors 126a and 126b).

FIGS. 3A and 3B illustrate cross-sectional views of first and second widthwise segments of the interior surface 112b of the wearable device 110 (FIG. 1) and adjustments to skin-depression depths of individual neuromuscular-signal sensors 126 and/or pairs of neuromuscular-signal sensors 126 at the first and second widthwise segments of the interior surface 112b of the wearable device 110, based on measured impedance values, in accordance with some embodiments. The example illustrated in FIGS. 3A and 3B shows separate adjustments to the skin-depression depth for neuromuscular-signal sensors 126 of a first pair of neuromuscular-signal sensors 335 and a second pair of neuromuscular-signal sensors 337. The first pair of neuromuscular-signal sensors 335 includes neuromuscular-signal sensors 126a and 126b, and the second pair of neuromuscular-signal sensors 337 includes neuromuscular-signal sensors 126m and 126n. In some embodiments, each pair of neuromuscular-signal sensors 126 is coupled to an actuator 128 that is configured to move one or more neuromuscular-signal sensors 126 of a pair of neuromuscular-signal sensors 126 individually or together. Alternatively, as shown in FIGS. 3A and 3B, each neuromuscular-signal sensor 126 of a pair of neuromuscular-signal sensors is coupled to an actuator 128 that is configured to move a respective neuromuscular-signal sensor 126 individually or in unison with other neuromuscular-signal sensors 126 coupled to an actuator 128.

As shown in a first cross-sectional view 310, a first neuromuscular-signal sensor 126a of the first pair of neuromuscular-signal sensors 335 depresses a respective portion of the user's skin 137 to a first skin-depression depth (d1) and a second neuromuscular-signal sensor 126b of the second pair of neuromuscular-signal sensors 337 depresses a respective portion of the user's skin 137 to a sixth skin-depression depth (d6); and a first neuromuscular-signal sensor 126m of the second pair of neuromuscular-signal sensors 337 depresses a respective portion of the user's skin 137 to a second skin-depression depth (d2) and a second neuromuscular-signal sensor 126n of the second pair of neuromuscular-signal sensors 337 depresses a respective portion of the user's skin 137 to a first respective skin-depression depth (d1). As described above in reference to FIGS. 1A-2F, the wearable device 110 monitors impedance values at each neuromuscular-signal sensor 126, and, based on a determination that detected impedance values or changes to impedance values negatively impact the neuromuscular-signal sensor 126's ability to sense neuromuscular signals (e.g., true positive rate less than 90% and/or false positive rate greater than 5%), moves one or more neuromuscular-signal sensors 126 such that the neuromuscular-signal sensors 126 can accurately sense neuromuscular signals.

As shown in a first impedance graph 350 and a second impedance graph 320 of FIG. 3A, the wrist-wearable device 110 determines that the first neuromuscular-signal sensor 126m of the second pair of neuromuscular-signal sensors 337 is outside a predefined range of impedance values; and the second neuromuscular-signal sensor 126n of the second pair of neuromuscular-signal sensors 337 as well as the first and second neuromuscular-signal sensors 126a and 126b of the first pair of neuromuscular-signal sensors 335 are within a respective predefined range of impedance values. As described above in reference to FIGS. 2A-2F, in some embodiments, each pair of neuromuscular-signal sensors has a respective predefined range of impedance values. For example, as shown by the first impedance graph 350, the first pair of neuromuscular-signal sensors 335 has a first predefined range of impedance values and the first and second of neuromuscular-signal sensors 126a and 126b are within the first predefined range, and, as shown by the second impedance graph 320, the second pair of neuromuscular-signal sensors 337 has a second predefined range of impedance values distinct from the first predefined range of impedance values, and the first and second of neuromuscular-signal sensors 126m and 126n are outside of the second predefined range of impedance values. Alternatively, in some embodiments, each neuromuscular-signal sensor 126 has respective predefined range of impedance values.

Referring to FIG. 3B, based on the determination that the first neuromuscular-signal sensor 126m of the second pair of neuromuscular-signal sensors 337 is outside a predefined range of impedance values (as shown in the second impedance graph 320), the wearable device 110 causes the first neuromuscular-signal sensor 126m of the second pair of neuromuscular-signal sensors 337 to move until it depresses a respective portion of the user's skin 137 to a third skin-depression depth (d3) that is distinct from the second skin-depression depth (d2), such that the impedance value at first neuromuscular-signal sensor 126m of the second pair of neuromuscular-signal sensors 337 is within the predefined range of impedance values.

In some embodiments, the wearable device 110 causes one or more neuromuscular-signal sensors 126 in other pairs of neuromuscular-signal sensor 126 to move such that the impedance value at the first neuromuscular-signal sensor 126m of the second pair of neuromuscular-signal sensors 337 is within the predefined range of impedance values or to improve user comfort while also adjusting the impedance value at the at first neuromuscular-signal sensor 126m. For example, as shown in a first cross-sectional view 330, the first neuromuscular-signal sensor 126a of the first pair of neuromuscular-signal sensors 335 is also caused to move from the sixth skin-depression depth (d6) to the first skin-depression depth (d1) even though the measured impedance value at the first neuromuscular-signal sensor 126a was within its respective predefined range of impedance values. In this example, by moving the first neuromuscular-signal sensor 126a of the first pair of neuromuscular-signal sensors 335, the wearable device 110 is able to improve user comfort by decreasing the depth at which the first neuromuscular-signal sensor 126m of the second pair of neuromuscular-signal sensors 337 (or any other neuromuscular-signal sensor 126) needs to be depressed into the user's skin 137, while also keeping the one or more neuromuscular-signal sensors 126 within their respective predefined range of impedance values as shown in the third and fourth impedance graphs 360 and 370.

The techniques described above in reference to FIGS. 2A-3B, in some embodiments, monitor individual impedance values at a respective neuromuscular-signal sensor or group of neuromuscular-signal sensors, and use the monitored impedance values to determine adjustments to one or more neuromuscular-signal sensors that impact a neuromuscular-signal sensor's skin-depression depth to ensure that the neuromuscular-signal sensors have impedance values that can accurately sense neuromuscular signals. In some embodiments, the techniques described above in reference to FIGS. 2A-3B can be used individually or in conjunction with the techniques described below in reference to FIGS. 4A-4D and 6A-6B. The techniques described in reference to FIGS. 4A-4D and 6A-6B (which can be used individually or in conjunction with the techniques described above in reference to FIGS. 2A-3B), in some embodiments, monitor impedance values between at least two neuromuscular-signal sensors to determine one or more impedance mismatches between neuromuscular-signal sensors. Based on a determination that an impedance mismatch is outside a predetermined impedance tolerance, the techniques described below in reference to FIGS. 4A-4D and 6A-6B move one or more neuromuscular-signal sensors that impact a neuromuscular-signal sensor's skin-depression depth as described in detail below. It should be appreciated that these two techniques can be combined in various ways (e.g., by both checking for impedance mismatches between neuromuscular-signal sensors (mismatch-based impedance checks) in addition to checking that individual neuromuscular-signal sensors stay within predefined ranges or impedance values (range-based impedance checks)). With this context in mind, the mismatch-based technique is now described.

Figures 4A, 4B:
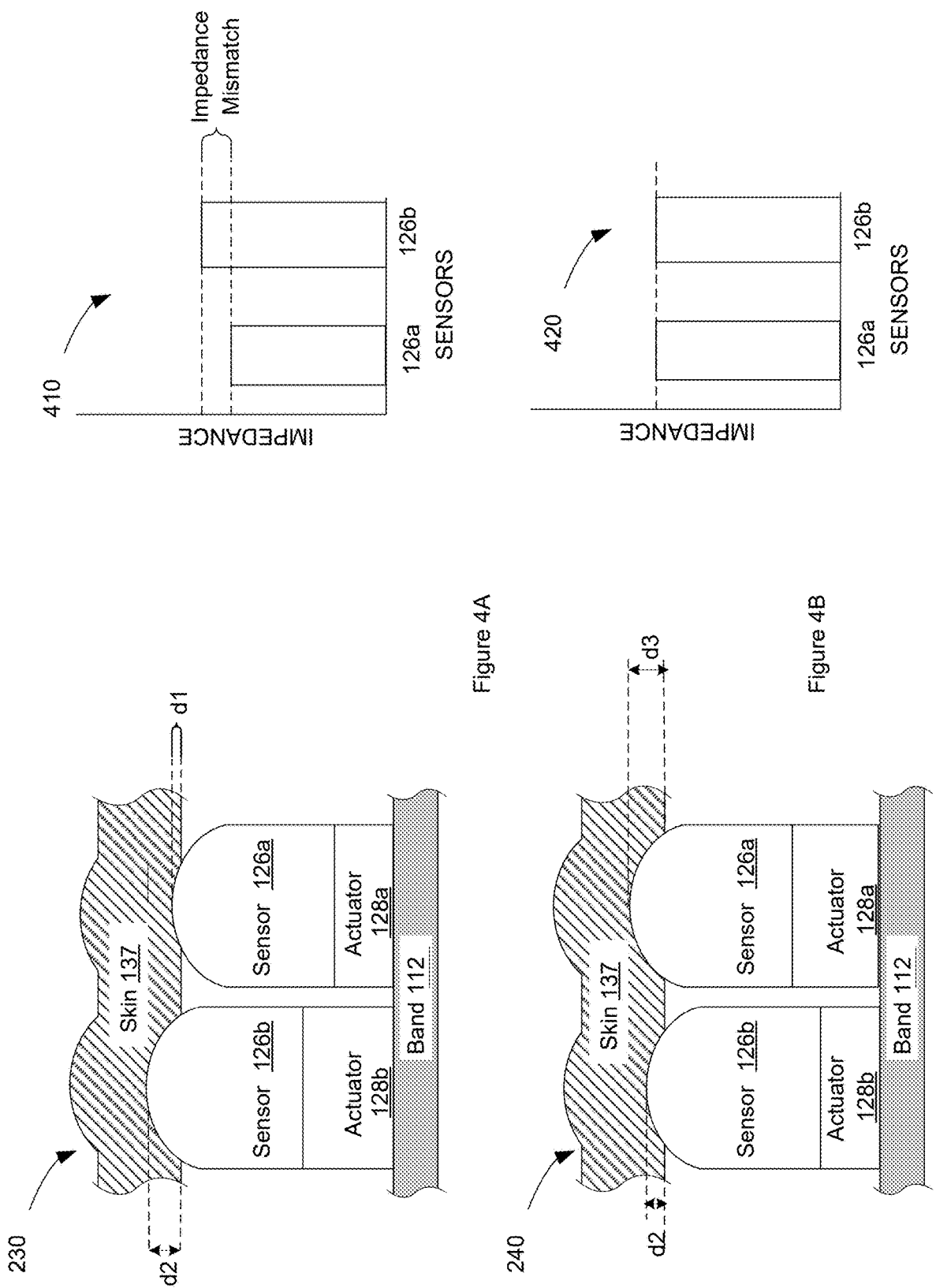

FIGS. 4A-4D illustrate a cross-sectional view of a first widthwise segment of the interior surface 112b of the wearable device and adjustment of skin-depression depths of one or more neuromuscular-signal sensors of a pair of neuromuscular-signal sensors 126, in accordance with some embodiments. Specifically, FIGS. 4A-4D depict different adjustments to skin-depression depths of one or more neuromuscular-signal sensors of the pair of neuromuscular-signal sensors 126 based on a determination that there is an impedance mismatch between respective impedances measured at first and second neuromuscular-signal sensors 126a and 126b of the pair of neuromuscular-signal sensors 126. A first impedance mismatch and neuromuscular-signal sensor adjustment is depicted in FIGS. 4A and 4B, and a second impedance mismatch and neuromuscular-signal sensor adjustment is depicted in FIGS. 4C and 4D.

In FIG. 4A, a first cross-sectional view 400 of a first widthwise segment of the interior surface 112b of the wearable device 110 illustrates the first neuromuscular-signal sensor 126a and the second neuromuscular-signal sensor 126b of the pair of neuromuscular-signal sensors. The first neuromuscular-signal sensor 126a and the second neuromuscular-signal sensor 126b depress respective portions of a user's skin to a first skin-depression depth (d1) and a second skin-depression depth (d2), respectively. At the first skin-depression depth, the first neuromuscular-signal sensor 126a has a first impedance value and the second neuromuscular-signal sensor 126b has a second impedance value. In some embodiments, the first skin-depression depth (d1) is less than the second skin-depression depth (d2). Alternatively, in some embodiments, the first skin-depression depth (d1) is greater than the second skin-depression depth (d2). In some embodiments, the first skin-depression depth and the second skin-depression depth (d2) are the same.

As shown by first impedance graph 410, the first impedance value of the first neuromuscular-signal sensor 126a does not match (e.g., is less than) the second impedance value of the second neuromuscular-signal sensor 126b. In some embodiments, an impedance mismatch between the measured impedance values of the first and second neuromuscular-signal sensors 126a and 126b is detected due to a change in the impedance values at respective neuromuscular-signal sensors 126 (e.g., a change caused by moisture at the user's skin 137, user movement, interference between the user's skin 137 and the neuromuscular-signal sensor 126, a user sweating, or other examples provided above in reference to FIGS. 1A-2F). Additionally, or alternatively, in some embodiments, an impedance mismatch between the measured impedance values of the first and second neuromuscular-signal sensors 126a and 126b is detected due to the neuromuscular-signal sensors 126a and 126b's positions on the user's skin 137 (e.g., poor contact with the user's skin 137, position over a user's bone that provides poor signal readings, and/or improper placement of the neuromuscular-signal sensor 126 on the user's skin 137).

In some embodiments, in response to the wearable device 110 determining that a first impedance value measured at the first neuromuscular-signal sensors 126a is mismatched with a second impedance value measured at the second neuromuscular-signal sensor 126b, the wearable device 110 causes the first and/or the second neuromuscular-signal sensors 126a and/or 126b to move until the first and/or the second neuromuscular-signal sensor 126a and/or 126b depress respective portions of the user's skin 137 to a different skin-depression depth that is distinct from the initial skin-depression depth. For example, as shown and discussed in detail below in reference to FIG. 4B, the wearable device 110 can cause the first neuromuscular-signal sensor 126a to move until the first neuromuscular-signal sensor 126a depresses the portion of the user's skin 137 to a third skin-depression depth (d3) that is distinct from the first skin-depression depth (d1). Causing the neuromuscular-signal sensor to move includes causing an actuator to move the neuromuscular-signal sensor 126a into user's skin 137. For example, the first neuromuscular-signal sensor 126a can be caused to move via a first actuator 128a. In some embodiments, the first neuromuscular-signal sensor 126a depresses the user's skin 137 to a number of different skin-depression depths, including the third skin-depression depth, d3, until a determination is made by the wearable device 110 that the impedance value for the first neuromuscular-signal sensor 126a is matching with the impedance value for the second neuromuscular-signal sensor 126b while the first neuromuscular-signal sensor 126a depresses the portion of the user's skin to the different skin-depression depth (e.g., as shown in a second cross-sectional view 415 of the first widthwise segment of the interior surface 112b of the wearable device 110 and a second impedance graph 420 of FIG. 4B).

Turning to FIG. 4B, the first neuromuscular-signal sensor 126a has been moved such that the first impedance value measured at the first neuromuscular-signal sensor 126a matches with the second impedance value measured at the second neuromuscular-signal sensor 126b. Further, as shown in the second impedance graph 420, the first and second neuromuscular-signal sensors 126a and 126b have matching impedance values. In some embodiments, the third skin-depression depth (d3) is distinct from the second skin-depression depth (d2). Alternatively, in some embodiments, the third skin-depression depth (d3) is the same as the second skin-depression depth (d2). The neuromuscular-signal sensors 126 can be moved into the user's skin 137 or moved (or pulled) away from the user's skin 137 such that the measured impedance value at the neuromuscular-signal sensor 126 can be discretely adjusted to cause the impedance to be either higher or lower. As described above in reference to FIGS. 2A-2F, the skin-depression depths of the neuromuscular-signal sensors are discretely controlled by the wearable device 110 to allow for fine-grained control over the impedance values at a neuromuscular-signal sensor 126 by making fine-grained control of the neuromuscular-signal sensor 126's skin-depression depths.

In FIG. 4C, a third cross-sectional view 425 of the first widthwise segment of the interior surface 112b of the wearable device 110 and a third impedance graph 430 are shown. In the third cross-sectional view 425, the wearable device 110 detects a second impedance mismatch between the first neuromuscular-signal sensor 126a and the second neuromuscular-signal sensor 126b of the pair of neuromuscular-signal sensors (e.g., a detected impedance value change due to moisture, user sweat, interference between the user's skin 137 and the neuromuscular-signal sensor 126, and/or other examples provided above).

In some embodiments, before the wearable device 110 causes the first and/or the second neuromuscular-signal sensor 126a and/or 126b to move based on an impedance mismatch, the wearable device 110 determines whether the impedance mismatch between the first and the second neuromuscular-signal sensors 126a and 126b is within a predetermined impedance tolerance. Based on a determination that the impedance mismatch between the first and the second neuromuscular-signal sensors 126a and 126b is not within the predetermined impedance tolerance, the wearable device 110 causes the first and/or the second neuromuscular-signal sensors 126a and/or 126b to move until the first and/or the second neuromuscular-signal sensor 126a and/or 126b depress respective portions of the user's skin 137 to a different skin-depression depth that is distinct from the initial skin-depression depth, such that an impedance mismatch between the first and the second neuromuscular-signal sensors 126a and 126b is within the predetermined impedance tolerance impedance values. For example, as shown in FIGS. 4C and 4D, the wearable device 110, based on a determination that the impedance mismatch between the first and the second neuromuscular-signal sensors 126a and 126b is not within the predetermined impedance tolerance, causes the second neuromuscular-signal sensor 126b to move until the second neuromuscular-signal sensor 126b depresses the portion of the user's skin to a fourth skin-depression depth (d4) distinct from the second skin-depression depth (d2). While the second neuromuscular-signal sensor 126b depresses the portion of the user's skin to the fourth skin-depression depth (d4), the impedance mismatch between the first and the second neuromuscular-signal sensors 126a and 126b is within a predetermined impedance tolerance, e.g., as shown in a fourth impedance graph 440. In some embodiments, the wearable device 110 allows for an impedance mismatch between the first impedance value measured at the first neuromuscular-signal sensors 126a and the second impedance value measured at the second neuromuscular-signal sensors 126b to be within a predetermined impedance tolerance to accurately sense neuromuscular signals. In other words, in some embodiments, the wearable device 110 does not require an exact match between the first impedance value measured at the first neuromuscular-signal sensors 126a and the second impedance value measured at the second neuromuscular-signal sensors 126b to accurately sense neuromuscular signals.

In some embodiments, based on a determination that the impedance mismatch between the first and the second neuromuscular-signal sensors 126a and 126b is within the predetermined impedance tolerance, the wearable device 110 does not cause the first and/or the second neuromuscular-signal sensors 126a and/or 126b to move. For example, when an impedance mismatch between the first impedance value measured at the first neuromuscular-signal sensor 126a and the second impedance value measured at the second neuromuscular-signal sensor 126b that is within a predetermined impedance tolerance (e.g., less than a 200 kΩ), as shown in fourth impedance graph 440, the wearable device 110 does not move (or stops movement of) the first and/or the second neuromuscular-signal sensors 126a and 126b. While the impedance mismatch between at least two neuromuscular-signal sensors 126 is within the predetermined impedance tolerance, noise levels at the neuromuscular-signal sensors 126 remain low (as shown and described in reference to FIG. 5), which allows the wearable device 110 to accurately sense neuromuscular signals. This provides the wearable device 110 with greater flexibility in selecting and depressing the neuromuscular-signal sensors 126 into the user's skin 137 that result in accurately sensing of neuromuscular signals, and also allows a user to move around freely without worrying about interfering with the wearable device 110's ability to sense neuromuscular signals.

Referring to FIG. 4D, a fourth cross-sectional view 435 of the first widthwise segment of the interior surface 112b of the wearable device 110 and the fourth impedance graph 440 are shown. In particular, the fourth cross-sectional view 435 shows the positions of the first neuromuscular-signal sensor 126a and the second neuromuscular-signal sensor 126b of the pair of neuromuscular-signal sensors 126 after the movement of the second neuromuscular-signal sensor 126b as described above in reference to FIG. 4C. For example, the fourth cross-sectional view 435 shows the second neuromuscular-signal sensor 126b moved into the user's skin 137 from the second skin-depression depth (d2) to the fourth skin-depression depth (d4). In some embodiments, the fourth skin-depression depth is distinct from the first skin-depression depth (d1) and/or the third skin-depression depth (d3). Alternatively, in some embodiments, the fourth skin-depression depth (d4) is the same as the first skin-depression depth (d1) and/or the third skin-depression depth (d3). As described above in reference to FIGS. 2A-2B, in some embodiments, the impedance values at the neuromuscular-signal sensors 126 are controlled through a discrete control mechanism such that the neuromuscular-signal sensors 126 can be moved to many other skin-depression depths (such as fourth, fifth, sixth, seventh, etc. skin-depression depths) as needed to ensure that the measured impedance values at the neuromuscular-signal sensors 126 are maintained within the predetermined impedance tolerance. In some embodiments, causing both the first neuromuscular-signal sensor 126a and second neuromuscular-signal sensor 126b to move includes causing the first neuromuscular-signal sensor 126a and second neuromuscular-signal sensor 126b to move independently or together to different skin-depression depths until a determination is made that the respective impedances for the first neuromuscular-signal sensor 126a and second neuromuscular-signal sensor 126b match.

The skin-depression depths of the neuromuscular-signal sensor 126a and second neuromuscular-signal sensor 126b can be discretely controlled for each individual neuromuscular-signal sensor to allow for fine-grained control over the impedance by making fine-grained controls to neuromuscular-signal sensor 126a and second neuromuscular-signal sensor 126b skin-depression depths. Some embodiments can thus couple individual adjustable components to individual sensors, while other embodiments couple adjustable components to groups of two or more sensors. In some embodiments, in addition to determining that the impedances at the first neuromuscular-signal sensor 126a and the second neuromuscular-signal sensor 126b match, the system can also determine (e.g., as a secondary verification check) that impedances for the first and second sensors remain within the predetermined impedance tolerance (which can be sensor-specific, group-specific, or system-wide ranges) of impedance values. Thus, the techniques described herein for verifying that impedances for two different sensors match can also be performed in conjunction with the techniques described above for verifying that impedance values at different sensors remain within predefined impedance ranges.

To further illustrate the technique for adjusting neuromuscular-signal sensors 126 described above in reference to FIGS. 4C-4D, Table 1 below provides sample impedance mismatches that are either within or outside of the predetermined impedance tolerance and the actions performed by the wearable device 110 (e.g., cause the respective neuromuscular-signal sensor 126 to move such that an impedance mismatch is within the predetermined impedance tolerance). For purposes of the example shown in Table 1, the predetermined impedance tolerance is equal to 200 kΩ.

sensors is between 900 kΩ and 1 MΩ, the detected noise level increases such that it is between 4.0E-7 and 6.0E-7. At point 565, when an impedance mismatch between a respective pair of neuromuscular-signal sensors is approximately between 1.2 MΩ and 1.3 MΩ, the detected noise level increases such that it is between 8.0E-7 and 9.0E-7. At point 570, when an impedance mismatch between a respective pair of neuromuscular-signal sensors is approximately between 1.75 MΩ and 1.85 MΩ, the detected noise level increases such that it is between 1.0E-6 and 1.2E-6.

TABLE 1

| Sensors Pairs | Sample Pair 1 | Sample Pair 2 | Sample Pair 3 | Sample Pair 4 |
|---|---|---|---|---|
| Distal Side Sensor (e.g., 126a) $Z_1$(MOhm) | 0.335 | 0.045 | 0.390 | 0.010 |
| Proximal Side Sensor (e.g., 126b) $Z_2$(MOhm) | 0.015 | 0.315 | 0.500 | 0.010 |
| Impedance Mismatch Between Distal and Proximate Side Sensors $Z_1$-$Z_2$ (Absolute Value) | $Z_1$-$Z_2$ > predetermined impedance tolerance | $Z_1$-$Z_2$ > predetermined impedance tolerance | $Z_1$-$Z_2$ < predetermined impedance tolerance | $Z_1$-$Z_2$ < predetermined impedance tolerance |
| Action Performed | Adjust skin-depression depth of at least one sensor | Adjust skin-depression depth of at least one sensor | Continue to monitor impedance values at the sensors | Continue to monitor impedance values at the sensors |

Figure 5:
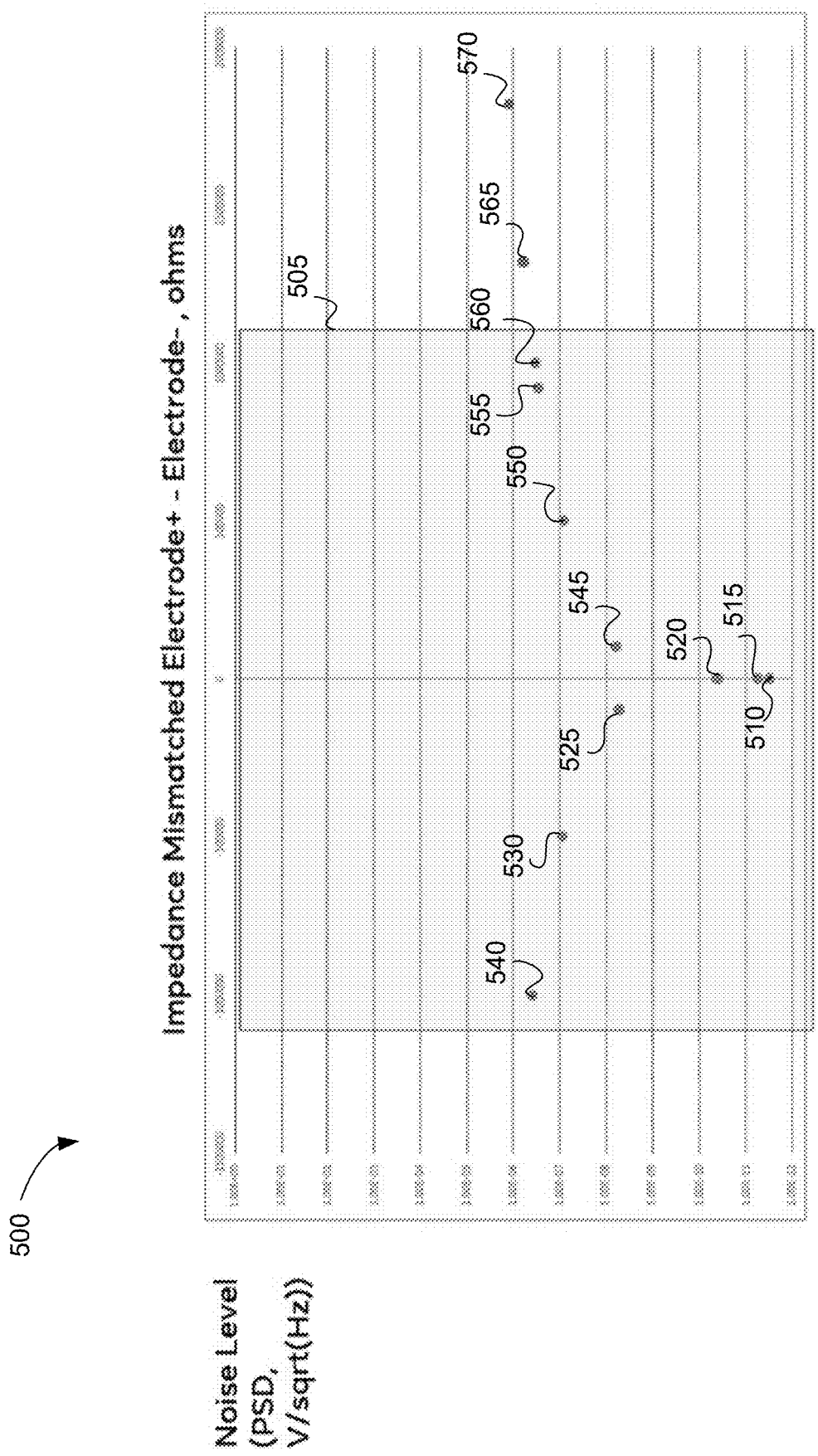
FIG. 5 is an impedance mismatch plot depicting a relationship between impedance mismatches measured at pairs of neuromuscular-signal sensors and associated detected noise in neuromuscular signals, in accordance with some embodiments.

FIG. 5 is an impedance mismatch plot 500 depicting the relationship between impedance mismatches measured at pairs of neuromuscular-signal sensors and associated detected noise signals, in accordance with some embodiments. In particular, each point represents a pair of neuromuscular-signal sensors, an impedance mismatch between the pair of neuromuscular-signal sensors (represented by the x-axis), and a noise level associated with the impedance mismatch (represented by the y-axis). As shown in the impedance mismatch plot 500, as the impedance mismatch between a respective pair of neuromuscular-signal sensors increases, the noise level at the respective pair of neuromuscular-signal sensors also increases. The surrounding box 505 illustrates that the noise level is consistent with positive (+) and negative (−) mismatches between a pair of neuromuscular-signal sensors. As such, the noise level is dependent on an absolute value of an impedance mismatch between a pair of neuromuscular-signal sensors.

Impedance mismatch plot 500 includes points 510, 515, 520, 525, 530, 540, 545, 550, 555, 560, 565 and 570. As shown by points 510, 515, and 520, when an impedance mismatch between a respective pair of neuromuscular-signal sensors is approximately zero (e.g., where approximately means +/−5 kΩ), the noise level at the respective pair of neuromuscular-signal sensors is at its lowest value (e.g., the detected noise level is between 5.5E-12 and 8.0E-11). As mentioned above, when an impedance mismatch between a respective pair of neuromuscular-signal sensors increases, the detected noise level also increases. For example, at points 525 and 545, when an impedance mismatch between a respective pair of neuromuscular-signal sensors is approximately 100 kΩ, the detected noise level increases such that it is between 8.0E-9 and 1.0E-8. At points 530 and 550, when an impedance mismatch between a respective pair of neuromuscular-signal sensors is approximately 500 kΩ, the detected noise level increases such that it is between 9.0E-8 and 1.0E-7. At points 540, 555, and 560, when an impedance mismatch between a respective pair of neuromuscular-signal FIG. 5 can be discussed in view of the impedance mismatch between a first neuromuscular-signal sensor 126a and a second neuromuscular-signal sensor 126b described above in reference to FIGS. 4A-4D. In particular, FIG. 5 illustrates the performance of a pair of neuromuscular-signal sensors with different impedance mismatches. In some embodiments, a predetermined impedance tolerance can be selected based on noise level that allows for accurate sensing of a neuromuscular signal. For example, if it is determined that a noise level between 8.0E-9 and 1.0E-8 allows for sensing of a neuromuscular signal, a predetermined impedance tolerance can be 100 kΩ. The above examples are non-limiting. Different predetermined impedance tolerances can be used to achieve the desired results.

Figure 6A:
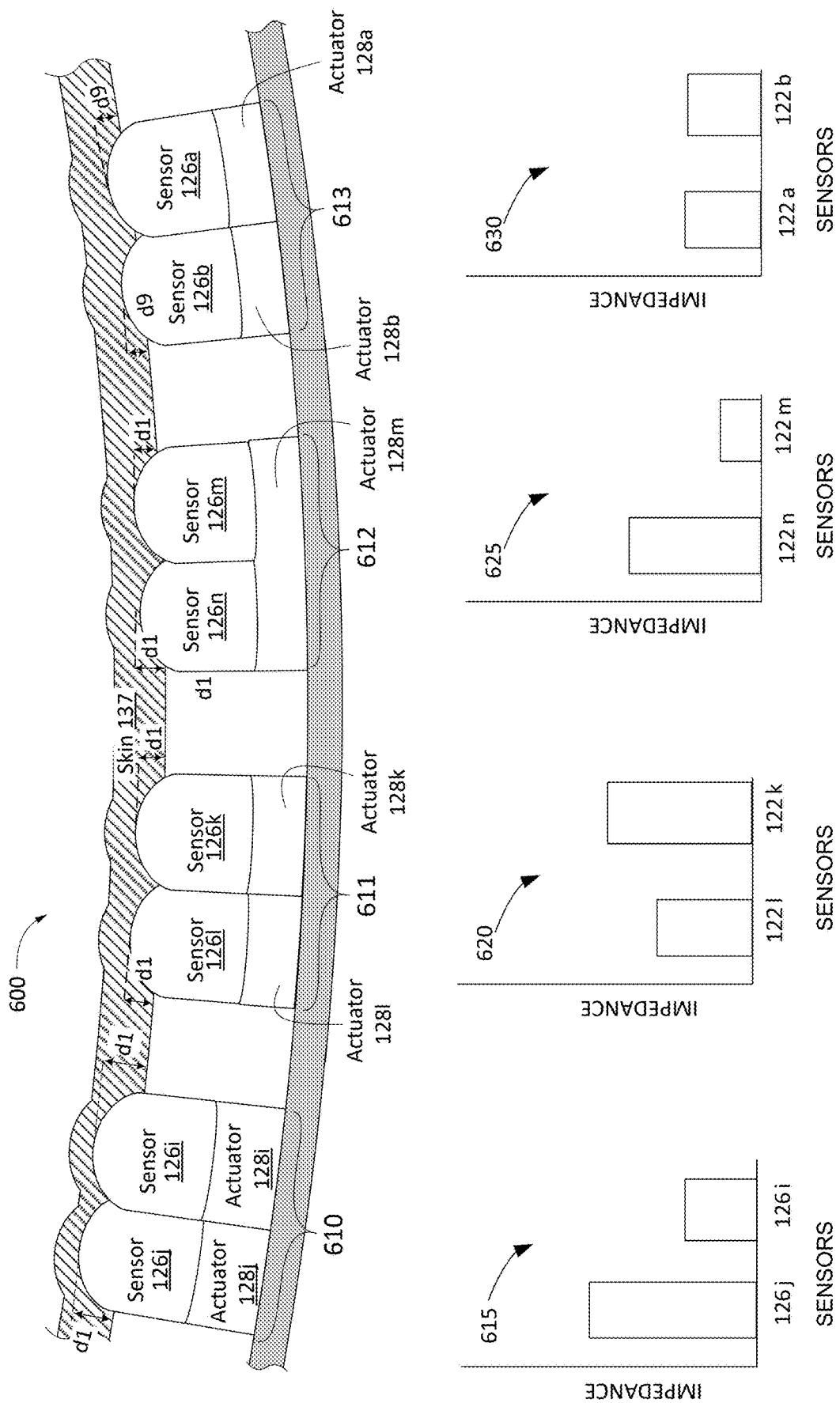
FIGS. 6A and 6B illustrate a cross-sectional view of adjustments to skin-depression depths for distinct pairs of neuromuscular-signal sensors based on measured impedance values at neuromuscular-signal sensors of distinct pairs of neuromuscular-signal sensors, in accordance with some embodiments.
Figure 6B:
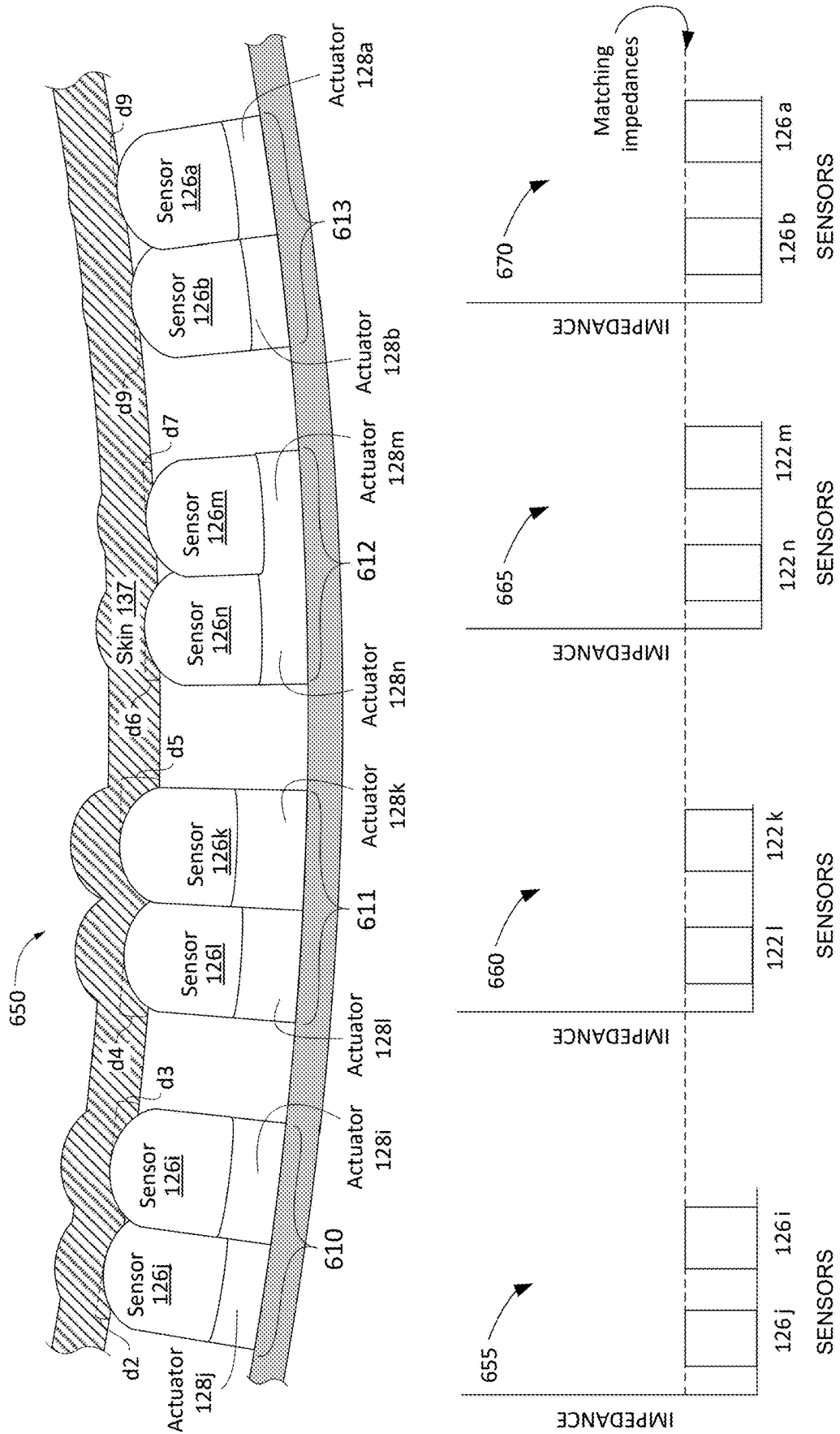

FIGS. 6A and 6B illustrates a cross-sectional view of adjustments to skin-depression depths for distinct pairs of neuromuscular-signal sensors based on measured impedance values at neuromuscular-signal sensors of distinct pairs of neuromuscular-signal sensors, in accordance with some embodiments. FIGS. 6A-6B depict different adjustments to skin-depression depths of distinct pairs of neuromuscular-signal sensors (e.g., a fourth pair 610, a third pair 611, and a second pair 612) based on a determination that there is an impedance mismatch with another distinct pair of neuromuscular-signal sensors (e.g., a first pair 613). In particular, FIGS. 6A-6B illustrate impedance matching across each neuromuscular-signal sensor of the distinct pairs of neuromuscular-signal sensors such that each neuromuscular-signal sensor has the same measured impedance value.

FIG. 6A shows respective impedance mismatches between neuromuscular-signal sensors of the first pair 613, the second pair 612, and the third pair 611, as well as impedance mismatches between the first, the second, the third, and the fourth pairs 610-613. The first pair 613, third pair 611, and fourth pair 610 of neuromuscular-signal sensors each have one actuator coupled to a respective neuromuscular-signal sensor. For example, neuromuscular-signal sensor 126i of the fourth pair 610 is coupled to actuator 128i and neuromuscular-signal sensor 126*j* of the fourth pair 610 is coupled to actuator 128*j*. Alternatively, in some embodiments, a pair of neuromuscular-signal sensors can be coupled to a single actuator. For example, the second pair 610 of neuromuscular-signal sensors has one actuator 128*m* coupled to both neuromuscular-signal sensors 126*m* and 126*n*.

A first impedance graph 630 shows neuromuscular-signal sensors 126*a* and 126*b* of the first pair 613 having matching impedances, a second impedance graph 625 shows neuromuscular-signal sensors 126*n* and 126*m* of the second pair 612 having mismatching impedances, a third impedance graph 620 shows neuromuscular-signal sensors 126*l* and 126*k* of the third pair 611 having mismatching impedances, and a fourth impedance graph 615 shows neuromuscular-signal sensors 126*j* and 126*i* of the fourth pair 610 having mismatching impedances. As shown between the first, second, third, and fourth impedance graphs 615-630, there is also an impedance mismatch between the first, second, third, and fourth pairs 610-613. In other words, the impedance values at the fourth pair 610 do not match with the impedance values at the first pair 613. Similarly, as shown in the third impedance graph 620 and the second impedance graph 625, the impedance values measured at the third pair 611 and the second pair 612, respectively, do not match with the impedance values at the first pair 613. Examples of monitoring the impedance values at one or more neuromuscular-signal sensors 126 and/or pairs of neuromuscular-signal sensors to detect a change in impedance values are provided above in reference to FIGS. 1A-4D.

In some embodiments, in response to the wearable device 110 determining that impedance values measured at the third pair 612 (e.g., neuromuscular-signal sensor 126*m* and neuromuscular-signal sensor 126*n*), impedance values measured at the third pair 611 (e.g., neuromuscular-signal sensor 126*k* and neuromuscular-signal sensor 126*l*), and/or impedance values measured at the fourth neuromuscular-signal sensor pair 610 (e.g., neuromuscular-signal sensor 126*j* and neuromuscular-signal sensor 126*i*) are mismatched with impedance values measured at the first pair 613 (e.g., neuromuscular-signal sensor pair 126*a* and neuromuscular-signal sensor 126*b*), the wearable device 110 causes the neuromuscular-signal sensors of the second, third, and fourth pairs 610-612 to move until each neuromuscular-signal sensor 126 depresses respective portions of a user's skin 137 to a different skin-depression depth that is distinct from the initial skin-depression depth shown in FIG. 6A, such that impedance values are the same across each of the first, second, third, and fourth pairs 610-613.

For example, as shown and discussed in detail below in reference to FIG. 6B, the wearable device 110 can cause the neuromuscular-signal sensor 126*i* to move until the neuromuscular-signal sensor 126*i* depresses the portion of the user's skin 137 to a third skin-depression depth (d3) that is distinct from the first skin-depression depth (d1). Causing the neuromuscular-signal sensor 126*i* to move includes causing an actuator (e.g., actuator 128*i*) coupled to the neuromuscular-signal sensor 126*i* to move the neuromuscular-signal sensor 126*i* into (or away from) user's skin 137. In some embodiments, neuromuscular-signal sensor 126*i* depresses the user's skin 137 to a number of different skin-depression depths, including the third skin-depression depth, d3, until a determination is made by the wearable device 110 that the impedance value for neuromuscular-signal sensor 126*i* is matching with the impedance value at the first pair 613 while the first neuromuscular-signal sensor 126*i* depresses the portion of the user's skin 137 to the third skin-depression depth (e.g., as shown in a second cross-sectional view 650 of the interior surface 112*b* of the wearable device 110 and an eighth impedance graph 655 of FIG. 6B). Similarly, the wearable device 110 can cause the neuromuscular-signal sensors 126*j* and 126*k*-126*n* to move until the neuromuscular-signal sensors (126*i*, 126*l*, 126*k*, 126*n* and 126*m*) depress the portion of the user's skin 137 to different skin-depression depths (e.g., neuromuscular-signal sensors 126*j* to a second skin-depression depth d2, neuromuscular-signal sensors 126*k* to a fifth skin-depression depth d5, neuromuscular-signal sensors 126*l* to a fourth skin-depression depth d4, neuromuscular-signal sensors 126*n* to a sixth skin-depression depth d6, and neuromuscular-signal sensors 126*m* to a seventh skin-depression depth d7), that are distinct from the first skin-depression depth (d1).

Turning to FIG. 6B, adjustments to neuromuscular-signal sensors of one or more pairs are shown. In particular, one or more neuromuscular-signal sensors 126 of the second, third, and fourth pairs 610-612 have been moved such that the impedance value measured at the neuromuscular-signal sensors of the second, third, and fourth pairs match with the impedance value measured at the first pair 613. Further, as shown in a fifth impedance graph 670, a sixth impedance graph 665, a seventh impedance graph 660, and the eighth impedance graph 655, the first, second, third, and fourth pairs 610-613 have matching impedance values. As described above in reference to FIGS. 2A-4D, the skin-depression depths of the neuromuscular-signal sensors are discretely controlled by the wearable device 110 to allow for fine-grained control over the impedance values at a neuromuscular-signal sensor 126 by making fine-grained control of the neuromuscular-signal sensor 126's skin-depression depths.

The techniques described in reference to FIG. 6A-6B are similar to the techniques described above in reference to FIG. 4A-4B (e.g., an exact match between neuromuscular-signal sensors). In particular, the techniques described in FIGS. 6A-6B match impedances of the neuromuscular-signal sensors of all the shown pairs of neuromuscular-signal sensors. As the skilled artisan will appreciate upon reading the descriptions provided herein, the different techniques described above in reference to FIGS. 2A-4D can be applied to individual pairs of neuromuscular-signal sensors; a subset, less than all, pairs of neuromuscular-signal sensors; and all pairs of neuromuscular-signal sensors; as well as individual neuromuscular-signal sensors and/or groups of neuromuscular-signal sensors.

Figure 7A:
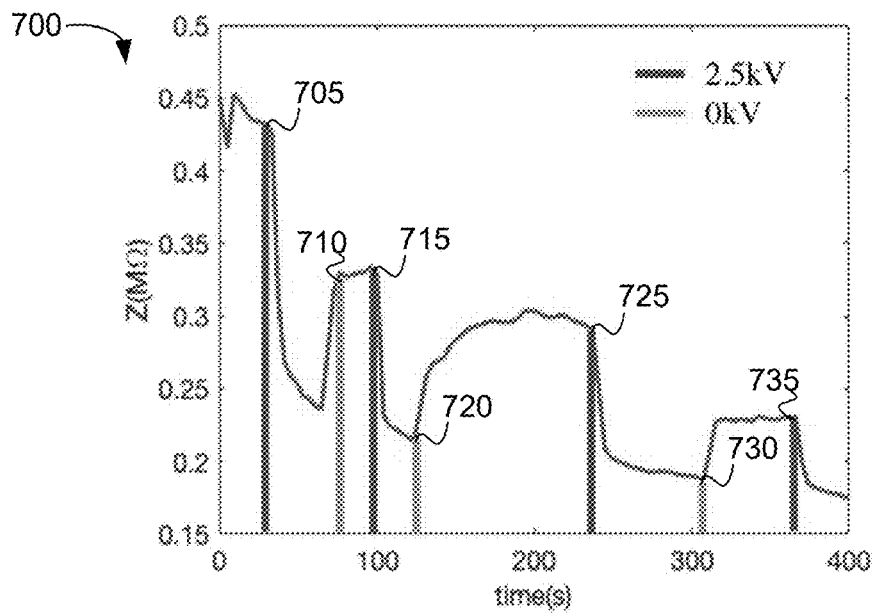
FIG. 7A illustrates impedance tuning at a single pair of neuromuscular-signal sensors by adjusting contact conditions of the neuromuscular-signal sensors, in accordance with some embodiments.
Figure 7B:
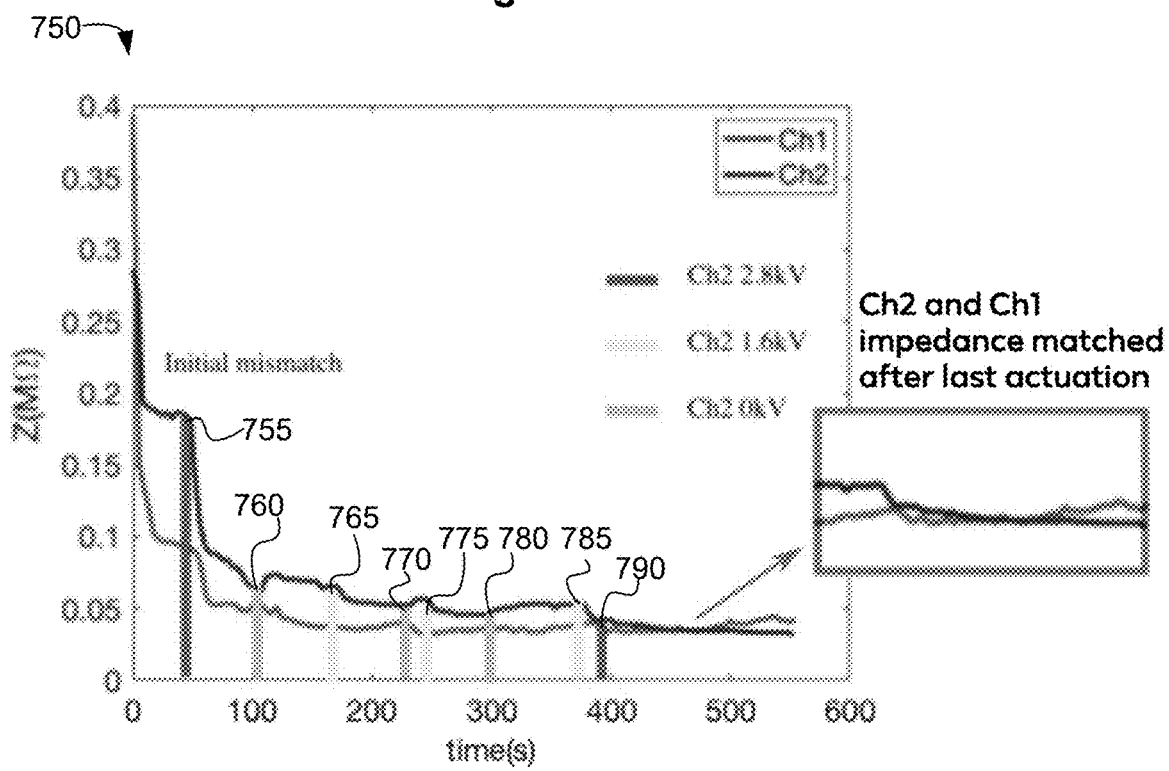
FIG. 7B illustrates impedance tuning between two distinct pairs of neuromuscular-signal sensors by adjusting contact conditions of neuromuscular-signal sensors of at least one pair of neuromuscular-signal sensors, in accordance with some embodiments.

FIG. 7A illustrates impedance tuning at a single pair of neuromuscular-signal sensors by adjusting contact conditions of the neuromuscular-signal sensors, and FIG. 7B illustrates impedance tuning between two distinct pairs of neuromuscular-signal sensors by adjusting contact conditions of neuromuscular-signal sensors of at least one pair of neuromuscular-signal sensors, in accordance with some embodiments. In some embodiments, a pair of neuromuscular-signal sensors (or group of neuromuscular-signal sensors) is referred to as a channel. Adjusting the contact condition of a neuromuscular-signal sensor can include moving the neuromuscular-signal sensor into the user's skin 137 (FIG. 1A) or pulling the neuromuscular-signal sensor away from the user's skin 137.

Single channel impedance tuning graph 700 shows a change in a measured impedance at neuromuscular-signal sensors of a single channel over time. Over time, the single channel gradually stabilizes to particular impedance value. Without any adjustments to the contact condition of a neuromuscular-signal sensor, the single channel can take a substantially long time (e.g., more than 30 minutes) to stabilize at a particular impedance value. Adjusting contact conditions of the neuromuscular-signal sensors of the single channel through the application of different voltages (e.g., voltages applied to one or more actuators 128; FIG. 1) decreases the overall time required to stabilize the impedance at the single channel (e.g., approximately 400 seconds as shown in the single channel impedance tuning graph 700). In particular, the single channel impedance tuning graph 700 shows application of a first voltage (e.g., 2.5 kV) and a second voltage (e.g., 0 kV) to discretely control an impedance of the single channel. For example, at 0 seconds an impedance at the single channel is approximately 0.45 MΩ (where approximately means +/−0.01 MΩ). At point 705, the first voltage is applied to adjust contact conditions of neuromuscular-signal sensors of the single channel such that an impedance of the single channel changes. For example, after the application of the first voltage, the impedance at the single channel decreases steadily to approximately 0.23 MΩ. At point 710, the second voltage is applied (i.e., the first voltage is reduced to 0 kV) to adjust contact conditions of neuromuscular-signal sensors of the single channel such that an impedance of the single channel changes. After the application of the second voltage, the impedance at the single channel sharply increases to approximately 0.325 MΩ before (partially) stabilizing (e.g., increasing from approximately 0.325 MΩ to 0.33 MΩ before the first voltage is applied a second time). In particular, application of the second voltage shows the gradual stabilization of the single channel without the adjustments to the contact condition of a neuromuscular-signal sensor (e.g., a slower and more gradual stabilization over time).

At point 715, the first voltage is applied a second time to adjust contact conditions of neuromuscular-signal sensors of the single channel such that an impedance of the single channel changes. After application of the first voltage at point 715, the impedance at the single channel sharply decreases to approximately 0.225 MΩ before the second voltage is applied a second time at point 720. Application of the second voltage at point 720 adjusts the contact conditions of neuromuscular-signal sensors of the single channel such that an impedance of the single channel changes steadily increases to approximately 0.3 MΩ before the first application is applied a third time. At point 725, the first voltage is applied a third time adjusting the contact conditions of neuromuscular-signal sensors of the single channel such that an impedance of the single channel changes sharply decreases to approximately 0.22 MΩ before steadily decreasing to approximately 0.2 MΩ. At point 730, the second voltage is applied a third time sharply increasing and stabilizing the impedance of the single channel to approximately 0.2 MΩ, and, at point 735, the second voltage is applied a fourth time sharply decreasing and steadily decreasing the impedance of the single channel to approximately 0.175 MΩ. The above examples are non-limiting. Different voltages can be applied to reach a desired impedance measurement.

Dual channel impedance tuning graph 750 shows a change in a measured impedance at a second channel over time to match (or closely match) a measured impedance at a first channel. As described above, adjustments to contact conditions of the neuromuscular-signal sensors reduce the overall time required to stabilize the impedance at the single channel. Further, as shown in the dual channel impedance tuning graph 750, the adjustments to contact conditions of the neuromuscular-signal sensors can also be used to match the impedance between different channels. The dual channel impedance tuning graph 750 shows application of a first voltage (e.g., 2.8 kV), a second voltage (e.g., 1.6 kV), and a third voltage (e.g., 0 kV) to discretely control an impedance of the second channel such that it matches with the impedance of the first channel. For ease, only the adjustments to contact conditions of the neuromuscular-signal sensors of the second channel are shown.

For example, at 0 seconds an impedance at the second channel is approximately 0.29 MΩ (where approximately means +/−0.01 MΩ). At point 755, the first voltage is applied to adjust contact conditions of neuromuscular-signal sensors of the second channel such that an impedance of the second channel changes. For example, after the application of the first voltage, the impedance at the second channel decreases sharply to approximately 0.06 MΩ before the third voltage is applied at point 760 (which allows the neuromuscular-signal sensors of the second channel to stabilize without assistance). At point 760, the third voltage is applied (i.e., the first voltage is reduced to 0 kV), adjusting contact conditions of neuromuscular-signal sensors of the second channel such that the impedance at the second channel slightly increases before slowly decreasing to approximately 0.07 MΩ before the second voltage is applied at point 765. The second voltage applies a granular adjustment to contact conditions of neuromuscular-signal sensors of the second channel compared to the first voltage. In particular, instead of causing a sharp decrease in the impedance at the second channel, the second voltage allows the impedance at the second channel to steadily decrease to approximately 0.05 MΩ before the third voltage is applied at point 770. The voltages applied to the second channel are configured such that the impedance curve of the second channel begins to resemble the impedance curve of the first channel.

As further shown in the dual channel impedance tuning graph 750, between points 770-790, different voltages are applied until the impedances at the first and second channel match at approximately 400 seconds. The above examples are non-limiting and are provided to show that different channels can be caused to match (e.g., matching impedance) through the control of one or more actuators (e.g., via voltages applied to the actuators). The different channels can be stabilized in a shortened period of time (compared to stabilization without adjustments to contact conditions of neuromuscular-signal sensors of a channel).

Figure 8A:
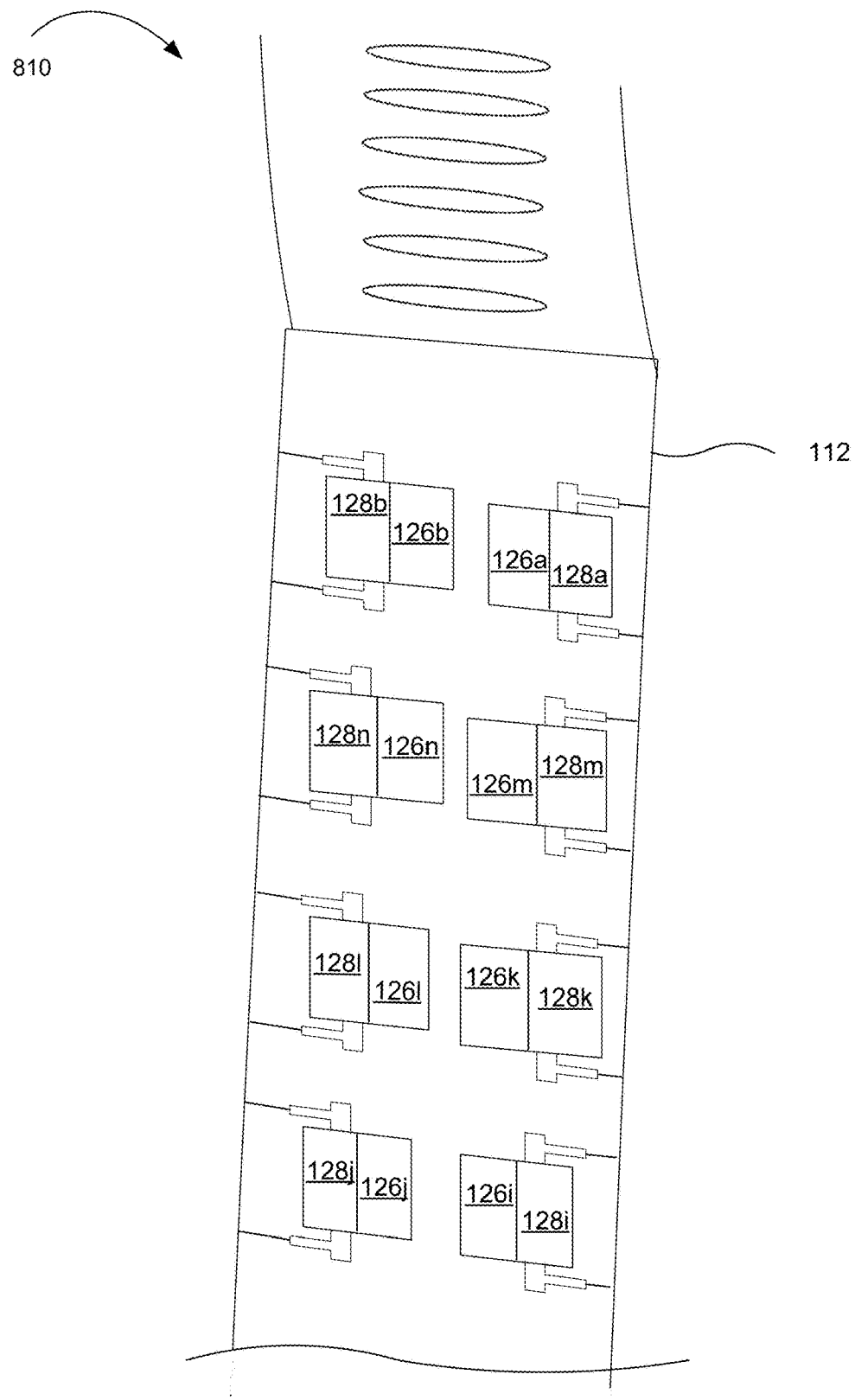
FIGS. 8A-8C illustrate different examples of wearable devices (e.g., wrist-wearable devices are one illustrative example used herein, but other wearable devices are also contemplated, including head-worn wearable devices like smart glasses) configured to adjust skin-depression depths of one or more neuromuscular-signal sensors included in the wearable devices, in accordance with some embodiments.
Figures 1, 8B:
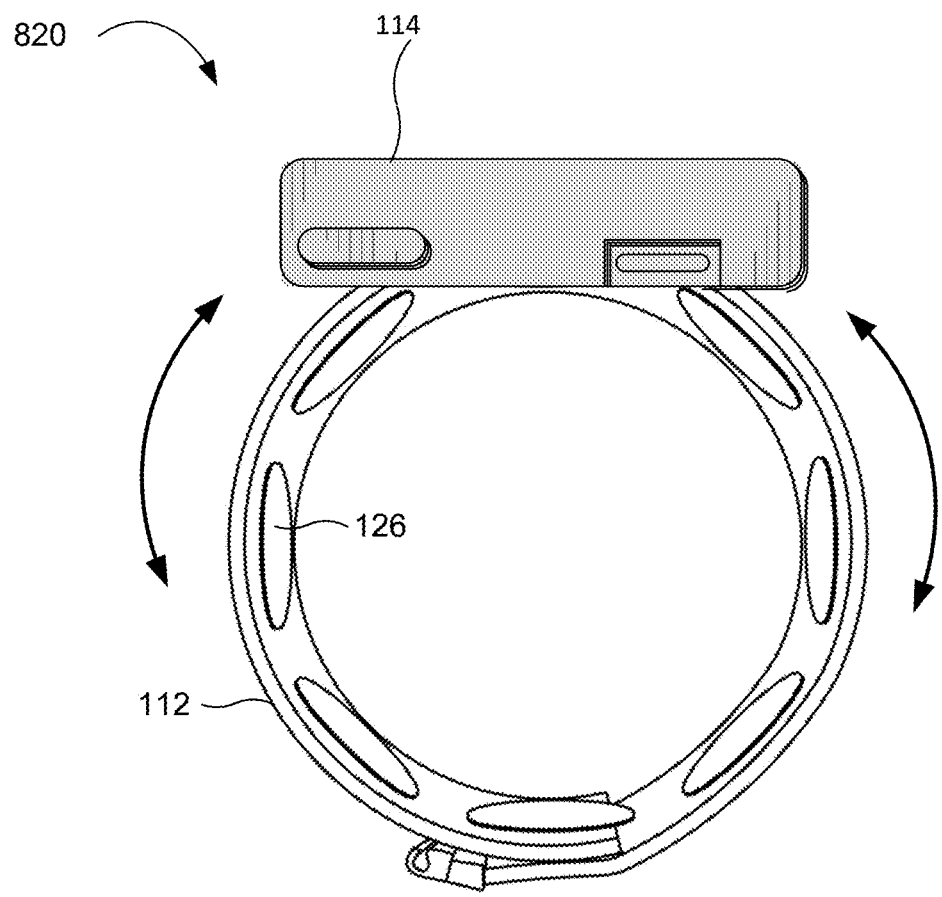
Figures 2, 8B:
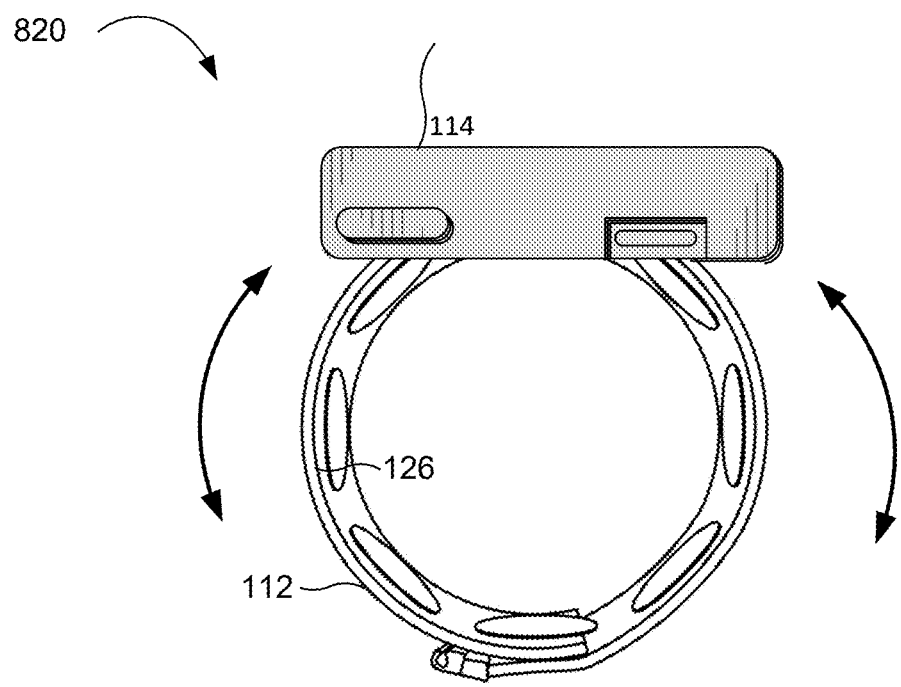
Figure 8C:
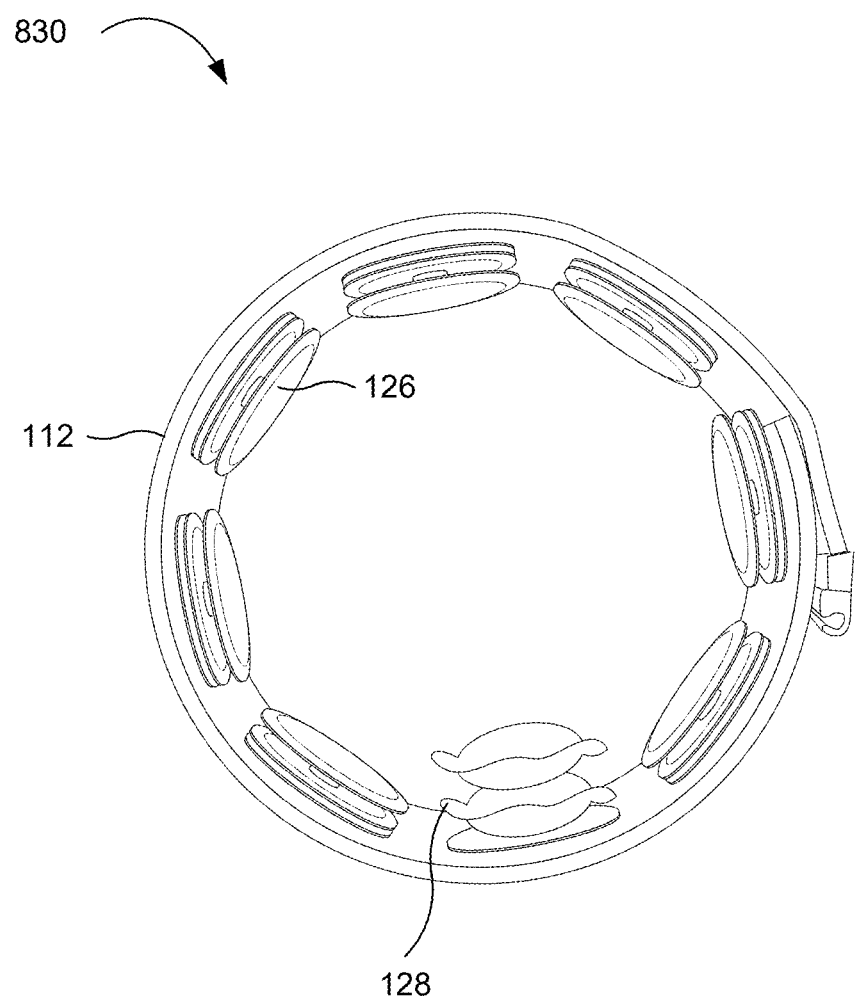

FIGS. 8A-8C illustrate different examples of wearable devices configured to adjust skin-depression depths of one or more neuromuscular-signal sensors 126 included in the wearable devices, in accordance with some embodiments. FIG. 8A illustrates a first wearable device 810 including one or more actuators 128 integrated in its wearable structure (e.g., a band portion 112). Each actuator 128 is coupled to at least one neuromuscular-signal sensor 126 and is configured to move the coupled at least one neuromuscular-signal sensor 126. In particular, each actuator 128 can receive a voltage (as shown and described above in reference to FIGS. 7A and 7B) that moves the coupled at least one neuromuscular-signal sensor 126 to a different skin-depression depth on a user's skin 137 (FIG. 1). As described above in reference to FIGS. 1A-6B, the different skin-depression depths are used to adjust an impedance value at a neuromuscular-signal sensor 126. In some embodiments, each actuator 128 is an electrostatic zipping actuator (as shown in FIGS. 9A and 9B).

FIG. 8B-1 illustrates a second wearable device 820 including one or more neuromuscular-signal sensors 126 integrated in its wearable structure (e.g., a band portion 112), in a loosened or extended configuration. FIG. 8B-2 illustrates the second wearable device 820, shown in FIG. 8B-1, in a compressed configuration (e.g., squeezing on to a user's skin). In some embodiments, the band portion 112 of the wearable structure is configured to compress (e.g., see FIG. 8B-2) or loosen on the user's skin 137 (see FIG. 8B-1). In particular, the second wearable device 820 is configured to compress (e.g., by retracting the band portion 112 into the capsule portion 114; FIG. 1) such that the one or more neuromuscular-signal sensors 126 move into the user's skin 137 to a different skin-depression depth. Alternatively, the second wearable device 820 is configured to loosen (e.g., by releasing a portion of the band portion 112 from the capsule portion 114) such that the one or more neuromuscular-signal sensors 126 pull away from the user's skin 137 to a different skin-depression depth. As described above in reference to FIGS. 1A-6B, the different skin-depression depths are used to adjust an impedance value at a neuromuscular-signal sensor 126.

FIG. 8C illustrates a third wearable device 830 including one or more actuators 128 integrated in its wearable structure (e.g., a band portion 112). Each actuator 128 is coupled to at least one neuromuscular-signal sensor 126 and is configured to move the coupled at least one neuromuscular-signal sensor 126. In particular, each actuator 128 can receive an air pressure that inflates or deflates to move the coupled at least one neuromuscular-signal sensor 126 to a different skin-depression depth on a user's skin 137 (FIG. 1). As described above in reference to FIGS. 1A-6B, the different skin-depression depths are used to adjust an impedance value at a neuromuscular-signal sensor 126.

Figure 9A:
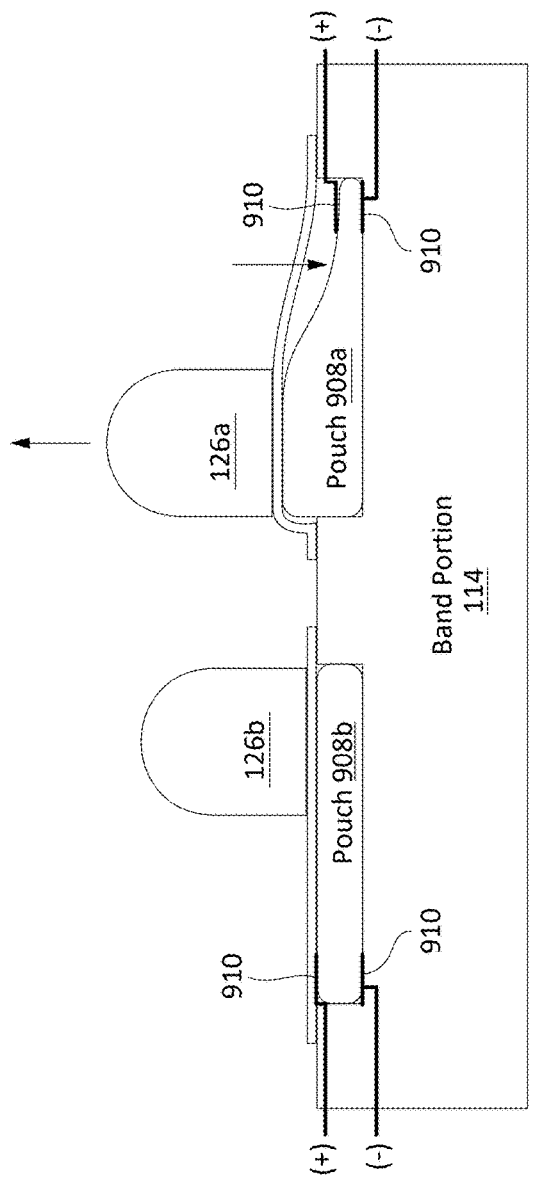
FIGS. 9A and 9B illustrate different embodiments of electrostatic zipping actuators coupled to neuromuscular-signal sensors, in accordance with some embodiments.
Figure 9B:
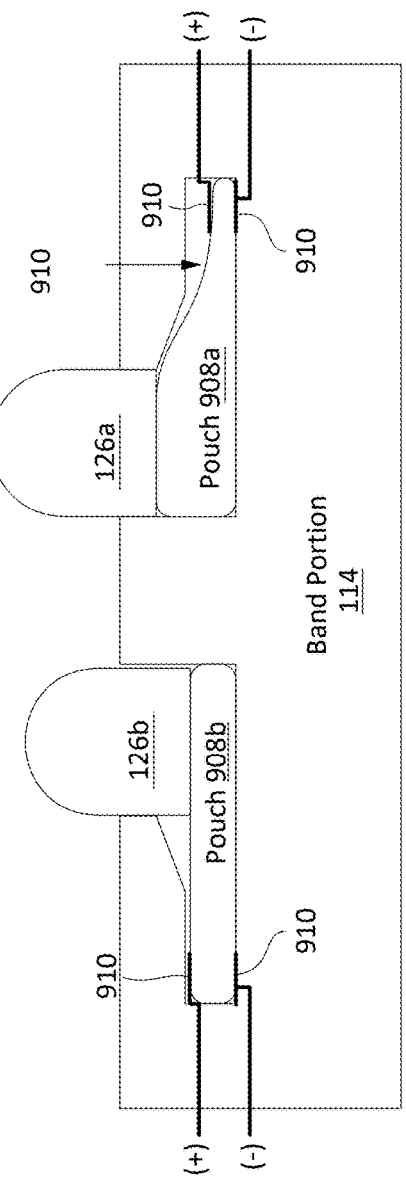

FIG. 9A illustrates electrostatic zipping actuators coupled to neuromuscular-signal sensors 126, in accordance with some embodiments. The electrostatic zipping actuator is an example of an actuator 128 described above in reference to FIGS. 1A-8A. In some embodiments, the electrostatic zipping actuator includes a pouch 908 coupled to a neuromuscular-signal sensor 126 at a first end and one or more electrical contacts 910 at a second end opposite the first end. In some embodiments, when a voltage is applied to the electrostatic zipping actuator via the one or more electrical contacts 910, the pouch 908 collapses along the second end and causes the first end to expand moving upward, such that the neuromuscular-signal sensors 126 coupled to the first end of the pouch 908 are able to depress into the user's skin 137 (FIG. 1) at different skin-depression depths. In some embodiments, each electrostatic zipping actuator is configured to move independently. For example, as shown in FIG. 9A, a voltage is applied to a first pouch 908a, but not a second pouch 908b, which results in a first neuromuscular-signal sensor 126a moving upwards while a second neuromuscular-signal sensors 126b remains at its same position.

FIG. 9B illustrates another example with electrostatic zipping actuators coupled to neuromuscular-signal sensors 126, in accordance with some embodiments. In particular, FIG. 9B illustrates the electrostatic zipping actuators and a portion of the neuromuscular-signal sensors 126 embedded within the band portion 114. The electrostatic zipping actuators and the neuromuscular-signal sensors 126 of FIG. 9B are configured to perform similar operations as described above in reference to FIG. 9A. An electrostatic zipping actuator is one example of an actuator included in the wearable device 110. In some embodiments, the actuators can be pneumatic actuators controlled by pressure, hydraulic actuators, mechanical actuators, or other actuators known in the art.

Figure 10:
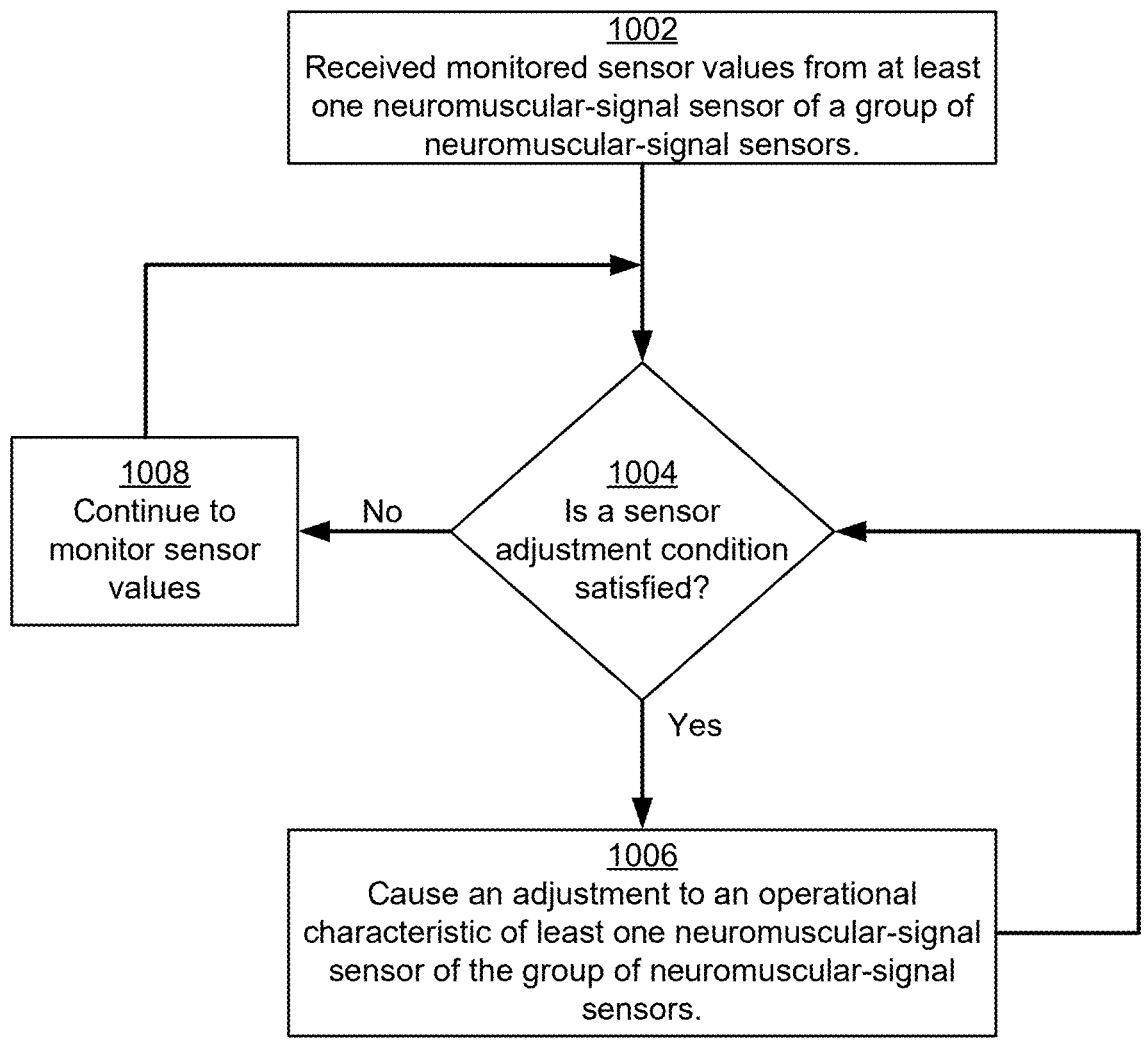
FIG. 10 illustrates a method of adjusting an operational characteristic associated with a neuromuscular-signal sensor to maintain or achieve a desired impedance value, in accordance with some embodiments.

FIG. 10 illustrates a method of adjusting a skin-depression depth for a neuromuscular-signal sensor, in accordance with some embodiments. Operations (e.g., steps) of the method 1000 can be performed by one or more processors (e.g., central processing unit 1426 and/or MCU 1452; FIG. 14) of a wearable device 110. At least some of the operations shown in FIG. 10 correspond to instructions stored in a computer memory or computer-readable storage medium (e.g., storage 1402, ram 1403, and/or memory 1450; FIG. 14). Operations 1002-1008 can also be performed in part using one or more processors and/or using instructions stored in memory or a computer-readable medium of an electronic device communicatively coupled to the wearable device 110 (e.g., a server can perform operations 1002-1008 alone or in conjunction with the one or more processors of the wrist-wearable device 110).

Method 1000 includes receiving (1002) monitored sensor values from at least one neuromuscular-signal sensor of a group of neuromuscular-signal sensors. For example, as shown and described above in reference to FIGS. 2A-6B, one or more neuromuscular-signal sensors 126 can depress into a user's skin (FIG. 1) at different skin-depression depths that can be used to sense neuromuscular signals. The method 1000 further includes determining (1004) whether a sensor adjustment condition is satisfied. In some embodiments, a sensor adjustment condition includes determining whether an impedance value measured at a neuromuscular-signal sensor is within a predefined range of impedance values. Examples of the predefined range of impedance values are provided above in reference to FIGS. 1A-3B. In some embodiments, a sensor adjustment condition includes determining whether there is an impedance mismatch between at least two neuromuscular-signal sensors within a predefined range of impedance values. Examples of an impedance mismatch between at least two neuromuscular-signal sensors are provided above in reference to FIG. 1 and FIGS. 4A-4B. In some embodiments, a sensor adjustment condition includes determining whether an impedance mismatch between at least two neuromuscular-signal sensors is outside a predetermined impedance tolerance. Examples of an impedance mismatch between at least two neuromuscular-signal sensors determined to be outside a predetermined impedance tolerance is provided above in reference to FIG. 1 and FIGS. 4C-6B. Alternatively, or additionally, in some embodiments, a sensor adjustment condition includes determining that a noise level (e.g., power-line interference) is above an EMG signal tolerance (e.g., 15 µVrms to 30 µVrms). For example, if a noise level (e.g., shown in FIG. 5) is greater than at least 15 µVrms, the sensor adjustment condition is satisfied.

In accordance with a determination that a sensor adjustment condition is not satisfied ("No" at operation 1004), the method 1000 continues (1008) to monitor sensor values and returns to operation 1004 to determine whether a sensor adjustment condition is satisfied. Alternatively, in accordance with a determination that a sensor adjustment condition is satisfied ("Yes" at operation 1004), the method 1000 continues to operation (1006) and causes an adjustment to an operational characteristic of least one neuromuscular-signal sensor of the group of neuromuscular-signal sensors, as described above in reference to FIGS. 1A-7B.

FIG. 11 is a flow chart for a method of adjusting an operational characteristic of a neuromuscular-signal sensor, in accordance with some embodiments. Operations (e.g., steps) of the method 1100 can be performed by one or more processors (e.g., central processing unit 1426 and/or MCU 1452; FIG. 14) of a wearable device 110. At least some of the operations shown in FIG. 11 correspond to instructions stored in a computer memory or a non-transitory computer-readable storage medium (e.g., storage 1402, ram 1403, and/or memory 1450; FIG. 14). Operations 1102-1008 can also be performed in part using one or more processors and/or using instructions stored in memory or a non-transitory computer-readable medium of an electronic device communicatively coupled to the wearable device 110 (e.g., a server can perform operations 1102-1108 alone or in conjunction with the one or more processors of the wearable device 110).

Method 1100 includes monitoring (1102), at a wearable device (e.g., wearable device 110) that includes a neuromuscular-signal sensor (e.g., neuromuscular-signal sensor 126a), an impedance at the sensor that impacts the neuromuscular-signal sensor's ability to sense neuromuscular signals. The neuromuscular-signal sensor is coupled to the wearable device such that it contacts a portion of a user's skin when the wearable device is donned by the user, as described above in reference to FIGS. 1A-6B. The method 1000 includes, in response to detecting (1104) a change in the impedance at the neuromuscular-signal sensor that causes the impedance to be outside of a predefined range of impedance values, causing (1106) an adjustment to an operational characteristic associated with the neuromuscular-signal sensor such that the impedance at the neuromuscular-signal sensor is within the predefined range of impedance values after the adjustment to the operational characteristic of the neuromuscular-signal sensor. For example, as shown above in reference to FIGS. 2A-3B, the neuromuscular-signal sensors are moved from an initial skin-depression depth to a distinct skin-depression depth.

In some embodiments, the change in the impedance at the neuromuscular-signal sensor is a change that increases an amount of power line interference present in neuromuscular signals detected via the neuromuscular-signal sensor. As such, the neuromuscular-signal sensor is moved to reduce the power line interference and improve the accuracy of the sensed neuromuscular signal. In some embodiments, the change in the impedance is detected automatically without any user input and the neuromuscular-signal sensor is caused to be moved automatically without any user input.

In some embodiments, the operational characteristic is a depth at which the neuromuscular-signal sensor is depressed into the user's skin when the wearable device is donned by the user. Before the change in the impedance is detected, the neuromuscular-signal sensor is depressed into the user's skin at a first skin-depression depth. With this type of neuromuscular-signal sensor (e.g., one that is depressed into a user's skin), causing the adjustment to the operational characteristic of the neuromuscular-signal sensor includes causing the neuromuscular-signal sensor to move until the neuromuscular-signal sensor depresses the portion of the user's skin to a second skin-depression depth that is distinct from the first skin-depression depth.

In some embodiments, causing the neuromuscular-signal sensor to move includes causing an actuator coupled to the neuromuscular-signal sensor to move. In some embodiments, the actuator is an electrostatic zipping actuator in which electric voltage changes are used for actuating the electrostatic zipping actuator. In some embodiments, the neuromuscular-signal sensor is a gold-plated electrode or an electrode made of a diamond-like coating, the electrode being sealingly coupled with the electrostatic zipping actuator. In some embodiments, the actuator is a pneumatically-controlled actuator. In some embodiments, the neuromuscular-signal sensor is coupled to a bladder that is fluidically coupled to the pneumatic actuator. In some embodiments, the actuator controls a fluidically-controlled actuator that is (e.g., liquid or air) within a wearable structure of the wearable device. In some embodiments, fluid is introduced into the actuator via a mechanical input on the wearable device (e.g., pressing a button on the wearable device to inflate the band).

In some embodiments, causing the sensor to move means moving the sensor itself or moving other components that then cause the sensor to move positionally (e.g., sliding the entire band such that skin-depression depth is adjusted, using an actuator to adjust positions for individual or groups of sensors, adjusting a tightness (by either loosening or tightening) of at least a portion of the band to cause the sensors at that portion of the band) to adjust their respective skin-depression depths. Moving can also mean adjusting the sensor to one or a number of different skin-depression depths to allow the device to find a new skin-depression depth at which the sensor then has an impedance within the predefined range of impedance values.

In some embodiments, the neuromuscular-signal sensor is part of a group of two or more neuromuscular-signal sensors that are configured to operate as a sensing channel for sensing neuromuscular signals, and movement of the neuromuscular-signal sensor to the second skin-depression depth is caused to occur while other neuromuscular-signal sensors in the group of two or more sensors remain in place (e.g., are not caused to be moved).

In some embodiments, the change in the impedance at the neuromuscular-signal sensor is a first change in the impedance at the neuromuscular-signal sensor, and the method 1000 further includes, while the neuromuscular-signal sensor is at the second skin-depression depth and in response to detecting a second change in the impedance at the neuromuscular-signal sensor that causes the impedance to again be outside of the predefined range of impedance values, causing the neuromuscular-signal sensor to move until the neuromuscular-signal sensor depresses the portion of the user's skin to a third skin-depression depth that is distinct from the second skin-depression depth, and the impedance for the neuromuscular-signal sensor is within the predefined range of impedance values while the neuromuscular-signal sensor is at the third skin-depression depth. In some embodiments, the third skin-depression depth is distinct from the first skin-depression depth. Alternatively, in some embodiments, the third skin-depression depth is the same as the first skin-depression depth. Examples of adjustments due to changes in impedance values are provided above in reference to FIGS. 4A-3B.

In some embodiments, the first skin-depression depth is less than the second skin-depression depth, and the third skin-depression depth is greater than the second skin-depression depth, such that the neuromuscular-signal sensor can be caused to be pushed into the portion of the user's skin or caused to be pulled away from the user's skin to allow for maintaining the impedance at the neuromuscular-signal sensor within the predefined range of impedance values. As such, the neuromuscular-signal sensor can be caused to be moved both into and away from the user's skin such that its impedance can be discretely adjusted to cause the impedance to be either higher or lower.

In some embodiments, the first, second, and third changes in the impedance are caused by one or more of moisture at the portion of the user's skin, hair follicles at the portion of the user's skin, and motion of the user that causes the neuromuscular-signal sensor to move within the portion of the user's skin (e.g., to a resting position after the user has moved).

In some embodiments, the neuromuscular-signal sensor is a first neuromuscular-signal sensor, the predefined range of impedance values is a first predefined range of impedance values, the wearable device includes a second neuromuscular-signal sensor, and the method 1100 further includes monitoring a second impedance at the second neuromuscular-signal sensor that impacts the second neuromuscular-signal sensor's ability to sense neuromuscular signals. The second neuromuscular-signal sensor is coupled to the wearable device such that it depresses a portion of the user's skin to a particular skin-depression depth. In response to detecting a change in the second impedance at the second neuromuscular-signal sensor that causes the second impedance to be outside of a second predefined range of impedance values, causing the second neuromuscular-signal sensor to move until the second neuromuscular-signal sensor depresses a second portion of the user's skin to another particular skin-depression depth that is distinct from the particular skin-depression depth. In some embodiments, causing the second neuromuscular-signal sensor to move is performed independently of causing the first sensor to move. In other words, movement of the two sensors can be controlled using separate components, since the respective skin-depression depths (even for sensors in a same group of sensors) can be controlled independently. In alternative embodiments, sensors in a same group of sensors can be caused to be moved together using a single component (such as an actuator coupled to both sensors in a pair of sensors).

In some embodiments, the second impedance at the second neuromuscular-signal sensor is within the second predefined range of impedance values while the second neuromuscular-signal sensor is at the other particular skin-depression depth. In some embodiments, the first predefined range of impedance values is distinct from the second predefined range of impedance values, the first predefined range of impedance values is specific to the first neuromuscular-signal sensor, and the second predefined range of impedance values is specific to the second neuromuscular-signal sensor. In some embodiments, each sensor has a respective predefined range of impedance values. In some embodiments, the predefined range of impedance values is based on a location of the user's body where the sensor is placed. In some embodiments, the first and second neuromuscular-signal sensors are part of a first group of neuromuscular-signal sensors configured as a first channel for sensing neuromuscular signals.

In some embodiments, the wearable device includes a second group of at least two neuromuscular-signal sensors configured as a second channel for sensing neuromuscular signals, and the method 1100 further includes, for each respective neuromuscular-signal sensor of the second group of neuromuscular-signal sensors, monitoring a respective impedance at the respective neuromuscular-signal sensor that impacts the respective neuromuscular-signal sensor's ability to sense neuromuscular signals. The respective neuromuscular-signal sensor is coupled to the wearable device such that it depresses a respective portion of the user's skin to a first respective skin-depression depth. The method 1100 includes, in response to detecting a change in the respective impedance at the respective sensor that causes the respective impedance to be outside of a respective predefined range of impedance values, causing the respective neuromuscular-signal sensor to move until it depresses the respective portion of the user's skin to a second respective skin-depression depth that is distinct from the first respective skin-depression depth. The respective impedance at the respective neuromuscular-signal sensor is within the respective predefined range of impedance values while the respective neuromuscular-signal sensor is at the second respective skin-depression depth. In some embodiments, each respective predefined range of impedance values is a distinct predefined range of impedance values. In some embodiments, the first predefined range of impedance values and the second predefined range of impedance values are the same.

FIG. 12 is a flow chart for a method of matching impedances for neuromuscular-signal sensors of a wearable device, in accordance with some embodiments. Operations (e.g., steps) of the method 1200 can be performed by one or more processors (e.g., central processing unit 1426 and/or MCU 1452; FIG. 14) of a wearable device 110. At least some of the operations shown in FIG. 11 correspond to instructions stored in a computer memory or a non-transitory computer-readable storage medium (e.g., storage 1402, ram 1403, and/or memory 1450 FIG. 14). Operations 1202-1208 can also be performed in part using one or more processors and/or using instructions stored in memory or a non-transitory computer-readable medium of an electronic device communicatively coupled to the wearable device 110 (e.g., a server can perform operations 1202-1208 alone or in conjunction with the one or more processors of the wearable device 110).

Method 1200 includes detecting (1202), at a wearable device that includes a first neuromuscular-signal sensor and a second neuromuscular-signal sensor, an impedance mismatch between respective impedances at the first and second neuromuscular-signal sensors while the first and second neuromuscular-signal sensors are in contact with respective portions of a user's skin when the wearable device is donned by the user. The method 1200 includes, in response to detecting the impedance mismatch, causing (1204) an adjustment to an operational characteristic associated with the first neuromuscular-signal sensor such that the respective impedances for the first and second neuromuscular-signal sensors are determined to be matching after the adjustment to the operational characteristic of the first neuromuscular-signal sensor. In some embodiments, the impedance mismatch is detected automatically without any user input and the neuromuscular-signal sensor is caused to be moved automatically without any user input.

In some embodiments, the operational characteristic is a depth at which the first neuromuscular-signal sensor is depressed into the user's skin when the wearable device is donned by the user. Before the change in the impedance is detected, the first neuromuscular-signal sensor is depressed into the user's skin at a first skin-depression depth and the second neuromuscular-signal sensor is depressed into the user's skin at a second skin-depression depth, and causing the adjustment to the operational characteristic of the first neuromuscular-signal sensor includes causing the first neuromuscular-signal sensor to move until the first neuromuscular-signal sensor depresses a respective portion of the user's skin to a third skin-depression depth that is distinct from the first skin-depression depth. In some embodiments, the third skin-depression depth is distinct from the second skin-depression depth. Alternatively, in some embodiments, the third skin-depression depth is the same as the second skin-depression depth. Additional examples of adjustments to a neuromuscular-signal sensor based on an impedance mismatch are provided above in reference to FIGS. 4A-4B.

In some embodiments, the first and second neuromuscular-signal sensors form part of a group of two or more neuromuscular-signal sensors configured to operate as a sensor channel for sensing neuromuscular signals. In some embodiments, the mismatch-based impedance check can be performed as intra-group impedance checks for various sensor channels of the wearable device; for example, the mismatch-based impedance check shown and described above in reference to FIGS. 4A-4B. Alternatively, in some embodiments, the first neuromuscular-signal sensor is part of a first group of two or more neuromuscular-signal sensors configured to operate as a first sensor channel for sensing neuromuscular signals, and the second neuromuscular-signal sensor is part of a second group of two or more neuromuscular-signal sensors configured to operate as a second sensor channel for sensing neuromuscular signals; for example, the mismatch-based impedance check shown and described above in reference to FIGS. 6A-6B.

In some embodiments, respective groups of neuromuscular-signal sensors are positioned along respective distinct widthwise segments of the wearable device, and at least one group of neuromuscular-signal sensors is positioned along a respective widthwise segment of the wearable device that separates the first and second groups of two or more neuromuscular-signal sensors. In some embodiments, respective groups of neuromuscular-signal sensors are positioned along respective distinct widthwise segments of the wearable device, and the first and second groups of two or more neuromuscular-signal sensors are positioned along adjacent widthwise segments of the wearable device. In some embodiments, respective groups of neuromuscular-signal sensors are positioned along respective distinct widthwise segments of the wearable device, the second group of two or more neuromuscular-signal sensors being a reference group of neuromuscular-signal sensors. Respective impedances for each of the other respective groups of two or more neuromuscular-signal sensors are matched with a respective impedance at the second group of two or more neuromuscular-signal sensors by causing one or more of the neuromuscular-signal sensors in each of the respective groups to move so that they are at a skin-depression depth at which impedances at each group are matching with a respective impedance at the second group. In some embodiments, there can be various groupings for which impedance matching is performed (e.g., can match for each adjacent group, match for all groups located between the ulnar and ventral regions of the wrist, etc.).

In some embodiments, the impedance mismatch is a first impedance mismatch, and the method 1200 further includes, in response to detecting a second impedance mismatch between the respective impedances at the first and second neuromuscular-signal sensors, causing the second neuromuscular-signal sensor to move until the second neuromuscular-signal sensor is depressed into the user's skin at a fourth skin-depression depth that is distinct from the second skin-depression depth, and the respective impedances for the first and second neuromuscular-signal sensors are determined to be matching while the first and second neuromuscular-signal sensors are depressed into the user's skin at the third and fourth skin-depression depths, respectively. Alternatively, the first sensor can be moved instead of the second sensor. In some embodiments, the fourth skin-depression depth is distinct from the first and/or third skin-depression depth. Alternatively, in some embodiments, the fourth skin-depression depth is the same as the first or second skin-depression depth. Examples of the different adjustments based on an impedance mismatch are provided above in reference to FIGS. 4A-4B.

In some embodiments, causing a respective neuromuscular-signal sensor to move includes causing an actuator coupled to the respective neuromuscular-signal sensor to move. In some embodiments, the respective neuromuscular-signal sensor is a gold-plated electrode or an electrode made of a diamond-like coating, the electrode being sealingly coupled with the electrostatic zipping actuator (e.g., electrostatic zipping actuator shown in FIGS. 9A and 9B). In some embodiments, the actuator is an electrostatic zipping actuator in which electric voltage changes are used for actuating the electrostatic zipping actuator. In some embodiments, the actuator is a pneumatically-controlled actuator (e.g., the pneumatic haptic wristband shown in FIG. 8C). In some embodiments, the neuromuscular-signal sensor is coupled to a bladder that is fluidically coupled to the pneumatic actuator. In some embodiments, the actuator controls a fluidically-controlled actuator that is (e.g., liquid or air) within a wearable structure of the wearable device. In some embodiments, fluid is introduced into the actuator via a mechanical input on the wearable device (e.g., press of a button on the wearable device to inflate the band).

In some embodiments, the method 1200 further includes, in response to detecting a third impedance mismatch between the respective impedances at the first and second neuromuscular-signal sensors, causing both of the first and second neuromuscular-signal sensors to move until the respective impedances for the first and second neuromuscular-signal sensors are determined to be matching while the first and second neuromuscular-signal sensors are depressed into the user's skin at respective skin-depression depths distinct from the first and second skin-depression depths. In other words, both sensors can be moved simultaneously to achieve desired impedance values.

In some embodiments, causing both of the first and second neuromuscular-signal sensors to move includes causing the first and second neuromuscular-signal sensors to move independently or together to different skin-depression depths until a determination is made that the respective impedances for the first and second neuromuscular-signal sensors match. The skin-depression depth of the sensor can be discretely controlled for each individual neuromuscular-signal sensor to allow for fine-grained control over the impedance by making fine-grained adjustments to the sensor's skin-depression depth. Some embodiments can thus couple individual adjustable components to individual sensors, while other embodiments couple adjustable components to groups of two or more sensors. In some embodiments, in addition to determining that the impedances match, the system can also determine (e.g., as a secondary verification check) that impedances for the first and second sensors remain within respective predefined ranges (which can be sensor-specific, group-specific, or system-wide ranges) of impedance values. Thus, the techniques described herein for verifying that impedances for two different sensors match can also be performed in conjunction with the techniques described above for verifying that impedance values at different sensors remain within predefined impedance ranges.

Further embodiments also include various subsets of the above embodiments including embodiments in FIGS. 1-12 combined or otherwise re-arranged.

Figure 13A:
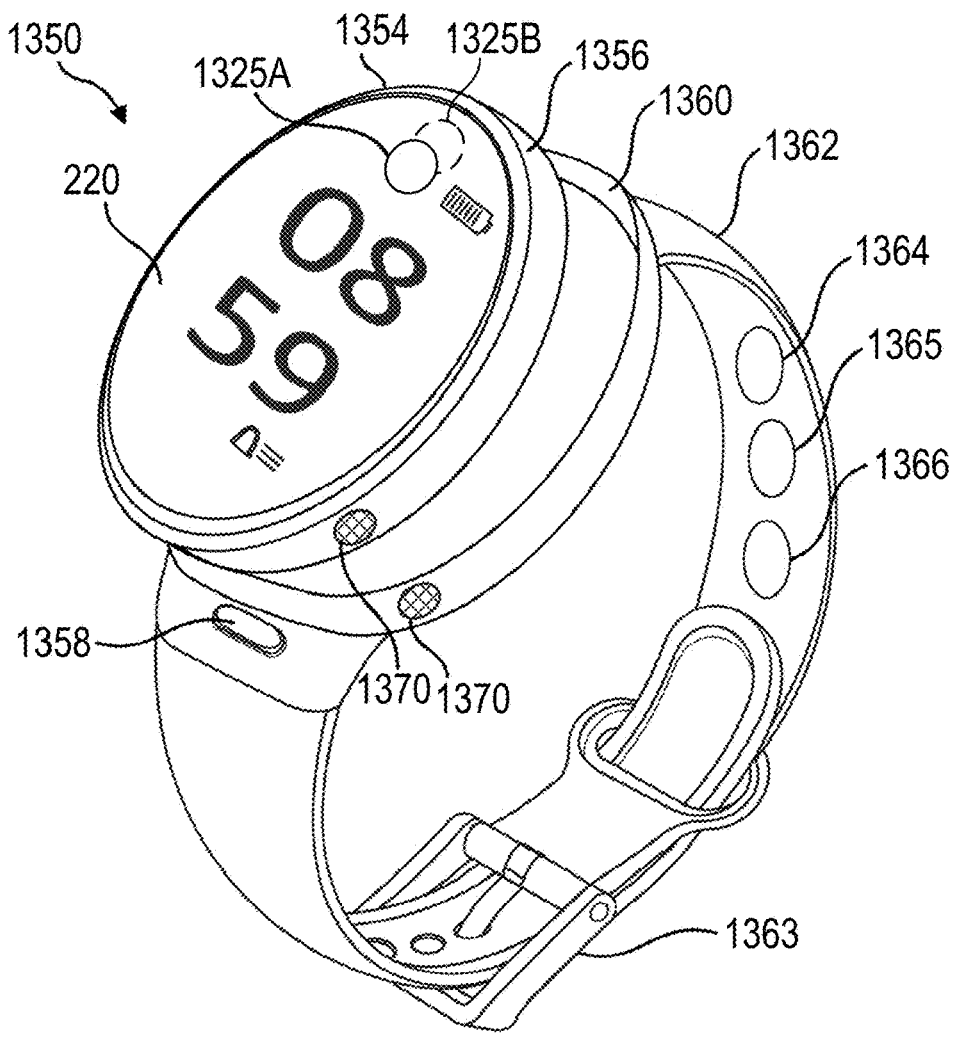
FIGS. 13A and 13B illustrate one non-limiting example of a wearable device (a wrist-wearable device in the example figures) that can be used in conjunction with the method of adjusting a skin-depression depth or a method of matching impedances for neuromuscular-signal sensors of a wearable device, in accordance with some embodiments.
Figure 13B:
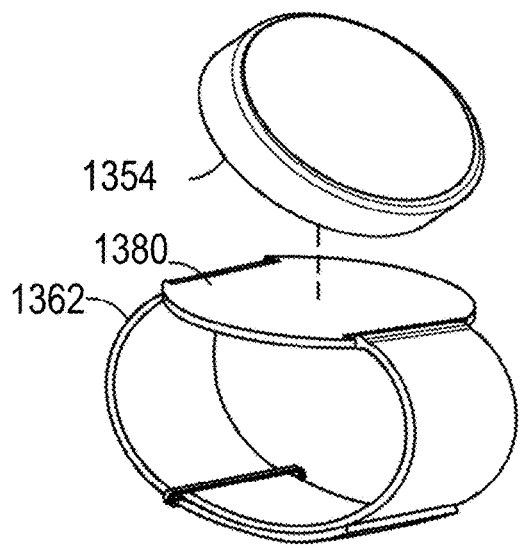

FIGS. 13A and 13B illustrate one non-limiting example of a device (e.g., a wearable device 110) that can be used in conjunction with the method of adjusting a skin-depression depth or a method of matching impedances for neuromuscular-signal sensors of a wearable device, in accordance with some embodiments. The wrist-wearable device 1300 is an instance of a wearable device for moving neuromuscular-signal sensors described above in reference to FIGS. 1A-6B. FIG. 13A illustrates a perspective view of the wrist-wearable device 1300 that includes a watch body 1354 (or capsule) decoupled from a watch band 1362. In some embodiments, one or more components described above in reference to a wearable device 1350 are included within the watch body 1354 and/or the band 1362 of the wrist-wearable device 1350. Watch body 1354 and watch band 1362 can have a substantially rectangular or circular shape and can be configured to allow a user to wear the wrist-wearable device 1300 on a body part (e.g., a wrist). The wrist-wearable device 1300 can include a retaining mechanism 1363 (e.g., a buckle, a hook and loop fastener, etc.) for securing watch band 1362 to the user's wrist. The wrist-wearable device 1350 can also include a coupling mechanism 1360 (e.g., a cradle) for detachably coupling capsule or watch body 1354 (via a coupling surface 1356 of the watch body 1354) to watch band 1362.

The wrist-wearable device 1350 can perform various functions and operations with reference to FIGS. 1A-4D and 6A-6B. As will be described in more detail below with reference to FIG. 14, functions executed by the wrist-wearable device 1350 can include, without limitation, display of visual content to the user, sensing user input (e.g., sensing a touch on button 1358, sensing biometric data on sensor 1364, sensing neuromuscular signals on neuromuscular sensor 1365, etc.), messaging (e.g., text, speech, video, etc.), image capture, wireless communications (e.g., cellular, near field, Wi-Fi, personal area network, etc.), location determination, financial transactions, providing haptic feedback, alarms, notifications, biometric authentication, health monitoring, sleep monitoring, etc. These functions can be executed independently in watch body 1354, independently in watch band 1362, and/or in communication between watch body 1354 and watch band 1362. In some embodiments, functions can be executed on the wrist-wearable device 1350 in conjunction with an artificial-reality environment which includes, but is not limited to, virtual-reality (VR) environments (including non-immersive, semi-immersive, and fully-immersive VR environments), augmented-reality environments (including marker-based augmented-reality environments, marker-less augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

The watch band 1362 can be configured to be worn by a user such that an inner surface of the watch band 1362 is in contact with the user's skin. When worn by a user, sensor 1364 is in contact with the user's skin. The sensor 1364 can be a biosensor that senses a user's heart rate, saturated oxygen level, temperature, sweat level, muscle intentions, or a combination thereof. The watch band 1362 can include multiple sensors 1364 that can be distributed on an inside and/or an outside surface of the watch band 1362. Additionally, or alternatively, the watch body 1354 can include the same or different sensors than the watch band 1362 (or the watch band 1362 can include no sensors at all in some embodiments). For example, multiple sensors can be distributed on an inside and/or an outside surface of watch body 1354. As described below with reference to FIG. 14, the watch body 1354 can include, without limitation, front-facing image sensor 1325A and/or rear-facing image sensor 1325B, a biometric sensor, an IMU, a heart rate sensor, a saturated oxygen sensor, a neuromuscular sensor(s) (e.g., EMG sensors 1446; FIG. 14), an altimeter sensor, a temperature sensor, a bioimpedance sensor, a pedometer sensor, an optical sensor, a touch sensor, a sweat sensor, etc. The sensor 1364 can also include a sensor that provides data about a user's environment including a user's motion (e.g., an IMU), altitude, location, orientation, gait, or a combination thereof. The sensor 1364 can also include a light sensor (e.g., an infrared light sensor, a visible light sensor) that is configured to track a position and/or motion of watch body 1354 and/or watch band 1362. Watch band 1362 can transmit the data acquired by the sensor 1364 to watch body 1354 using a wired communication method (e.g., a UART, a USB transceiver, etc.) and/or a wireless communication method (e.g., near field communication, Bluetooth™, etc.). Watch band 1362 can be configured to operate (e.g., to collect data using sensor 1364) independent of whether watch body 1354 is coupled to or decoupled from watch band 1362.

The watch band 1362 and/or watch body 1354 can include a haptic device 1366 (e.g., a vibratory haptic actuator) that is configured to provide haptic feedback (e.g., a cutaneous and/or kinesthetic sensation, etc.) to the user's skin. The sensor 1364 and/or haptic device 1366 can be configured to operate in conjunction with multiple applications including, without limitation, health monitoring, social media, game playing, and artificial reality (e.g., the applications associated with artificial reality).

In some examples, the watch band 1362 can include a neuromuscular sensor 1365 (e.g., an electromyography (EMG) sensor, a mechanomyogram (MMG) sensor, a sonomyography (SMG) sensor, actuator, etc.). Neuromuscular sensor 1365 can sense a user's intention to perform certain motor actions. The sensed muscle intention can be used to control certain user interfaces displayed on the display of the wrist-wearable device 1300 and/or can be transmitted to device responsible for rendering an artificial-reality environment (e.g., a head-worn wearable device) to perform an action in an associated artificial-reality environment, such as to control the motion of a virtual device displayed to the user.

Signals from neuromuscular sensor 1365 can be used to provide a user with an enhanced interaction with a physical object and/or a virtual object in an artificial-reality application generated by an artificial-reality system (e.g., user interface objects presented on the display, or another computing device (e.g., a head-worn wearable device, such as smart glasses)). Signals from neuromuscular sensor 1365 can be obtained (e.g., sensed and recorded) by one or more neuromuscular sensors 1365 of watch band 1362. Although FIG. 13A shows one neuromuscular sensor 1365, watch band 1362 can include a plurality of neuromuscular sensors 1365 arranged circumferentially on an inside surface of watch band 1362 such that the plurality of neuromuscular sensors 1365 contact the skin of the user. Watch band 1362 can include a plurality of neuromuscular sensors 1365 arranged circumferentially on an inside surface of watch band 1362. Neuromuscular sensor 1365 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The wrist-wearable device 1350 can include a coupling mechanism (also referred to as a cradle) for detachably coupling watch body 1354 to watch band 1362. A user can detach watch body 1354 from watch band 1362 in order to reduce the encumbrance of the wrist-wearable device 1350 to the user. The wrist-wearable device 1350 can include a coupling surface 1356 on the watch body 1354 and/or coupling mechanism(s) 1360 (e.g., a cradle, a tracker band, a support base, a clasp). A user can perform any type of motion to couple watch body 1354 to watch band 1362 and to decouple watch body 1354 from watch band 1362. For example, a user can twist, slide, turn, push, pull, or rotate watch body 1354 relative to watch band 1362, or a combination thereof, to attach watch body 1354 to watch band 1362 and to detach watch body 1354 from watch band 1362.

As shown in the example of FIG. 13A, watch band coupling mechanism 1360 can include a type of frame or shell that allows watch body 1354 coupling surface 1356 to be retained within watch band coupling mechanism 1360. Watch body 1354 can be detachably coupled to watch band 1362 through a friction fit, magnetic coupling, a rotation-based connector, a shear-pin coupler, a retention spring, one or more magnets, a clip, a pin shaft, a hook and loop fastener, or a combination thereof. In some examples, watch body 1354 can be decoupled from watch band 1362 by actuation of release mechanism 1370. The release mechanism 1370 can include, without limitation, a button, a knob, a plunger, a handle, a lever, a fastener, a clasp, a dial, a latch, or a combination thereof.

The wrist-wearable device 1350 can include a single release mechanism 1370 or multiple release mechanisms 1370 (e.g., two release mechanisms 1370 positioned on opposing sides of the wrist-wearable device 1350, such as spring-loaded buttons). As shown in FIG. 13A, the release mechanism 1310 can be positioned on watch body 1354 and/or watch band coupling mechanism 1360. Although FIG. 13A shows release mechanism 1370 positioned at a corner of watch body 1354 and at a corner of watch band coupling mechanism 1360, the release mechanism 1370 can be positioned anywhere on watch body 1354 and/or watch band coupling mechanism 1360 that is convenient for a user of the wrist-wearable device 1350 to actuate. A user of the wrist-wearable device 1350 can actuate the release mechanism 1370 by pushing, turning, lifting, depressing, shifting, or performing other actions on the release mechanism 1370. Actuation of the release mechanism 1370 can release (e.g., decouple) the watch body 1354 from the watch band coupling mechanism 1360 and the watch band 1362, allowing the user to use the watch body 1354 independently from watch band 1362. For example, decoupling the watch body 1354 from the watch band 1362 can allow the user to capture images using rear-facing image sensor 1325B.

FIG. 13B is a perspective view of another example of the wrist-wearable device 1350. The wrist-wearable device 1350 of FIG. 13B can include a watch body interface 1380 (another example of a cradle for the capsule portion of the wrist-wearable device 1350). The watch body 1354 can be detachably coupled to the watch body interface 1380. Watch body 1354 can be detachably coupled to watch body interface 1380 through a friction fit, magnetic coupling, a rotation-based connector, a shear-pin coupler, a retention spring, one or more magnets, a clip, a pin shaft, a hook and loop fastener, or a combination thereof.

In some examples, watch body 1354 can be decoupled from watch body interface 1380 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 1354, independently in watch body interface 1380, and/or in communication between watch body 1354 and watch body interface 1380. Watch body interface 1380 can be configured to operate independently (e.g., execute functions independently) from watch body 1354. Additionally, or alternatively, watch body 1354 can be configured to operate independently (e.g., execute functions independently) from watch body interface 1380. As will be described in more detail below with reference to the block diagram of FIG. 14, watch body interface 1380 and/or watch body 1354 can each include the independent resources required to independently execute functions. For example, watch body interface 1380 and/or watch body 1354 can each include a power source (e.g., a battery), a memory, data storage, a processor (e.g., a CPU), communications, a light source, and/or input/output devices.

In this example, watch body interface 1380 can include all of the electronic components of watch band 1362. In additional examples, one or more electronic components can be housed in watch body interface 1380 and one or more other electronic components can be housed in portions of watch band 1362 away from watch body interface 1380.

FIG. 14 is one non-limiting block diagram of a device (e.g., a wrist-wearable device system 1400) that can be used in conjunction with the method of adjusting a skin-depression depth or a method of matching impedances for neuromuscular-signal sensors of a wearable device, described herein, in accordance with some embodiments. The wearable device 110 and/or wrist-wearable device 1350 described in detail above is an example of a wrist-wearable device system 1400, so wearable device 110 and/or wrist-wearable device 1350 will be understood to include the components shown and described for system 1400 below. The wrist-wearable device system 1400 can have a split architecture (e.g., a split mechanical architecture, a split electrical architecture) between a watch body 1404 (e.g., watch body 1354 or a capsule) and a watch band 1412 (e.g., a band portion 1362), which was described above in reference to FIGS. 13A and 13B. Each of watch body 1404 and watch band 1412 can have a power source, a processor, a memory, sensors, a charging device, and a communications device that enables each of watch body 1404 and watch band 1412 to execute computing, controlling, communication, and sensing functions independently in watch body 1404, independently in watch band 1412, and/or in communication between watch body 1404 and watch band 1412.

For example, watch body 1404 can include capacitive sensor 1477, magnetic field sensor, antenna return-loss (RL) sensor, biometric sensor, battery 1428, CPU 1426, storage 1402, heart rate sensor 1458, EMG sensor 1446, actuator 128 (e.g., FIGS. 1-6B and FIGS. 9A and 9B), SpO2 sensor 1454, altimeter 1448, IMU 1442, random access memory 1403, charging input 1430 and communication devices NFC 1415, LTE 1418, and WiFi/Bluetooth 1420. Similarly, watch band 1412 can include battery 1438, microcontroller unit 1452, memory 1450, heart rate sensor 1458, EMG sensor 1446, SpO2 sensor 1454, altimeter 1448, IMU 1442, charging input 1434 and wireless transceiver 1440. In some examples, a level of functionality of at least one of watch band 1412 or watch body 1404 can be modified when watch body 1404 is detached from watch band 1412. The level of functionality that can be modified can include the functionality of at least one sensor (e.g., heart rate sensor 1458, EMG sensor 1446, etc.). Each of watch body 1404 and watch band 1412 can execute instructions stored in storage 1402 and memory 1450 respectively that enables at least one sensor (e.g., heart rate sensor 1458, EMG sensor 1446, etc.) in watch band 1412 to acquire data when watch band 1412 is detached from watch body 1404 and when watch band 1412 is attached to watch body 1404.

Watch body 1404 and watch band 1412 can further execute instructions stored in storage 1402 and memory 1450 respectively that enables watch band 1412 to transmit the acquired data to watch body 1404 (or other computing device such as a head mounted display or other computing device communicatively coupled to the wrist-wearable device system 1400) using wired communications 1427 and/or wireless transceiver 1440. For example, watch body 1404 can display visual content to a user on touchscreen display 1413 (e.g., an instance of display of wearable device 110) and play audio content on speaker 1474. Watch body 1404 can receive user inputs such as audio input from microphone 1472 and touch input from buttons 1424. Watch body 1404 can also receive inputs associated with a user's location and/or surroundings. For example, watch body 1404 can receive location information from GPS 1416 and/or altimeter 1448 of watch band 1412.

Watch body 1404 can receive image data (e.g., captured image frames) from at least one image sensor 1435 (e.g., a camera). Image sensor 1435 can include front-facing image sensor 1325 (FIG. 13A) and/or rear-facing image sensor 1325A (FIG. 13A). Front-facing image sensor 1425A and/or rear-facing image sensor 1425B can capture wide-angle images of the area surrounding front-facing image sensor 1425A and/or rear-facing image sensor 1425B such as hemispherical images (e.g., at least hemispherical, substantially spherical, etc.), 180-degree images, 360-degree area images, panoramic images, ultra-wide area images, or a combination thereof. In some examples, front-facing image sensor 1425A and/or rear-facing image sensor 1425B can be configured to capture images having a range between 45 degrees and 360 degrees. Certain input information received by watch body 1404 (e.g., user inputs, etc.) can be communicated to watch band 1412. Similarly, certain input information (e.g., acquired sensor data, neuromuscular sensor data, etc.) received by watch band 1412 can be communicated to watch body 1404.

Watch body 1404 and watch band 1412 can receive a charge using a variety of techniques. In some embodiments, watch body 1404 and watch band 1412 can use a wired charging assembly (e.g., power cords) to receive the charge. Alternatively, or in addition, watch body 1404 and/or watch band 1412 can be configured for wireless charging. For example, a portable charging device can be designed to mate with a portion of watch body 1404 and/or watch band 1412 and wirelessly deliver usable power to a battery of watch body 1404 and/or watch band 1412.

Watch body 1404 and watch band 1412 can have independent power and charging sources to enable each to operate independently. Watch body 1404 and watch band 1412 can also share power (e.g., one can charge the other) via power management IC 1432 in watch body 1404 and power management IC 1436 in watch band 1412. Power management IC 1432 and power management IC 1436 can share power over power and ground conductors and/or over wireless charging antennas.

Wrist-wearable device system 1400 can operate in conjunction with a health monitoring application that acquires biometric and activity information associated with the user. The health monitoring application can be designed to provide information to a user that is related to the user's health. For example, wrist-wearable device system 1400 can monitor a user's physical activity by acquiring data from IMU 1442 while simultaneously monitoring the user's heart rate via heart rate sensor 1458 and saturated blood oxygen levels via SpO2 sensor 1454. CPU 1426 can process the acquired data and display health related information to the user on touchscreen display 1413.

Wrist-wearable device system 1400 can detect when watch body 1404 and watch band 1412 are connected to one another (e.g., mechanically connected and/or electrically or magnetically connected) or detached from one another. For example, pin(s), power/ground connections 1460, wireless transceiver 1440, and/or wired communications 1427, can detect whether watch body 1404 and watch band 1412 are mechanically and/or electrically or magnetically connected to one another (e.g., detecting a disconnect between the one or more electrical contacts of power/ground connections 1460 and/or wired communications 1427). In some examples, when watch body 1404 and watch band 1412 are mechanically and/or electrically disconnected from one another (e.g., watch body 1412 has been detached from watch band 1412 as described with reference to FIGS. 13A and 13B), watch body 1404 and/or watch band 1412 can operate with a modified level of functionality (e.g., reduced functionality) as compared to when watch body 1404 and watch band 1412 are mechanically and/or electrically connected to one another. The modified level of functionality (e.g., switching from full functionality to reduced functionality and from reduced functionality to full functionality) can occur automatically (e.g., without user intervention) when wrist-wearable device system 1400 determines that watch body 1404 and watch band 1412 are mechanically and/or electrically disconnected from one another and connected to each other, respectively.

Modifying the level of functionality (e.g., reducing the functionality in watch body 1404 and/or watch band 1412) can reduce power consumption in battery 1428 and/or battery 1438. For example, any of the sensors (e.g., heart rate sensor 1458, EMG sensor 1446, SpO2 sensor 1454, altimeter 1448, etc.), processors (e.g., CPU 1426, microcontroller unit 1452, etc.), communications elements (e.g., NFC 1415, GPS 1416, LTE 1418, WiFi/Bluetooth™ 1420, etc.), or actuators (e.g., haptics 1422, 1449, etc.) can reduce functionality and/or power consumption (e.g., enter a sleep mode) when watch body 1404 and watch band 1412 are mechanically and/or electrically disconnected from one another. Watch body 1404 and watch band 1412 can return to full functionality when watch body 1404 and watch band 1412 are mechanically and/or electrically connected to one another. The level of functionality of each of the sensors, processors, actuators, and memory can be independently controlled.

As described above, wrist-wearable device system 1400 can detect when watch body 1404 and watch band 1412 are coupled to one another (e.g., mechanically connected and/or electrically connected) or decoupled from one another. In some examples, watch body 1404 can modify a level of functionality (e.g., activate and/or deactivate certain functions) based on whether watch body 1404 is coupled to watch band 1412. For example, CPU 1426 can execute instructions that detect when watch body 1404 and watch band 1412 are coupled to one another and activate front-facing image sensor 1325A. CPU 1426 can activate front-facing image sensor 1325A based on receiving user input (e.g., a user touch input from touchscreen display 1413, a user voice command from microphone 1472, a user gesture recognition input from EMG sensor 1446, etc.).

When CPU 1426 detects that watch body 1404 and watch band 1412 are decoupled from one another, CPU 1426 can modify a level of functionality (e.g., activate and/or deactivate additional functions). For example, CPU 1426 can detect when watch body 1404 and watch band 1412 are decoupled from one another and activate rear-facing image sensor 1325B. CPU 1426 can activate rear-facing image sensor 1325B automatically (e.g., without user input) and/or based on receiving user input (e.g., a touch input, a voice input, an intention detection, etc.). Automatically activating rear-facing image sensor 1325B can allow a user to take wide-angle images without having to provide user input to activate rear-facing image sensor 1325B.

In some examples, a rear-facing image can be activated based on an image capture criterion (e.g., an image quality, an image resolution, etc.). For example, rear-facing image sensor 1325B can receive an image (e.g., a test image). CPU 1426 and/or rear-facing image sensor 1325B can analyze the received test image data and determine whether the test image data satisfies the image capture criterion (e.g., the image quality exceeds a tolerance, the image resolution exceeds a tolerance, etc.). Rear-facing image sensor 1325B can be activated when the test image data satisfies the image capture criterion. Additionally, or alternatively, rear-facing image sensor 1325B can be deactivated when the test image data fails to satisfy the image capture criterion.

In some examples, CPU 1426 can detect when watch body 1404 is coupled to watch band 1412 and deactivate rear-facing image sensor 1325B. CPU 1426 can deactivate rear-facing image sensor 1325B automatically (e.g., without user input) and/or based on receiving user input (e.g., a touch input, a voice input, an intention detection, etc.). Deactivating rear-facing image sensor 1325B can automatically (e.g., without user input) reduce the power consumption of watch body 1404 and increase the battery charge time in watch body 1404. In some examples, wrist-wearable device system 1400 can include one or more actuators 128 (e.g., FIGS. 1-6B and 9A and 9B). In some examples, wrist-wearable device system 1400 can include coupling sensor 1407 that senses whether watch body 1404 is coupled to or decoupled from watch band 1412. Coupling sensor 1407 can be included in any of watch body 1404, watch band 1412, or watch band coupling mechanism 1360 of FIGS. 13A and 13B. Coupling sensor 1407 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1426 can detect when watch body 1404 is coupled to watch band 1412 or decoupled from watch band 1412 by reading the status of coupling sensor 1407.

Example Systems

FIGS. 15A and 15B are block diagrams illustrating an example artificial-reality system in accordance with some embodiments. The system 1500 includes one or more devices for facilitating an interactivity with an artificial-reality environment in accordance with some embodiments. For example, the head-wearable device 1511 can present to the user 15015 with a user interface within the artificial-reality environment. As a non-limiting example, the system 1500 includes one or more wearable devices, which can be used in conjunction with one or more computing devices. In some embodiments, the system 1500 provides the functionality of a virtual-reality device, an augmented-reality device, a mixed-reality device, hybrid-reality device, or a combination thereof. In some embodiments, the system 1500 provides the functionality of a user interface and/or one or more user applications (e.g., games, word processors, messaging applications, calendars, clocks, etc.).

The system 1500 can include one or more of servers 1570, electronic devices 1574 (e.g., a computer, 1574a, a smartphone 1574b, a controller 1574c, and/or other devices), head-wearable devices 1511 (e.g., the AR system or the VR system), and/or wrist-wearable devices 1588 (e.g., the wrist-wearable device 15020, which is analogous to wearable device 110, 1350, and 1400). In some embodiments, the one or more of servers 1570, electronic devices 1574, head-wearable devices 1511, and/or wrist-wearable devices 1588 are communicatively coupled via a network 1572. In some embodiments, the head-wearable device 1511 is configured to cause one or more operations to be performed by a communicatively coupled wrist-wearable device 1588, and/or the two devices can also both be connected to an intermediary device, such as a smartphone 1574b, a controller 1574c, or other device that provides instructions and data to and between the two devices. In some embodiments, the head-wearable device 1511 is configured to cause one or more operations to be performed by multiple devices in conjunction with the wrist-wearable device 1588. In some embodiments, instructions to cause the performance of one or more operations are controlled via an artificial-reality processing module 1545. The artificial-reality processing module 1545 can be implemented in one or more devices, such as the one or more of servers 1570, electronic devices 1574, head-wearable devices 1511, and/or wrist-wearable devices 1588. In some embodiments, the one or more devices perform operations of the artificial-reality processing module 1545, using one or more respective processors, individually or in conjunction with at least one other device as described herein. In some embodiments, the system 1500 includes other wearable devices not shown in FIG. 15A and FIG. 15B, such as rings, collars, anklets, gloves, and the like.

In some embodiments, the system 1500 provides the functionality to control or provide commands to the one or more computing devices 1574 based on a wearable device (e.g., head-wearable device 1511 or wrist-wearable device 1588) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module. In some embodiments, the user can enter a training phase in which a user defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 1560. Similar to the motor actions, the one or more processors 1550 can use the detected neuromuscular signals by the one or more sensors 1525 to determine that a user-defined gesture was performed by the user.

The electronic devices 1574 can also include a communication interface 1515, an interface 1520 (e.g., including one or more displays, lights, speakers, and haptic generators), one or more sensors 1525, one or more applications 1535, an artificial-reality processing module 1545, one or more processors 1550, and memory 1560. The electronic devices 1574 are configured to communicatively couple with the wrist-wearable device 1588 and/or head-wearable device 1511 (or other devices) using the communication interface 1515. In some embodiments, the electronic devices 1574 are configured to communicatively couple with the wrist-wearable device 1588 and/or head-wearable device 1511 (or other devices) via an application programming interface (API). In some embodiments, the electronic devices 1574 operate in conjunction with the wrist-wearable device 1588 and/or the head-wearable device 1511 to determine a hand gesture and cause the performance of an operation or action at a communicatively coupled device.

The server 1570 includes a communication interface 1515, one or more applications 1535, an artificial-reality processing module 1545, one or more processors 1550, and memory 1560. In some embodiments, the server 1570 is configured to receive sensor data from one or more devices, such as the head-wearable device 1511, the wrist-wearable device 1588, and/or electronic device 1574, and use the received sensor data to identify a gesture or user input. The server 1570 can generate instructions that cause the performance of operations and actions associated with a determined gesture or user input at communicatively coupled devices, such as the head-wearable device 1511.

The head-wearable device 1511 includes smart glasses (e.g., the augmented-reality glasses), artificial reality headsets (e.g., VR/AR headsets), or other head worn device. In some embodiments, one or more components of the head-wearable device 1511 are housed within a body of the HMD 1514 (e.g., frames of smart glasses, a body of a AR headset, etc.). In some embodiments, one or more components of the head-wearable device 1511 are stored within or coupled with lenses of the HMD 1514. Alternatively or in addition, in some embodiments, one or more components of the head-wearable device 1511 are housed within a modular housing 1506. The head-wearable device 1511 is configured to communicatively couple with other electronic device 1574 and/or a server 1570 using communication interface 1515 as discussed above.

FIG. 15B describes additional details of the HMD 1514 and modular housing 1506 described above in reference to 15A, in accordance with some embodiments.

The housing 1506 include(s) a communication interface 1515, circuitry 1546, a power source 1507 (e.g., a battery for powering one or more electronic components of the housing 1506 and/or providing usable power to the HMD 1514), one or more processors 1550, and memory 1560. In some embodiments, the housing 1506 can include one or more supplemental components that add to the functionality of the HMD 1514. For example, in some embodiments, the housing 1506 can include one or more sensors 1525, an AR processing module 1545, one or more haptic generators 1521, one or more imaging devices 1555, one or more microphones 1513, one or more speakers 1517, etc. The housing 106 is configured to couple with the HMD 1514 via the one or more retractable side straps. More specifically, the housing 1506 is a modular portion of the head-wearable device 1511 that can be removed from head-wearable device 1511 and replaced with another housing (which includes more or less functionality). The modularity of the housing 1506 allows a user to adjust the functionality of the head-wearable device 1511 based on their needs.

In some embodiments, the communications interface 1515 is configured to communicatively couple the housing 1506 with the HMD 1514, the server 1570, and/or other electronic device 1574 (e.g., the controller 1574c, a tablet, a computer, etc.). The communication interface 1515 is used to establish wired or wireless connections between the housing 1506 and the other devices. In some embodiments, the communication interface 1515 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 1506 is configured to communicatively couple with the HMD 1514 and/or other electronic device 1574 via an application programming interface (API).

In some embodiments, the power source 1507 is a battery. The power source 1507 can be a primary or secondary battery source for the HMD 1514. In some embodiments, the power source 1507 provides useable power to the one or more electrical components of the housing 1506 or the HMD 1514. For example, the power source 1507 can provide usable power to the sensors 1521, the speakers 1517, the HMD 1514, and the microphone 1513. In some embodiments, the power source 1507 is a rechargeable battery. In some embodiments, the power source 1507 is a modular battery that can be removed and replaced with a fully charged battery while it is charged separately.

The one or more sensors 1525 can include heart rate sensors, neuromuscular-signal sensors (e.g., electromyography (EMG) sensors), SpO2 sensors, altimeters, thermal sensors or thermal couples, ambient light sensors, ambient noise sensors, and/or inertial measurement units (IMU) s. Additional non-limiting examples of the one or more sensors 1525 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1525 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 1525 can include location sensing devices (e.g., GPS) configured to provide location information. In some embodiment, the data measured or sensed by the one or more sensors 1525 is stored in memory 1560. In some embodiments, the housing 1506 receives sensor data from communicatively coupled devices, such as the HMD 1514, the server 1570, and/or other electronic device 1574. Alternatively, the housing 1506 can provide sensors data to the HMD 1514, the server 1570, and/or other electronic device 1574.

The one or more haptic generators 1521 can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 1521 are hydraulic, pneumatic, electric, and/or mechanical actuators. In some embodiments, the one or more haptic generators 1521 are part of a surface of the housing 1506 that can be used to generate a haptic response (e.g., a thermal change at the surface, a tightening or loosening of a band, increase or decrease in pressure, etc.). For example, the one or more haptic generators 1525 can apply vibration stimulations, pressure stimulations, squeeze simulations, shear stimulations, temperature changes, or some combination thereof to the user. In addition, in some embodiments, the one or more haptic generators 1521 include audio generating devices (e.g., speakers 1517 and other sound transducers) and illuminating devices (e.g., light-emitting diodes (LED) s, screen displays, etc.). The one or more haptic generators 1521 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1535 include social-media applications, banking applications, health applications, messaging applications, web browsers, gaming application, streaming applications, media applications, imaging applications, productivity applications, social applications, etc. In some embodiments, the one or more applications 1535 include artificial reality applications. The one or more applications 1535 are configured to provide data to the head-wearable device 1511 for performing one or more operations. In some embodiments, the one or more applications 1535 can be displayed via a display 1530 of the head-wearable device 1511 (e.g., via the HMD 1514).

In some embodiments, instructions to cause the performance of one or more operations are controlled via an artificial reality (AR) processing module 1545. The AR processing module 1545 can be implemented in one or more devices, such as the one or more of servers 1570, electronic devices 1574, head-wearable devices 1511, and/or wrist-wearable devices 1570. In some embodiments, the one or more devices perform operations of the AR processing module 1545, using one or more respective processors, individually or in conjunction with at least one other device as described herein. In some embodiments, the AR processing module 1545 is configured process signals based at least on sensor data. In some embodiments, the AR processing module 1545 is configured process signals based on image data received that captures at least a portion of the user hand, mouth, facial expression, surrounding, etc. For example, the housing 1506 can receive EMG data and/or IMU data from one or more sensors 1525 and provide the sensor data to the AR processing module 1545 for a particular operation (e.g., gesture recognition, facial recognition, etc.). The AR processing module 1545, causes a device communicatively coupled to the housing 1506 to perform an operation (or action). In some embodiments, the AR processing module 1545 performs different operations based on the sensor data and/or performs one or more actions based on the sensor data.

In some embodiments, the one or more imaging devices 1555 can include an ultra-wide camera, a wide camera, a telephoto camera, a depth-sensing cameras, or other types of cameras. In some embodiments, the one or more imaging devices 1555 are used to capture image data and/or video data. The imaging devices 1555 can be coupled to a portion of the housing 1506. The captured image data can be processed and stored in memory and then presented to a user for viewing. The one or more imaging devices 1555 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 1555 is stored in memory 1560 (which can include volatile and non-volatile memory such that the image data and/or video data can be temporarily or permanently stored, as needed depending on the circumstances).

The circuitry 1546 is configured to facilitate the interaction between the housing 1506 and the HMD 1514. In some embodiments, the circuitry 1546 is configured to regulate the distribution of power between the power source 1507 and the HMD 1514. In some embodiments, the circuitry 746 is configured to transfer audio and/or video data between the HMD 1514 and/or one or more components of the housing 1506.

The one or more processors 1550 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 1560. The memory 1560 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the housing and the processor 1550. The memory 1560 also provides a storage area for data and instructions associated with applications and data handled by the processor 1550.

In some embodiments, the memory 1560 stores at least user data 1561 including sensor data 1562 and AR processing data 1564. The sensor data 1562 includes sensor data monitored by one or more sensors 1525 of the housing 1506 and/or sensor data received from one or more devices communicative coupled with the housing 1506, such as the HMD 1514, the smartphone 1574*b*, the controller 1574*c*, etc. The sensor data 1562 can include sensor data collected over a predetermined period of time that can be used by the AR processing module 1545. The AR processing data 1564 can include one or more one or more predefined camera-control gestures, user defined camera-control gestures, predefined non-camera-control gestures, and/or user defined non-camera-control gestures. In some embodiments, the AR processing data 1564 further includes one or more predetermined threshold for different gestures.

The HMD 1514 includes a communication interface 1515, a display 1530, an AR processing module 1545, one or more processors, and memory. In some embodiments, the HMD 1514 includes one or more sensors 1525, one or more haptic generators 1521, one or more imaging devices 1555 (e.g., a camera), microphones 1513, speakers 1517, and/or one or more applications 1535. The HMD 1514 operates in conjunction with the housing 1506 to perform one or more operations of a head-wearable device 1511, such as capturing camera data, presenting a representation of the image data at a coupled display, operating one or more applications 1535, and/or allowing a user to participate in an AR environment.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of adjusting an operational characteristic of a neuromuscular-signal sensor, the method comprising:
    monitoring, based on data from a wearable device that includes a neuromuscular-signal sensor, an impedance at the sensor that impacts the neuromuscular-signal sensor's ability to sense neuromuscular signals, wherein the neuromuscular-signal sensor is:
        coupled to the wearable device such that it contacts a portion of a user's skin when the wearable device is donned by the user, and
        depressed into the user's skin a first skin-depression depth when the wearable device is donned by the user; and
    in response to detecting a change in the impedance at the neuromuscular-signal sensor that causes the impedance to be outside of a predefined range of impedance values:
        causing an adjustment to an operational characteristic associated with the neuromuscular-signal sensor so that the impedance at the neuromuscular-signal sensor is within the predefined range of impedance values after the adjustment to the operational characteristic of the neuromuscular-signal sensor,
        wherein the causing the adjustment to the operational characteristic associated with the neuromuscular-signal sensor includes causing a depression of the neuromuscular-signal sensor to change such that the neuromuscular-signal sensor is depressed into the user's skin a second skin-depression depth that is distinct from the first skin-depression depth.

2. The method of claim 1, wherein the change in the impedance at the neuromuscular-signal sensor is a first change in the impedance at the neuromuscular-signal sensor, and the method further comprises:
    while the neuromuscular-signal sensor is at the second skin-depression depth and in response to detecting a second change in the impedance at the neuromuscular-signal sensor that causes the impedance to again be outside of the predefined range of impedance values:
        causing the neuromuscular-signal sensor to move until the neuromuscular-signal sensor depresses the portion of the user's skin to a third skin-depression depth that is distinct from the second skin-depression depth,
        wherein the impedance for the neuromuscular-signal sensor is within the predefined range of impedance values while the neuromuscular-signal sensor is at the third skin-depression depth.

3. The method of claim 2, wherein:
    the first skin-depression depth is less than the second skin-depression depth, and
    the third skin-depression depth is greater than the second skin-depression depth, such that the neuromuscular-signal sensor can be caused to be pushed into the portion of the user's skin or caused to be pulled away from the user's skin to allow for maintaining the impedance at the neuromuscular-signal sensor within the predefined range of impedance values.

4. The method of claim 2, wherein the first, second, and third changes in the impedance are caused by one or more of: moisture at the portion of the user's skin, hair follicles at the portion of the user's skin, and motion of the user that causes the neuromuscular-signal sensor to move within the portion of the user's skin.

5. The method of claim 1, wherein:
the neuromuscular-signal sensor is part of a group of two or more neuromuscular-signal sensors that is configured to operate as a sensing channel for sensing neuromuscular signals, and
movement of the neuromuscular-signal sensor to the second skin-depression depth is caused to occur while other neuromuscular-signal sensors in the group of two or more sensors remain in place.

6. The method of claim 1, wherein causing the neuromuscular-signal sensor to move includes causing the neuromuscular-signal sensor to move such that it depresses the user's skin to a number of different skin-depression depths, including the second skin-depression depth, until a determination is made by the wearable device that the impedance for the sensor is within the predefined range of impedance values while the neuromuscular-signal sensor depresses the portion of the user's skin to the second skin-depression depth.

7. The method of claim 1, wherein:
the neuromuscular-signal sensor is a first neuromuscular-signal sensor,
the predefined range of impedance values is a first predefined range of impedance values,
the wearable device includes a second neuromuscular-signal sensor, and
the method further comprises:
monitoring a second impedance at the second neuromuscular-signal sensor that impacts the second neuromuscular-signal sensor's ability to sense neuromuscular signals, the second neuromuscular-signal sensor coupled to the wearable device such that it depresses a portion of the user's skin to a particular skin-depression depth; and
in response to detecting a change in the second impedance at the second neuromuscular-signal sensor that causes the second impedance to be outside of a second predefined range of impedance values, causing the second neuromuscular-signal sensor to move until the second neuromuscular-signal sensor depresses a second portion of the user's skin to another particular skin-depression depth that is distinct from the particular skin-depression depth, wherein the second impedance at the second neuromuscular-signal sensor is within the second predefined range of impedance values while the second neuromuscular-signal sensor is at the other particular skin-depression depth.

8. The method of claim 7, wherein:
the first predefined range of impedance values is distinct from the second predefined range of impedance values,
the first predefined range of impedance values is specific to the first neuromuscular-signal sensor,
the second predefined range of impedance values is specific to the second neuromuscular-signal sensor, and
causing the second neuromuscular-signal sensor to move is performed independently of causing the first sensor to move.

9. The method claim 7, wherein:
the first and second neuromuscular-signal sensors are part of a first group of neuromuscular-signal sensors configured as a first channel for sensing neuromuscular signals,
the wearable device includes a second group of at least two neuromuscular-signal sensors configured as a second channel for sensing neuromuscular signals, and
the method further comprises, for each respective neuromuscular-signal sensor of the second group of neuromuscular-signal sensors:
monitoring a respective impedance at the respective neuromuscular-signal sensor that impacts the respective neuromuscular-signal sensor's ability to sense neuromuscular signals, the respective neuromuscular-signal sensor coupled to the wearable device such that it depresses a respective portion of the user's skin to a first respective skin-depression depth;
in response to detecting a change in the respective impedance at the respective sensor that causes the respective impedance to be outside of a respective predefined range of impedance values, causing the respective neuromuscular-signal sensor to move until it depresses the respective portion of the user's skin to a second respective skin-depression depth that is distinct from the first respective skin-depression depth, wherein the respective impedance at the respective neuromuscular-signal sensor is within the respective predefined range of impedance values while the respective neuromuscular-signal sensor is at the second respective skin-depression depth; and
wherein:
a first set of respective predefined range of impedance values are distinct predefined range of impedance values, and
a second set of respective predefined range of impedance values are the same predefined range of impedance values.

10. The method of claim 1, wherein one or more of:
causing the neuromuscular-signal sensor to move includes causing an actuator coupled to the neuromuscular-signal sensor to move;
the actuator is an electrostatic zipping actuator in which electric voltage changes are used for actuating the electrostatic zipping actuator;
the neuromuscular-signal sensor is a gold-plated electrode or an electrode made of a diamond-like coating, the electrode being sealingly coupled with the electrostatic zipping actuator;
the actuator is a pneumatically-controlled actuator;
the neuromuscular-signal sensor is coupled to a bladder that is fluidically coupled to the pneumatic actuator; and
the actuator controls a fluidically-controlled actuator that is within a wearable structure of the wearable device.

11. A wrist-wearable device including one or more neuromuscular-signal sensors, the wrist-wearable device configured to perform or cause the performance of:
monitoring, based on data from a wearable device that includes a neuromuscular-signal sensor, an impedance at the sensor that impacts the neuromuscular-signal sensor's ability to sense neuromuscular signals, wherein the neuromuscular-signal sensor is:
coupled to the wearable device such that it contacts a portion of a user's skin when the wearable device is donned by the user, and depressed into the user's skin a first skin-depression depth when the wearable device is donned by the user; and in response to detecting a change in the impedance at the neuromuscular-signal sensor that causes the impedance to be outside of a predefined range of impedance values:

causing an adjustment to an operational characteristic associated with the neuromuscular-signal sensor so that the impedance at the neuromuscular-signal sensor is within the predefined range of impedance values after the adjustment to the operational characteristic of the neuromuscular-signal sensor, wherein the causing the adjustment to the operational characteristic associated with the neuromuscular-signal sensor includes causing a depression of the neuromuscular-signal sensor to change such that the neuromuscular-signal sensor is depressed into the user's skin a second skin-depression depth that is distinct from the first skin-depression depth.

12. A non-transitory computer-readable storage medium including instructions that, when executed by one or more processors of a wrist-wearable device that includes one or more neuromuscular-signals, cause the wrist-wearable device to perform or cause the performance of:

monitoring, based on data from a wearable device that includes a neuromuscular-signal sensor, an impedance at the sensor that impacts the neuromuscular-signal sensor's ability to sense neuromuscular signals, wherein the neuromuscular-signal sensor is:

coupled to the wearable device such that it contacts a portion of a user's skin when the wearable device is donned by the user, and depressed into the user's skin a first skin-depression depth when the wearable device is donned by the user; and in response to detecting a change in the impedance at the neuromuscular-signal sensor that causes the impedance to be outside of a predefined range of impedance values:

causing an adjustment to an operational characteristic associated with the neuromuscular-signal sensor so that the impedance at the neuromuscular-signal sensor is within the predefined range of impedance values after the adjustment to the operational characteristic of the neuromuscular-signal sensor, wherein the causing the adjustment to the operational characteristic associated with the neuromuscular-signal sensor includes causing a depression of the neuromuscular-signal sensor to change such that the neuromuscular-signal sensor is depressed into the user's skin a second skin-depression depth that is distinct from the first skin-depression depth.

13. The wrist-wearable device of claim 11, wherein the change in the impedance at the neuromuscular-signal sensor is a first change in the impedance at the neuromuscular-signal sensor, and the wrist-wearable device is further configured to perform or cause the performance of:

while the neuromuscular-signal sensor is at the second skin-depression depth and in response to detecting a second change in the impedance at the neuromuscular-signal sensor that causes the impedance to again be outside of the predefined range of impedance values:

causing the neuromuscular-signal sensor to move until the neuromuscular-signal sensor depresses the portion of the user's skin to a third skin-depression depth that is distinct from the second skin-depression depth, wherein the impedance for the neuromuscular-signal sensor is within the predefined range of impedance values while the neuromuscular-signal sensor is at the third skin-depression depth.

14. The wrist-wearable device of claim 13, wherein:

the first skin-depression depth is less than the second skin-depression depth, and the third skin-depression depth is greater than the second skin-depression depth, such that the neuromuscular-signal sensor can be caused to be pushed into the portion of the user's skin or caused to be pulled away from the user's skin to allow for maintaining the impedance at the neuromuscular-signal sensor within the predefined range of impedance values.

15. The wrist-wearable device of claim 14, wherein the first, second, and third changes in the impedance are caused by one or more of: moisture at the portion of the user's skin, hair follicles at the portion of the user's skin, and motion of the user that causes the neuromuscular-signal sensor to move within the portion of the user's skin.

16. The wrist-wearable device of claim 11, wherein:

the neuromuscular-signal sensor is part of a group of two or more neuromuscular-signal sensors that is configured to operate as a sensing channel for sensing neuromuscular signals, and movement of the neuromuscular-signal sensor to the second skin-depression depth is caused to occur while other neuromuscular-signal sensors in the group of two or more sensors remain in place.

17. The non-transitory computer-readable storage medium of claim 12, wherein the change in the impedance at the neuromuscular-signal sensor is a first change in the impedance at the neuromuscular-signal sensor, and the instructions, when executed by the one or more processors of the wrist-wearable device, further cause the wrist-wearable device to perform or cause the performance of:

while the neuromuscular-signal sensor is at the second skin-depression depth and in response to detecting a second change in the impedance at the neuromuscular-signal sensor that causes the impedance to again be outside of the predefined range of impedance values:

causing the neuromuscular-signal sensor to move until the neuromuscular-signal sensor depresses the portion of the user's skin to a third skin-depression depth that is distinct from the second skin-depression depth, wherein the impedance for the neuromuscular-signal sensor is within the predefined range of impedance values while the neuromuscular-signal sensor is at the third skin-depression depth.

18. The non-transitory computer-readable storage medium of claim 17, wherein:

the first skin-depression depth is less than the second skin-depression depth, and the third skin-depression depth is greater than the second skin-depression depth, such that the neuromuscular-signal sensor can be caused to be pushed into the portion of the user's skin or caused to be pulled away from the user's skin to allow for maintaining the impedance at the neuromuscular-signal sensor within the predefined range of impedance values.

19. The non-transitory computer-readable storage medium of claim 18, wherein the first, second, and third changes in the impedance are caused by one or more of:

moisture at the portion of the user's skin, hair follicles at the portion of the user's skin, and motion of the user that causes the neuromuscular-signal sensor to move within the portion of the user's skin.

20. The non-transitory computer-readable storage medium of claim 12, wherein:
the neuromuscular-signal sensor is part of a group of two or more neuromuscular-signal sensors that is configured to operate as a sensing channel for sensing neuromuscular signals, and
movement of the neuromuscular-signal sensor to the second skin-depression depth is caused to occur while other neuromuscular-signal sensors in the group of two or more sensors remain in place.

* * * * *